(12) United States Patent
Pham Van et al.

(10) Patent No.: US 11,910,021 B2
(45) Date of Patent: Feb. 20, 2024

(54) PLANAR AND DIRECT MODE SIGNALING IN G-PCC

(71) Applicant: QUALCOMM Incorporated, San Diego, CA (US)

(72) Inventors: Luong Pham Van, San Diego, CA (US); Geert Van der Auwera, San Diego, CA (US); Adarsh Krishnan Ramasubramonian, Irvine, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/933,953

(22) Filed: Sep. 21, 2022

(65) Prior Publication Data

US 2023/0108175 A1 Apr. 6, 2023

Related U.S. Application Data

(60) Provisional application No. 63/266,759, filed on Jan. 13, 2022, provisional application No. 63/253,831, filed on Oct. 8, 2021, provisional application No. 63/252,080, filed on Oct. 4, 2021.

(51) Int. Cl.
*H04N 19/70* (2014.01)
*H04N 19/96* (2014.01)
*H04N 19/157* (2014.01)

(52) U.S. Cl.
CPC ........... *H04N 19/70* (2014.11); *H04N 19/157* (2014.11); *H04N 19/96* (2014.11)

(58) Field of Classification Search
CPC ....... H04N 19/70; H04N 19/157; H04N 19/96
See application file for complete search history.

(56) References Cited

U.S. PATENT DOCUMENTS

2022/0108488 A1* 4/2022 Ramasubramonian ..................... H04N 19/124

FOREIGN PATENT DOCUMENTS

EP 3929874 A1 * 12/2021 ............... G06T 7/10

OTHER PUBLICATIONS

"Information Technology—MPEG-I (Coded Representation of Immersive Media)—Part 9: Geometry-based Point Cloud Compression", ISO/IEC 23090-9:2020(E), ISO/IEC JTC 1/SC 29/WG 11, 2020, 127 pages.
International Search Report and Written Opinion—PCT/US2022/044419—ISA/EPO—dated Dec. 22, 2022 (13 pp).

(Continued)

*Primary Examiner* — Jae N Noh
(74) *Attorney, Agent, or Firm* — QUALCOMM Incorporated; Espartaco Diaz Hidalgo

(57) ABSTRACT

A method of encoding point cloud data includes signaling at least one of: a first syntax element indicating that planar mode is disabled for a current node when angular mode is enabled; or a second syntax element indicating that angular mode is enabled for the current node; bypassing signaling of values for a planar mode for the current node in a condition where the first syntax element indicates that the planar mode is disabled for the current node when the angular mode is enabled, or in a condition where the second syntax element indicates that the angular mode is enabled for the current node; and encoding the current node in a mode other than the planar mode.

30 Claims, 13 Drawing Sheets

(56) References Cited

OTHER PUBLICATIONS

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.
Lasserre (Blackberry) S., et al., "[GPCC] [CE13.22 Related] On Decoupling Planar and IDCM in Angular Mode", 130. MPEG Meeting, Apr. 20, 2020-Apr. 24, 2020, Alpbach, (Motion Picture Expert Group or ISO/IEC JTC1/SC29/WG11), No. m52956, Mar. 3, 2020, XP030285275, XP030285276, 16 Pages.
Van L.P., (Qualcomm) et al., "[G-PCC] [New proposal] Disabling Planar Mode for IDCM Nodes", 136. MPEG Meeting, Oct. 11, 2021-Oct. 15, 2021, Online, (Motion Picture Expert Group or ISO/IEC JTC1/SC29/WG11) No. m58129 Oct. 4, 2021 (Oct. 4, 2021), 5 Pages, XP030298845, Retrieved from the Internet: URL: https://dms.mpeg.expert/doc_end_user/documents/136_OnLine/wg11/m58129-v1-m58129-v1.zip m58129-v1/m58129-v1.docx [retrieved on Oct. 4, 2021].

\* cited by examiner

PLANAR AND DIRECT MODE SIGNALING IN G-PCC

This application claims the benefit of U.S. Provisional Application No. 63/252,080, filed Oct. 4, 2021, U.S. Provisional Application No. 63/253,831, filed Oct. 8, 2021, and U.S. Provisional Application No. 63/266,759, filed Jan. 13, 2022, the entire content of each of which is incorporated by reference.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

In general, this disclosure describes techniques related to signaling for planar mode and direct mode in Geometry Point Cloud Compression (G-PCC) standard. This disclosure describes examples of signaling of planar mode dependent on the inferred direct coding mode (IDCM), such as the IDCM mode or the number of points in a node. The restriction of planar mode to IDCM mode may be applicable in examples where angular mode is enabled.

For instance, in one or more examples, planar mode may be disabled (e.g., for nodes that are eligible for coding in IDCM) when angular mode is enabled. As one example, a G-PCC encoder or a G-PCC decoder may disable planar mode in all instances where angular mode is enabled. For instance, if a syntax element (e.g., a first syntax element) indicates that angular mode is enabled, then planar mode is required to be disabled. As another example, the G-PCC encoder may signal a syntax element (e.g., a second syntax element) that indicates whether planar mode is enabled or disabled when angular mode is enabled. In this example, it may be possible for angular mode to be enabled, but the syntax element also indicates that planar mode is enabled.

In this way, signaling of planar mode values may be restrained based on satisfying the condition of whether angular mode is enabled or the whether the syntax element indicates that the planar mode is enabled when angular mode is enabled. In some examples, planar mode may be enabled for an entire stream, but another flag, at the node level, may indicate whether planar mode is enabled for a particular node.

For instance, if a condition that a first syntax element indicates that the planar mode is disabled for the current node when the angular mode is enabled and/or a condition where the second syntax element indicates that the angular mode is disabled for the current node is satisfied, then the G-PCC encoder may not signal values for a planar mode. Accordingly, the example techniques promote more efficient bandwidth utilization by restraining when values for a planar mode are signaled.

In one example, the disclosure describes a method of encoding point cloud data, the method comprising: signaling at least one of: a first syntax element indicating that planar mode is disabled for a current node when angular mode is enabled; or a second syntax element indicating that angular mode is enabled for the current node; bypassing signaling of values for a planar mode for the current node in a condition where the first syntax element indicates that the planar mode is disabled for the current node when the angular mode is enabled, or in a condition where the second syntax element indicates that the angular mode is enabled for the current node; and encoding the current node in a mode other than the planar mode.

In one example, the disclosure describes a method of decoding point cloud data, the method comprising: parsing from a bitstream at least one of: a first syntax element indicating that planar mode is disabled for a current node when angular mode is enabled; or a second syntax element indicating that angular mode is enabled for the current node; bypassing parsing of values for a planar mode for the current node in response to the first syntax element indicating that the planar mode is disabled for the current node when the angular mode is enabled, or in response to the second syntax element indicating that the angular mode is enabled for the current node; and decoding the current node in a mode other than the planar mode.

In one example, the disclosure describes a device for encoding point cloud data, the device comprising: memory configured to store the point cloud data; and processing circuitry coupled to the memory and configured to: signal at least one of: a first syntax element indicating that planar mode is disabled for a current node when angular mode is enabled; or a second syntax element indicating that angular mode is enabled for the current node; bypass signaling of values for a planar mode for the current node in a condition where the first syntax element indicates that the planar mode is disabled for the current node when the angular mode is enabled, or in a condition where the second syntax element indicates that the angular mode is enabled for the current node; and encode the current node in a mode other than the planar mode.

In one example, the disclosure describes a device for decoding point cloud data, the device comprising: memory configured to store the point cloud data; and processing circuitry coupled to the memory and configured to: parse from a bitstream at least one of: a first syntax element indicating that planar mode is disabled for a current node when angular mode is enabled; or a second syntax element indicating that angular mode is enabled for the current node; bypass parsing of values for a planar mode for the current node in response to the first syntax element indicating that the planar mode is disabled for the current node when the angular mode is enabled, or in response to the second syntax element indicating that the angular mode is enabled for the current node; and decode the current node in a mode other than the planar mode.

The details of one or more examples are set forth in the accompanying drawings and the description below. Other features, objects, and advantages will be apparent from the description, drawings, and claims.

DETAILED DESCRIPTION

Figure 1:
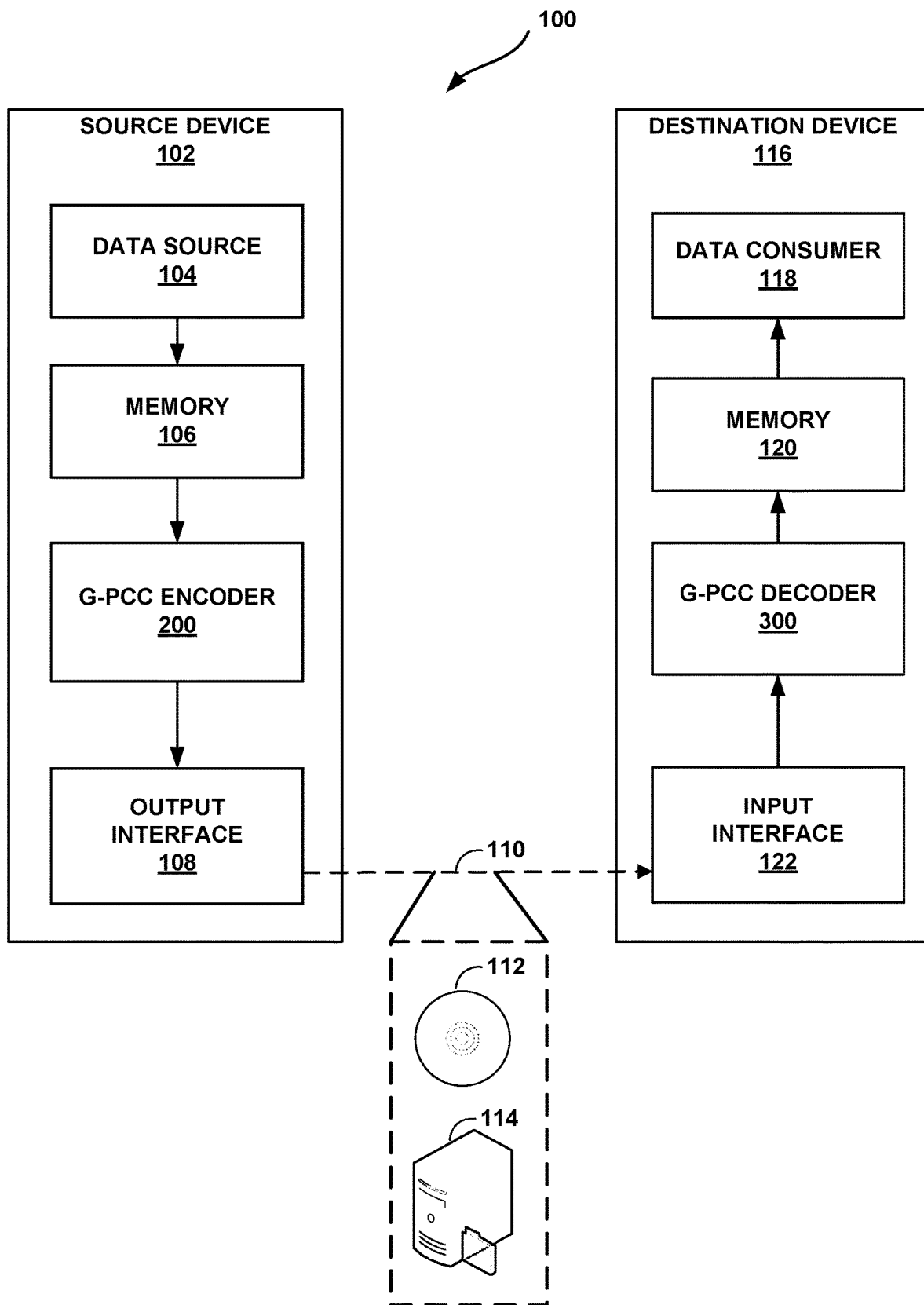
FIG. 1 is a block diagram illustrating an example encoding and decoding system that may perform the techniques of this disclosure.

The example techniques described in this disclosure relate to point cloud compression, such as geometry point cloud compression (G-PCC). As described in more detail, the disclosure describes example techniques of signaling of planar and direct mode in G-PCC. For instance, some techniques for signaling planar and direct mode in G-PCC may result in redundant or inefficient signaling. With the example techniques described in this disclosure, a G-PCC encoder may signal information for planar and direct mode that is more bandwidth efficient by avoiding redundant signaling and/or reducing overhead for signaling of planar information.

A G-PCC encoder may encode a current node based on coordinate information or angular information. For encoding position information, the G-PCC encoder determines a root coordinate (e.g., bottom-left-front corner of the current node), and determines offsets relative to the root coordinate for the points within the current node.

To reduce the size of the offsets, the G-PCC encoder may utilize a planar mode. For instance, the current node may be split into eight child nodes, so that there are four child nodes above and four child nodes below a first plane, there are four child nodes to the left and four child nodes to the right of a second plane, and there are four child nodes in front and four child nodes behind a third plane. If points in the point cloud are clustered, then, in planar mode, the G-PCC encoder may signal values indicating such clustering. The G-PCC encoder may adjust the location of the root coordinate so that the offsets are smaller. For example, the G-PCC encoder may determine that all points are located in the top-half of the current node, and signal information indicating that there are no points in the bottom-half of the current node. The G-PCC encoder may adjust the location of the root coordinate to the bottom-left-front corner of a child node of the child nodes in the top-half of the current node.

In angular mode, the G-PCC encoder may determine angles of laser beams used to determine a location of a particular point. The G-PCC encoder may utilize such information as contexts for encoding position information for a point in the point cloud. Angular mode tends to require fewer bits for signaling position information but tends to be more computationally intensive, as compared to planar mode.

If angular mode is enabled, signaling of information for planar mode may be unnecessary, and unnecessarily utilize bandwidth. It should be understood that there may be instances where angular mode is enabled, and that is sufficient to bypass signaling of values for planar mode. However, there may be instances where angular mode is enabled, but possibly not actually applied. In such cases, there may be benefit in signaling values for planar mode. This disclosure describes examples of bypassing signaling values for planar mode in a condition where angular mode is enabled, and examples of bypassing signaling values for a planar mode in a condition where planar mode is disabled when angular mode is enabled, with also the condition that planar mode is enabled when angular mode is enabled.

As described above, for planar mode, the G-PCC encoder may signal values identifying along which planes the points in the point cloud are clustered. Signaling such values may be unnecessary, such as, in some instances, when angular mode is enabled. However, there may be instances when G-PCC encoder may still signal values for planar mode when angular mode is enabled. For example, there may be a possibility that angular mode is enabled for a current node, but not applied (e.g., the current node is not actually encoded in angular mode). In such an example (e.g., angular mode is enabled but not applied for the current node), the G-PCC encoder may signal values for planar mode.

This disclosure describes example ways in which planar mode may be disabled for a current node when angular mode is enabled. As one example, the G-PCC encoder may signal a syntax element (e.g., geometry_angular_enabled_flag) indicating that angular mode is enabled for the current node (e.g., geometry_angular_enabled_flag is true). If angular mode is enabled (e.g., geometry_angular_enabled_flag is true), then the G-PCC encoder may bypass signaling values for planar mode. That is, the G-PCC encoder may bypass signaling of values for a planar mode for the current node in a condition where geometry_angular_enabled_flag indicates that the angular mode is enabled for the current node. Stated another way, the G-PCC encoder may signal values for planar mode only if angular mode is not enabled.

As another example, this disclosure describes a syntax element indicating whether planar mode is disabled for a current node when angular mode is enabled. This syntax element may be referred to as "geom_disable_planar_idcm_angular." If the syntax element (e.g., geom_disable_planar_idcm_angular) indicates that planar mode is disabled when angular mode is enabled, the G-PCC encoder may bypass signaling values for planar mode. That is, the G-PCC encoder may bypass signaling of values for a planar mode for the current node in a condition where geom_ disable_planar_idcm_angular flag indicates that planar mode is disabled when angular mode is enabled. Stated another way, the G-PCC encoder may signal values for planar mode only if the syntax element indicates that planar mode is not disabled when angular mode is enabled (e.g., geom_disable_planar_idcm_angular is false).

For ease, the geom_disable_planar_idcm_angular may be referred to as a first syntax element, and geometry_angular_enabled_flag may be referred to as a second syntax element. For example, the G-PCC encoder may bypass signaling of values for a planar mode for the current node in a condition where the first syntax element indicates that the planar mode is disabled for the current node when the angular mode is enabled, or in a condition where the second syntax element indicates that the angular mode is enabled for the current node. The combination of the conditions may also be possible. For example, the G-PCC encoder may bypass signaling of values for a planar mode for the current node in a condition where the first syntax element indicates that the planar mode is disabled for the current node when the angular mode is enabled, and in a condition where the second syntax element indicates that the angular mode is enabled for the current node.

In some examples, the techniques described in this disclosure may be applicable for a current node that is eligible for inferred direct coding mode (IDCM), or simply direct mode. In IDCM mode, occupancy information (i.e., occupancy of one or more child nodes) for a node may not be encoded. When a node is coded with IDCM mode, instead of signaling the occupancy information of the node, the relative coordinate of the point(s) within the node may be signaled. Although the current node may be eligible for IDCM, it may not be required that the current node is encoded in IDCM. For instance, in some examples, the signaling of occupancy information may occur in a condition where the current node is eligible for IDCM mode, but IDCM mode is not used to encode the current node.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to processing point cloud data of planar mode dependent on inferred direct coding mode (IDCM). Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to processing point cloud data of planar mode dependent on inferred direct coding mode (IDCM). Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames" of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in G-PCC DIS, ISO/IEC JTC1/SC29/WG11 w55637, Teleconference November 2020, and a description of the codec is available in G-PCC Codec Description, ISO/IEC JTC1/SC29/WG11 N0011, Teleconference, October 2020. Another draft of the G-PCC standard is available in ISO/IEC JTC1/SC28/WG7 N00348, Teleconference, April 2022, and a description of the codec is available in G-PCC Codec Description, ISO/IEC JTC1/SC28/WG7 N00271, Teleconference, January 2022.

A point cloud contains a set of points in a 3D space, and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
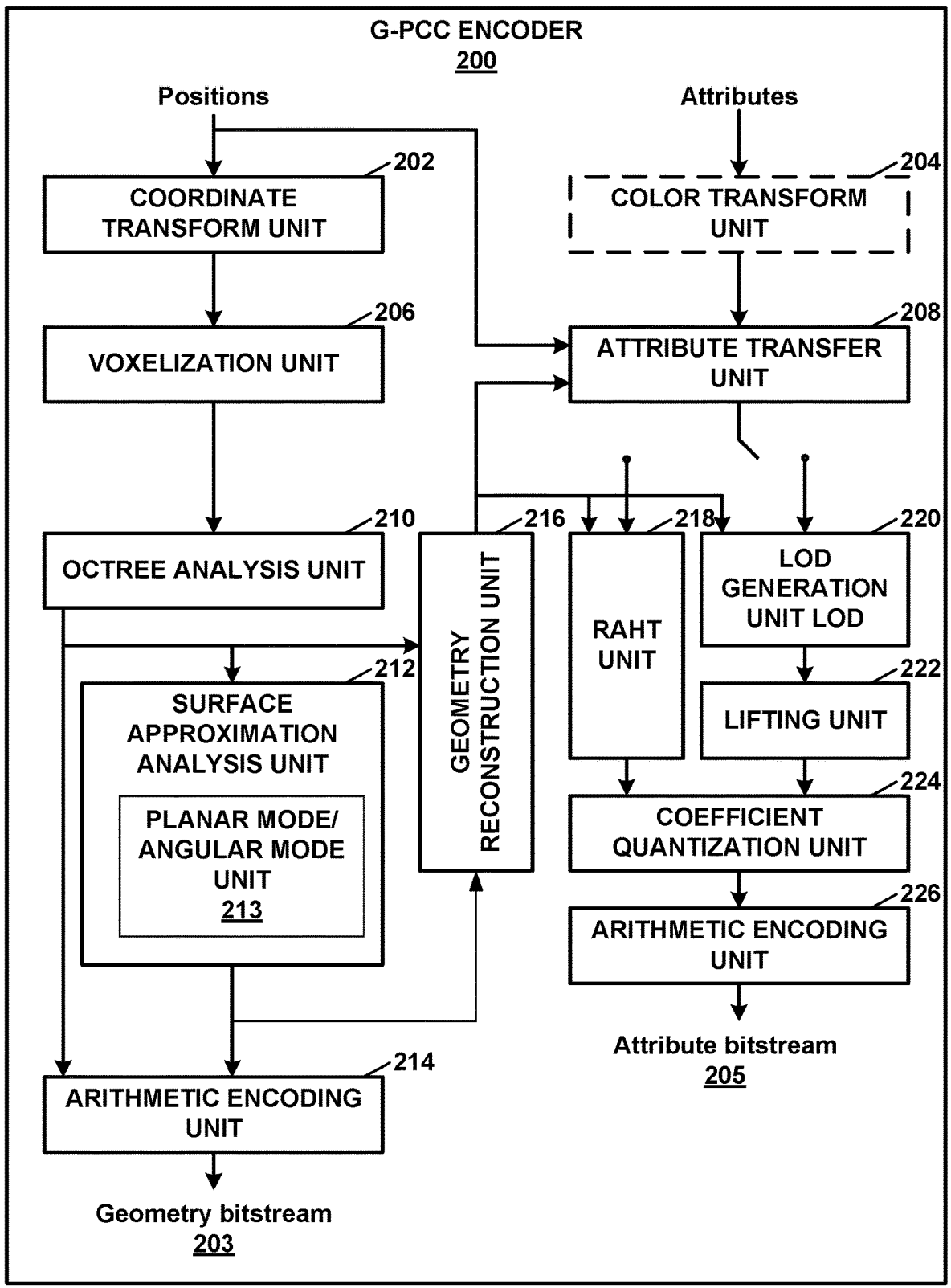
FIG. 2 is a block diagram illustrating an example Geometry Point Cloud Compression (G-PCC) encoder.
Figure 3:
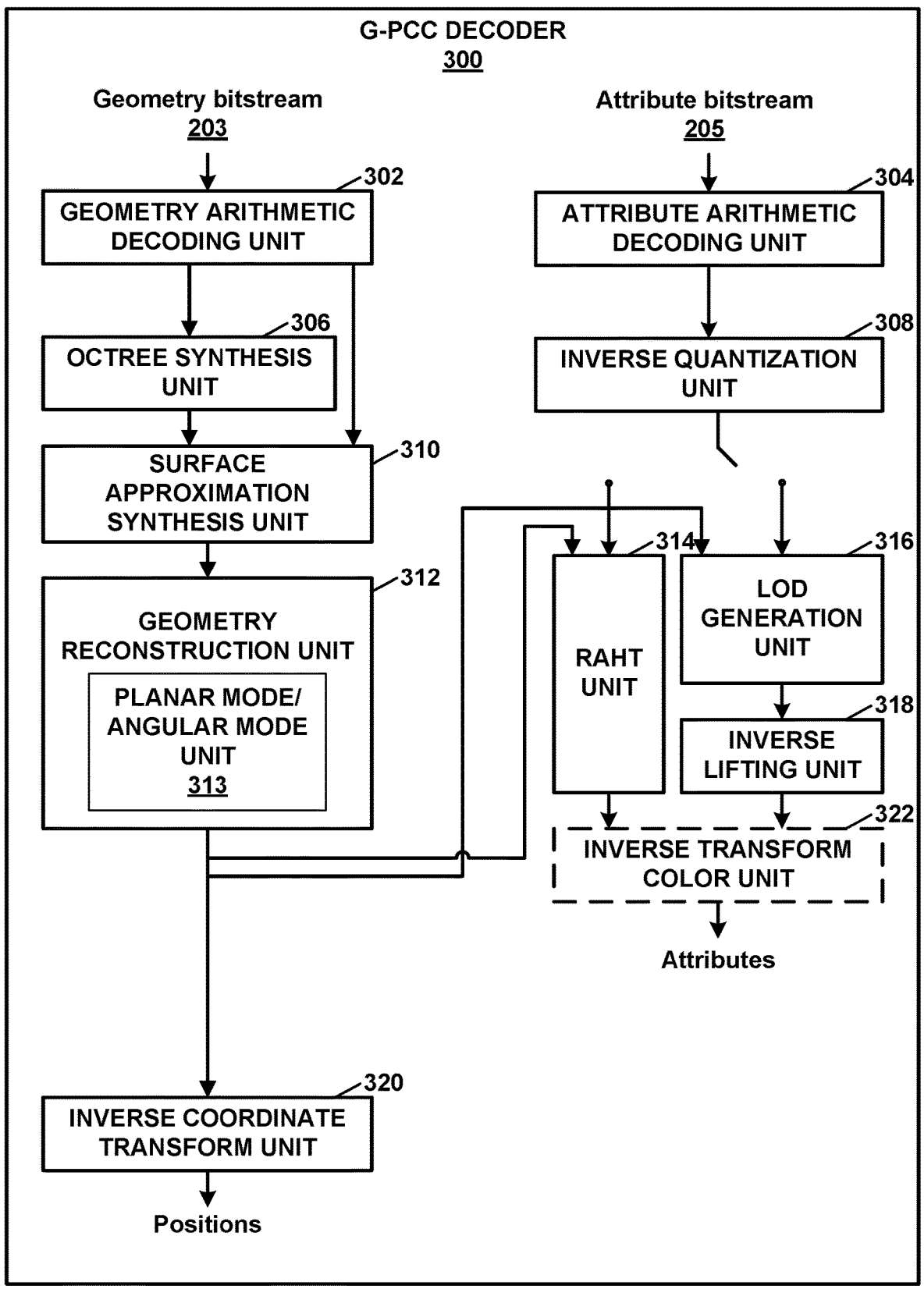
FIG. 3 is a block diagram illustrating an example G-PCC decoder.

FIG. 2 provides an overview of G-PCC encoder 200. FIG. 3 provides an overview of G-PCC decoder 300. The units shown are logical, and do not necessarily correspond one-to-one to implemented code in the reference implementation of G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 and FIG. 3, the units 212, 218, 310, and 314 may be options typically used for Category 1 data. Units 220, 222, 316, and 318 may be options typically used for Category 3 data. All the other units are common between Categories 1 and 3.

For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode (e.g., IDCM) where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while Predicting is typically used for Category 3 data. However, either method may be used for any data, and, just like with the geometry codecs in G-PCC, the attribute coding method used to code the point cloud is specified in the bitstream.

The coding of the attributes may be conducted in a level-of-detail (LOD), where with each level of detail a finer representation of the point cloud attribute may be obtained. Each level of detail may be specified based on distance metric from the neighboring nodes or based on a sampling distance.

At G-PCC encoder 200, the residuals obtained as the output of the coding methods for the attributes are quantized. The residuals may be obtained by subtracting the attribute value from a prediction that is derived based on the points in the neighborhood of the current point and based on the attribute values of points encoded previously. The quantized residuals may be coded using context adaptive arithmetic coding.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, G-PCC encoder 200 may obtain a set of positions of points in the point cloud and a set of attributes. G-PCC encoder 200 may obtain the set of positions of the points in the point cloud and the set of attributes from data source 104 (FIG. 1). The positions may include coordinates of points in a point cloud. The attributes may include information about the points in the point cloud, such as colors associated with points in the point cloud. G-PCC encoder 200 may generate a geometry bitstream 203 that includes an encoded representation of the positions of the points in the point cloud. G-PCC encoder 200 may also generate an attribute bitstream 205 that includes an encoded representation of the set of attributes.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in geometry bitstream 203. Geometry bitstream 203 may also include other syntax elements, including syntax elements that are not arithmetically encoded.

As illustrated, surface approximation analysis unit 212 may include planar mode/angular mode unit 213. In one or more examples, planar mode/angular mode unit 213 may be configured to perform one or more example techniques described in this disclosure, such as described with respect to FIG. 7. The inclusion of planar mode/angular mode unit 213 is provided as one example and should not be considered as limiting. Although the example techniques are illustrated with respect to planar mode/angular mode unit 213, in some examples, the example techniques may be performed by arithmetic encoding unit 214.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. In some examples, under RAHT, the attributes of a block of 2×2×2 point positions are taken and transformed along one direction to obtain four low (L) and four high (H) frequency nodes. Subsequently, the four low frequency nodes (L) are transformed in a second direction to obtain two low (LL) and two high (LH) frequency nodes. The two low frequency nodes (LL) are transformed along a third direction to obtain one low (LLL) and one high (LLH) frequency node. The low frequency node LLL corresponds to DC coefficients and the high frequency nodes H, LH, and LLH correspond to AC coefficients. The transformation in each direction may be a 1-D transform with two coefficient weights. The low frequency coefficients may be taken as coefficients of the 2×2×2 block for the next higher level of RAHT transform and the AC coefficients are encoded without changes; such transformations continue until the top root node. The tree traversal for encoding is from top to bottom used to calculate the weights to be used for the coefficients; the transform order is from bottom to top. The coefficients may then be quantized and coded.

Alternatively or additionally, LOD generation unit 220 and lifting unit 222 may apply LOD processing and lifting, respectively, to the attributes of the reconstructed points. LOD generation is used to split the attributes into different refinement levels. Each refinement level provides a refinement to the attributes of the point cloud. The first refinement level provides a coarse approximation and contains few points; the subsequent refinement level typically contains more points, and so on. The refinement levels may be constructed using a distance-based metric or may also use one or more other classification criteria (e.g., subsampling from a particular order). Thus, all the reconstructed points may be included in a refinement level. Each level of detail is produced by taking a union of all points up to particular refinement level: e.g., LOD1 is obtained based on refinement level RL1, LOD2 is obtained based on RL1 and RL2, LODN is obtained by union of RL1, RL2, ... RLN. In some cases, LOD generation may be followed by a prediction scheme (e.g., predicting transform) where attributes associated with each point in the LOD are predicted from a weighted average of preceding points, and the residual is quantized and entropy coded. The lifting scheme builds on top of the predicting transform mechanism, where an update operator is used to update the coefficients and an adaptive quantization of the coefficients is performed.

RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in attribute bitstream 205. Attribute bitstream 205 may also include other syntax elements, including non-arithmetically encoded syntax elements.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LOD generation unit 316, an inverse lifting unit 318, an inverse transform coordinate unit 320, and an inverse transform color unit 322.

G-PCC decoder 300 may obtain a geometry bitstream 203 and attribute bitstream 205. Geometry arithmetic decoding unit 302 of G-PCC decoder 300 may apply arithmetic decoding (e.g., Context-Adaptive Binary Arithmetic Coding (CABAC) or other type of arithmetic decoding) to syntax elements in geometry bitstream 203. Similarly, attribute arithmetic decoding unit 304 may apply arithmetic decoding to syntax elements in attribute bitstream 205.

Octree synthesis unit 306 may synthesize an octree based on syntax elements parsed from geometry bitstream 203. Starting with the root node of the octree, the occupancy of each of the eight children node at each octree level is signaled in the bitstream. When the signaling indicates that a child node at a particular octree level is occupied, the occupancy of children of this child node is signaled. The signaling of nodes at each octree level is signaled before proceeding to the subsequent octree level. At the final level of the octree, each node corresponds to a voxel position; when the leaf node is occupied, one or more points may be specified to be occupied at the voxel position. In some instances, some branches of the octree may terminate earlier than the final level due to quantization. In such cases, a leaf node is considered an occupied node that has no child nodes. In instances where surface approximation is used in geometry bitstream 203, surface approximation synthesis unit 310 may determine a surface model based on syntax elements parsed from geometry bitstream 203 and based on the octree.

Furthermore, geometry reconstruction unit 312 may perform a reconstruction to determine coordinates of points in a point cloud. For each position at a leaf node of the octree, geometry reconstruction unit 312 may reconstruct the node position by using a binary representation of the leaf node in the octree. At each respective leaf node, the number of points at the respective leaf node is signaled; this indicates the number of duplicate points at the same voxel position. When geometry quantization is used, the point positions are scaled for determining the reconstructed point position values.

As illustrated, geometry reconstruction unit 312 may include planar mode/angular mode unit 313. In one or more examples, planar mode/angular mode unit 313 may be configured to perform one or more example techniques described in this disclosure, such as described with respect to FIG. 8. The inclusion of planar mode/angular mode unit 313 is provided as one example and should not be considered as limiting. Although the example techniques are illustrated with respect to planar mode/angular mode unit 313, in some examples, the example techniques may be performed by geometry arithmetic decoding unit 302.

Inverse transform coordinate unit 320 may apply an inverse transform to the reconstructed coordinates to convert the reconstructed coordinates (positions) of the points in the point cloud from a transform domain back into an initial domain. The positions of points in a point cloud may be in floating point domain but point positions in G-PCC codec are coded in the integer domain. The inverse transform may be used to convert the positions back to the original domain.

Additionally, in the example of FIG. 3, inverse quantization unit 308 may inverse quantize attribute values. The attribute values may be based on syntax elements obtained from attribute bitstream 205 (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. RAHT decoding is done from the top to the bottom of the tree. At each level, the low and high frequency coefficients that are derived from the inverse quantization process are used to derive the constituent values. At the leaf node, the values derived correspond to the attribute values of the coefficients. The weight derivation process for the points is similar to the process used at G-PCC encoder 200. Alternatively, LOD generation unit 316 and inverse lifting unit 318 may determine color values for points of the point cloud using a level of detail-based technique. LOD generation unit 316 decodes each LOD giving progressively finer representations of the attribute of points. With a predicting transform, LOD generation unit 316 derives the prediction of the point from a weighted sum of points that are in prior LODs, or previously reconstructed in the same LOD. LOD generation unit 316 may add the prediction to the residual (which is obtained after inverse quantization) to obtain the reconstructed value of the attribute. When the lifting scheme is used, LOD generation unit 316 may also include an update operator to update the coefficients used to derive the attribute values. LOD generation unit 316 may also apply an inverse adaptive quantization in this case.

Furthermore, in the example of FIG. 3, inverse transform color unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, inverse transform color unit 322 may transform color information from the YCbCr color space to the RGB color space.

The various units of FIG. 2 and FIG. 3 are illustrated to assist with understanding the operations performed by G-PCC encoder 200 and G-PCC decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

The following describe planar, angular, and azimuthal coding modes in G-PCC. As introduction, the planar coding mode first proposed in Sebastien Lasserre, David Flynn, "[GPCC] Planar mode in octree-based geometry coding," ISO/IEC JTC1/SC29/WG11 MPEG/m48906, Gothenburg, Sweden, July 2019 and was adopted in Sebastien Lasserre, Jonathan Taquet, "[GPCC] CE13.22 report on planar coding mode," ISO/IEC JTC1/SC29/WG11 MPEG/m50008, Geneva, Switzerland, October 2019 at the 128th MPEG meeting in Geneva, Switzerland.

The angular coding mode first proposed in Sebastien Lasserre, Jonathan Taquet, "[GPCC][CE 13.22 related] An improvement of the planar coding mode," ISO/IEC JTC1/SC29/WG11 MPEG/m50642, Geneva, CH, October 2019, and was adopted in Sebastien Lasserre, Jonathan Taquet, "[GPCC] CE 13.22 report on angular mode," ISO/IEC JTC1/SC29/WG11 MPEG/m51594, Brussels, Belgium, January 2020 at the 129th MPEG meeting in Brussels, Belgium, and enhances the coding efficiency of the planar mode by using the sensor characteristics of a typical LiDAR sensor. The angular coding mode is optionally used together with the planar mode and improves the coding of the vertical (z) plane position syntax element by employing knowledge of positions and angles of sensing laser beams in a typical LiDAR sensor. Furthermore, the angular coding mode can optionally be used to improve the coding of vertical z-position bits in inferred direct coding mode (IDCM).

In a separate contribution in Geert Van der Auwera, Bappaditya Ray, Louis Kerofsky, Adarsh K. Ramasubramonian, Marta Karczewicz, "[GPCC][New Proposal] Angular mode simplifications and HLS refinements," ISO/IEC JTC1/SC29/WG11 MPEG/m53693, Teleconference (previously Alpbach meeting), April 2020, the context derivation for the angular coding mode was simplified, and the HLS (high level syntax) coding of sensor data parameters was made more efficient. The angular mode descriptions in the following are based on the original MPEG contributions documents (e.g., Sebastien Lasserre, Jonathan Taquet, "[GPCC] [CE 13.22 related] An improvement of the planar coding mode," ISO/IEC JTC1/SC29/WG11 MPEG/m50642, Geneva, CH, October 2019 and Sebastien Lasserre, Jonathan Taquet, "[GPCC] CE 13.22 report on angular mode," ISO/IEC JTC1/SC29/WG11 MPEG/m51594, Brussels, Belgium, January 2020) and the GPCC DIS text (e.g., G-PCC DIS, ISO/IEC JTC1/SC29/WG11 w55637, Teleconference, November 2020).

The azimuthal coding mode first proposed in Sebastien Lasserre, Jonathan Taquet, "[GPCC] [CE13.22 related] The azimuthal coding mode," ISO/IEC JTC1/SC29/WG11 MPEG/m51596, Brussels, Belgium, January 2020, and was adopted in Sebastien Lasserre, Jonathan Taquet, "[GPCC] [CE 13.22] Report on azimuthal coding mode," ISO/IEC JTC1/SC29/WG11 MPEG/m52958, Teleconference (previously Alpbach meeting), April 2020 at the 130th MPEG teleconference meeting. The azimuthal coding mode is similar to the angular mode and extends it to the coding of the (x) and (y) plane position syntax elements of the planar mode and improves the coding of the x- or y-position bits in IDCM.

In a separate contribution, Geert Van der Auwera, Bappaditya Ray, Adarsh K. Ramasubramonian, Marta Karczewicz, "[GPCC][New Proposal] Planar and azimuthal coding mode simplifications," ISO/IEC JTC1/SC29/WG11 MPEG/m54694, Teleconference, July 2020, at the 131$^{st}$ MPEG teleconference meeting, the number of contexts used in the azimuthal mode was significantly reduced. Another contribution is Wei Zhang, Zexing Sun, Mary-Luc Champel, "[G-PCC]EE13.37 report on planar coding improvement," ISO/IEC JTC1/SC29/WG11 MPEG/m53693, Teleconference (previously Geneva meeting), June 2020. The phrase "angular mode" may also refer to azimuthal mode in this description.

The following describes planar coding mode in G-PCC DIS, ISO/IEC JTC1/SC29/WG11 w55637, Teleconference, November 2020. For instance, the specification related to planar coding mode is summarized in G-PCC DIS, ISO/IEC JTC1/SC29/WG11 w55637, Teleconference, November 2020 as follows:

8.2.3.1 Eligibility of a Node for Planar Coding Mode

Explicit coding of occupancy planes is conditioned on the probability of XXX.

The array PlanarRate, with elements PlanarRate[k], for k=0 . . . 2, is an estimate of the probability that the occupancy of a node forms a single plane perpendicular to the k-th axis.

The variable LocalDensity is an estimate of the mean number of occupied children in a node.

The variable NumNodesUntilPlanarUpdate counts the number of nodes to be parsed before updating PlanarRate and LocalDensity.

[XXX entropy state continuation]

At the start of parsing a geometry_octree syntax structure, PlanarRate and LocalDensity are initialised as follows:

for (k=0; k<3; k++)
  PlanarRate[k]=1024
LocalDensity=4096
NumNodesUntilPlanarUpdate=0

At the start of parsing each geometry_octree_node syntax structure, NumNodesUntilPlanarUpdate is decremented. If NumNodesUntilPlanarUpdate is less than zero, PlanarRate and LocalDensity are updated as follows:

The number of occupied sibling nodes is determined and used to update the LocalDensity estimate:

let numSiblings=NodeNumChildren[depth−1][sNp][tNp][vNp]
LocalDensity=(255×LocalDensity+1024×numSiblings)>>8
  The number of nodes until the next update is:
NumNodesUntilPlanarUpdate=numSiblings−1 XXX The parent node's occupancy information is used to determine, along each axis, the presence of a single occupied plane and to update the corresponding planar probability estimate PlanarRate[k].

let parentOccupancy=GeometryNodeOccupancy[depth−1][sNp][tNp][vNp]
let planeMasks0={0xf0, 0xcc, 0xaa}
let planeMasks1={0x0f, 0x33, 0x55}

```
for (k = 0; k < 3; k++) {
   let plane0 = (parentOccupancy & planeMaks0[k]) != 0
   let plane1 = (parentOccupancy & planeMaks1[k]) != 0
   let hasSinglePlane = plane0 ^ plane 1
   PlanarRate[k] = (255 × PlanarRate[k] + 8 × 256 × hasSinglePlane + 128) >> 8
}
```

At the start of parsing each geometry_octree_node syntax structure, it is determined for each axis if the current node is eligible to signal plane information. The output of this process is the array PlanarEligible, with elements PlanarEligible[k], for k=0 . . . 2.

First, PlanarRate is used to determine the order, planeOrder[k], of the three planes from most to least likely according to Table 18.

Then, PlanarEligible is set as follows:

```
for (k = 0; k < 3; k++) {
   if (EffectiveNodeSizeLog2[k] <= 0)
      PlanarEligible[k] = 0
   else if (!geom_tree_coded_axis_flag[depth][k])
      PlanarEligible[k] = 0
   else if (!geometry_planar_enabled_flag)
      PlanarEligible[k] = 0
   else if (XXX angular mode linkage XXX)
      PlanarEligible[k] = XXX
```

-continued

```
    else if (LocalDensity >= 3 × 1024)
        PlanarEligible[k] = 0
    else
        PlanarEligible[k] = PlanarRate[k] > geom_planar_th
        [planeOrder[k]]
}
```

TABLE 18

Determination of the values of planeOrder[ k ] from planarRate[ k ]

| Condition | planeOrder[ 0 ] | planeOrder[ 1 ] | planeOrder[ 2 ] |
|---|---|---|---|
| PlanarRate[0] ≥ PlanarRate[1] ≥ PlanarRate[2] | 0 | 1 | 2 |
| PlanarRate[0] ≥ PlanarRate[2] > PlanarRate[1] | 0 | 2 | 1 |
| PlanarRate[1] > PlanarRate[0] ≥ PlanarRate[2] | 1 | 0 | 2 |
| PlanarRate[1] ≥ PlanarRate[2] > PlanarRate[0] | 1 | 2 | 0 |
| PlanarRate[2] > PlanarRate[0] ≥ PlanarRate[1] | 2 | 0 | 1 |
| PlanarRate[2] > PlanarRate[1] > PlanarRate[0] | 2 | 1 | 0 |

A syntax element is signalled into the bitstream:

is_planar_flag[ axisIdx ] equal to 1 indicates that the positions of the current node's children form a single plane perpendicular to the axisIdx-th axis.
is_planar_flag[ axisIdx ] equal to 0, when present, indicates that the positions of the current node's children occupy both planes perpendicular to the axisIdx-th axis.

The context index (ctxIdx) for coding the is_planar_flag is specified in Table 37 in G-PCC DIS, ISO/IEC JTC1/SC29/WG11 w55637, Teleconference, November 2020, where it is set equal to axisIdx.

8.2.3.2 Buffer Tracking the Closest Nodes Along an Axis

The arrays PlanarPrevPos, PlanarPlane, IsPlanarNode record information about previously decoded geometry tree nodes for use in the determination of ctxIdx for the syntax element plane_position. When either geometry_planar_enabled_flag is equal to 0 or planar_buffer_disabled_flag is equal to 1, the arrays are not used by the decoding process.

In this process, the variable axisIdx is used to represent one of the three coded axes, the variable axisPos represents the position of a node along the axisIdx-th axis.

Values of axisPos are in the range 0 . . . 0x3fff.

The array IsPlanarNode, with values IsPlanarNode[axisIdx][axisPos] indicates whether the most recently decoded node with an axisIdx-th position component equal to axisPos is planar in the plane perpendicular to the axisIdx-th axis.

The array PlanarPrevPos, with values PlanarPrevPos[axisIdx][axisPos] storing the maximum position component of the most recently decoded node with an axisIdx-th position component equal to axisPos.

The array PlanarPlane, with values PlanarPlane[axisIdx][axisPos] indicates the value of plane_position[axisIdx] for the most recently decoded node with an axisIdx-th position component equal to axisPos.

At the start of each geometry tree level, each element of the arrays PlanarPrevPos and IsPlanarNode is initialized to 0.

XXX After decoding each geometry_planar_mode_data syntax structure with parameters childIdx and axisIdx, the arrays PlanarPrevPos, PlanarPlane and IsPlanarNode are updated as follows:

The variable axisPos representing a position along the axisIdx-th axis is derived as follows:
if (axisIdx==0) axisPos=sN & 0x3fff
if (axisIdx==1) axisPos=tN & 0x3fff
if (axisIdx==2) axisPos=vN & 0x3fff The array entries corresponding to the node are updated as follows:
if (axisIdx==0) maxPos=Max(tN & 0x7c0, vN & 0x7c0)>>3
if (axisIdx==1) maxPos=Max(sN & 0x7c0, vN & 0x7c0)>>3
if (axisIdx==2) maxPos=Max(sN & 0x7c0, tN & 0x7c0)>>3
PlanarPrevPos[axisIdx][axisPos]=maxPos
if (is_planar_flag[axisPos])
    PlanarPlane[axisIdx][axisPos]=plane_position[axisIdx]
IsPlanarNode[axisIdx][axisPos]=is_planar_flag[axisIdx]

8.2.3.3 Determination of ctxIdx for the Syntax Element Plane_Position

The inputs to this process are:
the variable axisIdx identifying the axis normal to a plane, and
the position (sN, tN, vN) of the current node within a geometry tree level.

The output of this process is the variable ctxIdx.

The variable neighOccupied indicates whether there is a node that both neighbours the current node along the axisIdx-th axis. It is derived as follows: XXX neighOccupied=(NeighbourPattern>>2×axisIdx) & 3
adjPlaneCtxInc=neighOccupied==3?0: neighOccupied
if (axisIdx==0 && neighOccupied==3)
    adjPlaneCtxInc=((neighOccupied & 1)<<1) (neighOccupied>>1)

When planar_buffer_disabled_flag is equal to 1, the value of ctxIdx is set equal to adjPlaneCtxInc and no further processing is performed by this process. Otherwise, the remainder of this clause applies.

The variable axisPos indicates the 14 least significant position bits of the current node along the axisIdx-th axis:
if (axisIdx==0) axisPos=sN & 0x3fff
if (axisIdx==1) axisPos=tN & 0x3fff
if (axisIdx==2) axisPos=vN & 0x3fff The variable dist represents a distance between the current node and the most recently decoded node position with the same value of axisPos along the axisIdx-th axis. It is derived as follows:
a=PlanarPrevPos[axisIdx][axisPos]
if (axisIdx==0) b=Max(tN & 0x7c0, vN & 0x7c0)>>3
if (axisIdx==1) b=Max(sN & 0x7c0, vN & 0x7c0)>>3
if (axisIdx==2) b=Max(sN & 0x7c0, tN & 0x7c0)>>3
dist=Abs(a−b)

The context index ctxIdx is derived as follows:

```
if (!IsPlanarNode[axisIdx][axisPos])
    ctxIdx = adjPlaneCtxInc
else {
    prevPlane = PlanarPlane[axisIdx][axisPos]
    distCtxInc = (dist > 1)
    ctxIdx = 12 × axisIdx + 4 × adjPlaneCtxInc + 2 × distCtxInc +
    prevPlane + 3
}
```

8.2.3.4 Determination of planePosIdxAzimuthalS and planePosIdxAzimuthalT for the Coding of the Horizontal Plane Positions The determination of planePosIdxAngularS for the arithmetic coding of plane_position[0] and of planePosIdxAngularT for the arithmetic coding of plane_position[1] is obtained as follows.

When geometry_angular_enabled_flag is equal to 0, the values of both planePosIdxAzimuthalS and planePosIdxAzimuthalT are set equal to planePosIdx. Otherwise, the following applies:

```
if (contextAzimuthalS == -1)
    planePosIdxAzimuthalS = planePosIdx
else
    planePosIdxAzimuthalS = 39 + contextAzimuthalS
if (contextAzimuthalT == -1)
    planePosIdxAzimuthalT = planePosIdx
else
``` planePosIdxAzimuthalT=39+contextAzimuthalT

The determination of contextAngular for the arithmetic coding of plane_position[2] is performed as described in XREF.

8.2.3.5 Determination of planePosIdxAngular for the Coding of the Vertical Plane Position The determination of planePosIdxAngular for the arithmetic coding of plane_position[2] is obtained as follows.

When geometry_angular_enabled_flag is equal to 0, the value of planePosIdxAngular is set equal to planePosIdx. Otherwise, the following applies:

```
if (contextAngular == -1)
    planePosIdxAngular = planePosIdx
else
``` planePosIdxAngular=47+contextAngular

The determination of contextAngular for the arithmetic coding of plane_position[2] is performed as described in section 8.2.5.3.

The following describes angular and azimuthal modes in G-PCC DIS, ISO/IEC JTC1/SC29/WG11 w55637, Teleconference, November 2020. For the Angular mode syntax, the syntax elements that carry the Lidar laser sensor information that are required for the angular coding mode to have any coding efficiency benefits are shown between <ANGULAR CODING MODE> . . . </ANGULAR CODING MODE> in Table 2. The semantics of these syntax elements is specified as follows in G-PCC DIS, ISO/IEC JTC1/SC29/WG11 w55637, Teleconference, November 2020:

geometry_planar_enabled_flag equal to 1 indicates that the planar coding mode is activated. geometry_planar_enabled_flag equal to 0 indicates that the planar coding mode is not activated. When not present, geometry_planar_enabled_flag is inferred to be 0.

geom_planar_th[i], for i in the range 0 . . . 2, specifies the value of the threshold of activation for planar coding mode along the i-th most probable direction for the planar coding mode to be efficient.

geom_idem_rate_minus1 specifies the rate at which nodes may be eligible for direct coding. When not present, geom_idcm_rate_minus1 is inferred to be 31.

The array IdcmEnableMask is derived as follows:

```
for (i = 0, acc = 0; i < 32; i++) {
    acc += geom_idcm_rate_minus1 + 1
    IdcmEnableMask[i] = acc >= 32
    acc &= 0x1f
}
``` geometry_angular_enabled_flag equal to 1 indicates that the angular coding mode is activated. geometry_angular_enabled_flag equal to 0 indicates that the angular coding mode is not activated.

geom_slice_angular_origin_present_flag equal to 1 specifies that a slice relative angular origin is present in the geometry data unit. geom_slice_angular_origin_present_flag equal to 0 specifies that an angular origin is not present in the geometry data unit. When not present, geom_slice_angular_origin_present_flag is inferred to be 0.

geom_angular_origin_bits_minus1 plus 1 is the length in bits of the syntax elements geom_angular_origin_xyz[k].

geom_angular_origin_xyz[k] specifies the k-th component of the (x, y, z) co-ordinate of the origin used in the processing of the angular coding mode. When not present, the value of geom_angular_origin_xyz[k] with k=0 . . . 2 is inferred to be 0.

geom_angular_azimuth_scale_log 2_minus11 and geom_angular_radius_scale_log 2 specify factors used to scale positions coded using a spherical co-ordinate system during conversion to cartesian co-ordinates.

geom_angular_azimuth_step_minus1 plus 1 specifies a unit change in azimuth angle. Differential prediction residuals used in angular predictive tree coding may be partially represented as multiples of geom_angular_azimuth_step_minus1 plus 1. The value of geom_angular_azimuth_step_minus1 shall be less than (1<<(geom_angular_azimuth_scale_log 2_minus11+12)).

number_lasers_minus1 plus 1 specifies the number of lasers used for the angular coding mode.

laser_angle_init and laser_angle_diff[i] with i=0 . . . number_lasers_minus1 specify the tangent of the elevation angle of the i-th laser relative to the horizontal plane defined by the first and second coded axes.

The array LaserAngle[i] with i=0 . . . number_lasers_minus1 is derived as follows:
LaserAngle[0]=laser_angle_init
if(number_lasers_minus1>0)
    LaserAngle[1]=laser_angle_init+laser_angle_diff[1]
for (i=2; i<=number_lasers_minus1; i++)
    LaserAngle[i]=2×LaserAngle[i-1]-LaserAngle[i-2]+laser_angle_diff[i]

It is a requirement of bitstream conformance that the value of LaserAngle[i] with i=1 . . . number_lasers_minus1 shall be greater than or equal to LaserAngle[i-1].

laser_correction_init and laser_correction_diff[i] with i=1 . . . number_lasers_minus1 specify the correction, along the second internal axis, of the i-th laser position relative to the GeomAngularOrigin[2].

laser_phi_per_turn_init_minus1 and laser_phi_per_turn_diff[i] with i=1 . . . number_lasers_minus1 specify the number of samples produced by the i-th laser of a rotating sensing system located at the origin used in the processing of the angular coding mode.

The arrays LaserCorrection[i] and LaserPhiPerTurn[i] with i=1 . . . number_lasers_minus1 are derived as follows:
LaserCorrection[0]=laser_correction_init
LaserPhiPerTurn[0]=laser_phi_per_turn_init_minus1+1

```
for (i = 1; i <= number_lasers_minus1; i++) {
  LaserCorrection[i] = LaserCorrection[i-1] + laser_correction_diff[i]
  LaserPhiPerTurn[i] = LaserPhiPerTurn[i-1] + laser_phi_per_turn_
diff[i]
}
```

It is a requirement of bitstream conformance that the value of LaserPhiPerTurn[i] with i=0 . . . number_lasers_minus1 shall not be 0.

The arrays DeltaPhi[i] and InvDeltaPhi[i] with i=0 . . . number_lasers_minus1 are derived as follows:

```
for (i = 0; i <= number_lasers_minus1; i++) {
  DeltaPhi[i] = 6588397 / LaserPhiPerTurn[i]
  InvDeltaPhi[i] = (LaserPhiPerTurn[i] << 30) / 6588397
}
``` planar_buffer_disabled_flag equal to 1 indicates that tracking the closest nodes using a buffer is not used in process of coding the planar mode flag and the plane position in the planar mode. planar_buffer_disabled_flag equal to 0 indicates that tracking the closest nodes using a buffer is used. When not present, planar_buffer_disabled_flag is inferred to be !geometry_planar_enabled_flag.

TABLE 2

Geometry parameter set syntax. Angular mode syntax elements are highlighted in yellow.

| | Descriptor |
|---|---|
| geometry_parameter_set( ) { | |
|   gps_geom_parameter_set_id | u(4) |
|   gps_seq_parameter_set_id | u(4) |
|   gps_gsh_box_log2_scale_present_flag | u(1) |
|   if( !gps_gsh_box_log2_scale_present_flag) | |
|     gps_gs_box_log2_scale | ue(v) |
|   duplicate_points_enabled_flag | u(1) |
|   geom_tree_type | u(1) |
|   if( geom_tree_type == 0 ) { | |
|     geom_num_points_list_present_flag | u(1) |
|     inferred_direct_coding_mode | u(2) |
|     if( inferred_direct_coding_mode ) | |
|       joint_2point_idcm_enabled_flag | u(1) |
|     geom_tree_coded_axis_list_present_flag | u(1) |
|     log2_neighbour_avail_boundary_minus1 | u(3) |
|     if( log2_neighbour_avail_boundary_minus1 > 0 ) { | |
|       adjacent_child_contextualization_enabled_flag | u(1) |
|       log2_intra_pred_max_node_size | ue(v) |
|     } | |
|     bitwise_occupancy_coding_flag | u(1) |
|     geometry_planar_enabled_flag | u(1) |
|     if( geometry_planar_enabled_flag ){ | |
|       for( i = 0; i < 3; i++) | |
|         geom_planar_th[ i ] | ue(v) |
|       if( inferred_direct_coding_mode == 1 ) | |
|         geom_idcm_rate_minus1 | u(5) |
|     } | |
|   } | |
|   <ANGULAR CODING MODE> | u(1) |
|   geometry_angular_enabled_flag | |
|   if( geometry_angular_enabled_flag ){ | |
|     geom_slice_angular_origin_present_flag | u(1) |
|     if( !geom_slice_angular_origin_present_flag ) { | |
|       geom_angular_origin_bits_minus1 | ue(v) |
|       for(k = 0; k < 3; k++) | |
|         geom_angular_origin_xyz[ k ] | s(v) |
|     } | |
|     if( geom_tree_type == 1 ) { | |
|       geom_angular_azimuth_scale_log2_minus11 | ue(v) |

TABLE 2-continued

Geometry parameter set syntax. Angular mode syntax elements are highlighted in yellow.

| | Descriptor |
|---|---|
|       geom_angular_azimuth_step_minus1 | ue(v) |
|       geom_angular_radius_scale_log2 | ue(v) |
|     } | |
|     number_lasers_minus1 | ue(v) |
|     laser_angle_init | se(v) |
|     laser_correction_init | se(v) |
|     if( geom_tree_type == 0 ) | |
|       laser_phi_per_turn_init_minus1 | ue(v) |
|     for( i = 1; i <= number_lasers_minus1; i++ ) { | |
|       laser_angle_diff[ i ] | se(v) |
|       laser_correction_diff[ i ] | se(v) |
|       if( geom_tree_type == 0 ) | |
|         laser_phi_per_turn_diff[ i ] </ANGULAR CODING MODE> | se(v) |
|     } | |
|     if( geometry_planar_enabled_flag ) | |
|       planar_buffer_disabled_flag | u(1) |
|   } | |
|   geom_scaling_enabled_flag | u(1) |
|   if( geom_scaling_enabled_flag ) { | |
|     geom_base_qp | ue(v) |
|     geom_qp_multiplier_log2 | u(2) |
|     if( geom_tree_type == 1 ) | |
|       geom_qp_offset_intvl_log2 | ue(v) |
|     else if( inferred_direct_coding_mode ) | |
|       geom_direct_coding_mode_qp_offset | se(v) |
|   } | |
|   gps_extension_flag | u(1) |
|   if( gps_extension_flag ) | |
|     while( more_data_in_data_unit( ) ) | |
|       gps_extension_data_flag | u(1) |
|   byte_alignment( ) | |
| } | |

The data syntax of the planar mode and direct mode is included in Table 3 and Table 4, respectively.

TABLE 3

Geometry octree mode data syntax

| | Descriptor |
|---|---|
| geometry_node( depth, nodeIdx, sN, tN, vN ) { | |
|   if( geom_node_qp_offset_present_flag ) { | |
|     geom_node_qp_offset_abs_gt0_flag | ae(v) |
|     if( geom_node_qp_offset_abs_gt0_flag ) { | |
|       geom_node_qp_offset_abs_minus1 | ae(v) |
|       geom_node_qp_offset_sign_flag | ae(v) |
|     } | |
|   } | |
|   <ANGULAR CODING MODE> if( geometry_planar_enabled_flag ) | |
|     for( k = 0; k < 3; k++ ) { | |
|       if( PlanarEligible[ k ] ) { | |
|         is_planar_flag[ k ] | ae(v) |
|         if( is_planar_flag[ k ] ) | |
|           plane_position [ k ] | ae(v) |
|     } </ANGULAR CODING MODE> | |
|   if( DirectModeFlagPresent ) | |
|     direct_mode_flag | ae(v) |
|   if( direct_mode_flag ) | |
|     geometry_direct_mode_data( ) | |
|   else { | |
|     if( OccupancyIdxMaybePresent ) | |
|       single_child_flag | ae(v) |
|     if( single_child_flag ) | |
|       for( k = 0; k < 3; k++ ) | |
|         if( ! isPlanar[ k ] ) | |
|           occupancy_idx[ k ] | ae(v) |
|     if( OccupancyMapPresent ) | |
|       if( bitwise_occupancy_flag ) | |

TABLE 3-continued

Geometry octree mode data syntax

| | Descriptor |
|---|---|
| occupancy_map | ae(v) |
| else | |
| occupancy_byte | de(v) |
| if( LeafNode && duplicate_points_enabled_flag ) | |
| for( child = 0; child < NumChildren; child++ ) { | |
| [Ed: there are two instances of dup_point_cnt_gt0_flag, they are the same flag, but signalled in different places...] | ae(v) |
| dup_point_cnt_gt0_flag[ child ] | |
| if( dup_point_cnt_gt0_flag[ child ] ) | |
| dup_point_cnt_minus1[ child ] | ae(v) |
| } | |
| } | |
| } | |

TABLE 4

Direct mode data syntax

| | Descriptor |
|---|---|
| geometry_direct_mode_data( ) { | |
| direct_point_cnt_eq2_flag | ae(v) |
| if( duplicate_points_enabled_flag && !direct_point_cnt_eq2_flag ) { | |
| dup_point_cnt_gt0_flag | ae(v) |
| if( dup_point_cnt_gt0_flag ) { | |
| dup_point_cnt_gt1_flag | ae(v) |
| if( dup_point_cnt_gt1_flag ) | |
| dup_point_cnt_minus2 | ae(v) |
| } | |
| } | |
| if( joint_2point_idcm_enabled_flag && direct_point_cnt_eq2_flag ) | |
| geometry_direct_mode_joint_2points( ) | |
| for( i = 0; i <= direct_point_cnt_eq2_flag; i++ ) { | |
| if( geometry_angular_enabled_flag ) | |
| geometry_direct_mode_angular( i ) | |
| else | |
| for( k = 0; k < 3; k++ ) | |
| geometry_direct_mode_offset( i, k ) | |
| } | |
| } | |

8.2.4.1 Derivation Process of the Angular Eligibility for a Node

If geometry_angular_enabled_flag is equal to 0, angular_eligible is set to equal to 0.

Otherwise, the following applies:

The variable deltaAngle specifying the minimum angular distance between the lasers is derived as follows:
deltaAngle=128<<18

```
for(i=0; i<number_lasers_minus1; i++){
    delta = LaserAngle[i + 1] – LaserAngle[i]
    if ( deltaAngle > delta )
        deltaAngle = delta
}
```

Finally, angular_eligible is derived as follows:
midNodeS=1<<(Max(1, ChildNodeSize Log 2[0])-1)
midNodeT=1<<(Max(1, ChildNodeSize Log 2[1])-1)
sLidar=Abs(((sNchild−GeomAngularOrigin[0]+midNodeS)<<8)−128)
tLidar=Abs(((tNchild−GeomAngularOrigin[1]+midNodeT)<<8)−128)
rL1=(sLidar+tLidar)>>1
deltaAngleR=deltaAngle×rL1
midNodeV=1<<(Max(1, ChildNodeSize Log 2[2])-1)

```
if ( number_lasers_minus1 > 0 && deltaAngleR <= (midNodeV << 26))
    angular_eligible = 0
else
``` angular_eligible 1

8.2.4.2 Derivation Process of Laser Index laserIndex Associated with a Node
XXX inputs/outputs
If the angular eligibility angular_eligible is equal to 0, then laserIndex index is set to a preset value UNKOWN_LASER.

Otherwise, if the angular eligibility angular_eligible is equal to 1, the following applies as a continuation of the process described in 8.2.5.1.

Firstly, the inverse rInv of the radial distance of the current node from the Lidar is determined as follows:
r2=sLidar×sLidar+tLidar×tLidar
rInv=IntRecipSqrt(r2) Then an angle theta32 is determined as follows:
vLidar=((vNchild−GeomAngularOrigin[2]+midNodeT)<<1)−1
theta=vLidar×rInv
theta32=theta>=0?theta>>15: −((−theta)>>15)

Finally, the angular eligibility and the associated laser are determined as follows, based on the parent node, Parent.
laserIndex=UNKOWN_LASER
if (!number_lasers_minus1)
    laserIndex=0
else if (laserIndex[Parent]==UNKOWN_LASER||deltaAngleR<=(midNodeV<<(26+2))) {

```
for (i = 1; i < number_lasers_minus1; i++)
    if (LaserAngle[i] > theta32)
        break
    if (theta32 − LaserAngle[i-1] <= LaserAngle[i] − theta32)
        i--
    laserIndex = LaserAngle[i]
}
```

8.2.4.3 Derivation Process of the Contexts contextAzimuthalS and contextAzimuthalT for Planar Coding Mode
XXX inputs/outputs
The following applies as a continuation of the process described in 8.2.5.2.

Firstly, two angles are determined from the node position relative to the angular origin
sPos=sNchild−GeomAngularOrigin[0] XXX
tPos=tNchild−GeomAngularOrigin[1]
phiNode=IntAtan2(tPos+midNodeT, sPos+midNodeS)
phiNode0=IntAtan2(tPos, sPos)

Secondly, an azimuthal predictor is obtained from the array phiBuffer predPhi=phiBuffer[laserIndex]
if (predPhi==0x80000000)
    predPhi=phiNode The two azimuthal contexts are initialized as follows
contextAzimuthalS=−1
contextAzimuthalT=−1

Then, if the predictor predPhi is not equal to 0x80000000, the following applies to refine the two azimuthal contexts
Nshift=((predPhi−phiNode)*InvDeltaPhi[laserIndex]+536870912)>>30
predPhi−=DeltaPhi[laserIndex] *Nshift
angleL=phiNode0−predPhi angleR=phiNode−predPhi
contextAnglePhi=(angleL>=0 && angleR>=0)||(angleL<0 && angleR<0)?2:0
angleL=Abs(angleL)
angleR=Abs(angleR)

```
if (angleL > angleR) {
   contextAnglePhi++
   int temp = angleL
   angleL = angleR
   angleR = temp
}
if (angleR > (angleL << 2))
   contextAnglePhi += 4
if (Abs(sPos) <= Abs(tPos))
   contextAzimuthalS = contextAnglePhi
else
   contextAzimuthalT = contextAnglePhi
```

8.2.4.4 Derivation Process of the Context contextAngular for Planar Coding Mode
XXX inputs/outputs
If the laser index laserIndex is equal to UNKOWN_LASER, then contextAngular is set to a preset value UNKOWN_CONTEXT. Otherwise, if the laser index laserIndex is not equal to UNKOWN_LASER, the following applies as a continuation of the process described in 8.2.5.2.
Firstly, two angular differences thetaLaserDeltaBot and thetaLaserDeltaTop relative to a lower plane and an upper plane are determined.
thetaLaserDelta=LaserAngle[laserIndex]−theta32
Hr=LaserCorrection[laserIndex]×rInv;
thetaLaserDelta+=Hr>=0?−(Hr>>17): ((−Hr)>>17)
vShift=(rInv<<ChildNodeSize Log 2[2])>>20 XXX
thetaLaserDeltaTop=thetaLaserDelta−vShift
thetaLaserDeltaBot=thetaLaserDelta+vShift
Then, the angular context is deduced from the two angular differences.
contextAngular=thetaLaserDelta<0
if (thetaLaserDeltaTop>=0||thetaLaserDeltaBot<0)
   contextAngular+=2
When in-tree quantization and angular mode are jointly enabled, a scaled version of one or more of effective node sizes, point positions, and offsets may be used in the context derivation for planar mode to ensure that the positions/offsets/node sizes and the angular origin are used at the same scale; e.g., this may be useful in the proper derivation of the laser index and in the context derivation. In some cases, not using the scaled values may result in improper derivation of the laser indices or the contexts.

The following describes inferred direction coding mode (IDCM). The syntaxes related to IDCM mode are defined in G-PCC DIS, ISO/IEC JTC1/SC29/WG11 w55637, Teleconference, November 2020 as follows:
inferred_direct_coding_mode greater than 0 indicates that direct_mode_flag may be present in the geometry node syntax. inferred_direct_coding_mode equal to 0 indicates that direct_mode_flag is not present in the geometry node syntax.
joint_2point_idcm_enabled_flag equal to 1 indicates that the joint coding of two points is activated in direct coding mode. joint_2point_idcm_enabled_flag equal to 0 indicates that the joint coding of two points is not activated.
geom_idcm_rate_minus1 specifies the rate at which nodes may be eligible for direct coding. When not present, geom_idcm_rate_minus1 is inferred to be 31.

The array IdcmEnableMask is derived as follows:

```
for (i = 0, acc = 0; i < 32; i++) {
   acc += geom_idcm_rate_minus1 + 1
   IdcmEnableMask[i] = acc >= 32
   acc &= 0×1f
}
``` direct_point_cnt_eq2_flag equal to 1 specifies that the current node contains two point_offset values representing the residuals of two coded points. direct_point_cnt_eq2_flag equal to 0 specifies that the current node contains a single point_offset value representing the residuals of a single point position duplicated zero or more times.
dup_point_cnt_gt0_flag, dup_point_cnt_gt1_flag, and dup_point_cnt_minus2 together specify the number of times a single point_offset value is repeated in order to represent multiple points with the same position in the reconstructed point cloud. Any of dup_point_cnt_gt0_flag, dup_point_cnt_gt1_flag, or dup_point_cnt_minus2 that are not present are inferred to be 0.
The variable DirectDupPointCnt representing the number of times a point is repeated is derived as follows:
DirectDupPointCnt=dup_point_cnt_gt0_flag+dup_point_cnt_gt1_flag+dup_point_cnt_minus2
The array PointOffset, with elements PointOffset[i][k] for i=0 . . . NumDirectPoints−1 and k=0 . . . 2, represents the position of the k-th dimension of the i-th point relative to the current node's full resolution position. PointOffset[i][k] consists of EffectiveNodeSize Log 2[k] bits and is derived as follows.
The variable NodeSize Log 2Rem[k] indicates the number of bits that remain to be derived for PointOffset[i][k] independently on i. Initialization of NodeSize Log 2Rem and the array PointOffset is performed by, for each value of i, NodeSize Log 2Rem[k]=EffectiveNodeSize Log 2[k]
for (k=0; k<3; k++)
   PointOffset[i][k]=0
If is_planar_flag[k] is equal to 1, then the most significant bit of PointOffset[i][k] is derived from plane_position[k]:
for (k=0; k<3; k++)

```
if (is_planar_flag[k]) {
   for (i = 0; i < NumDirectPoints; i++)
      PointOffset[i][k] = plane_position[k]
   NodeSizeLog2Rem[k]−−
}
``` same_bit[k][j] equal to 1 specifies that the respective j-th bits of PointOffset[0][k] and PointOffset[1][k] are equal. same_bit[k][j] equal to 0 specifies that these two j-th bits are not equal.
value_bit[k][j] indicates the value of the j-th bit of PointOffset[0][k]. When value_bit[k][j] is not present, its value is inferred to be 0.
The variable EligTwoPoints[k] equal to 1 indicates that the k-th component of the points contained by the node is eligible for joint coding of two points. EligTwoPoints[k] equal to 0 indicates that the k-th component of the points contained by the node is not eligible for joint coding of two points.
The variable samePrecComp[k] equal to 1 indicates that the components 0 to k−1 of the two points contained by the node are equal. Otherwise, samePrecComp[k] equal to 0 indicates that one of the components 0 to k−1 of the two points differs. samePrecComp[k] is initialized to 1. for (k=0; k<3; k++)

samePrecComp[k]=1

If joint coding of two points is activated, if two points are present in the node and if the k-th component is eligible for joint coding, then joint two-point coding is performed for this component.

if (joint_2point_idcm_enabled_flag && direct_point_cnt_eq2_flag)

```
for (k = 0; k < 3; k++){
  if (EligTwoPoints[k]){
    for (j = NodeSizeLog2Rem[k]-l; j>=0; j--) {
      PointOffset[0][k] << 1
      PointOffset[1][k] << 1
      PointOffset[0][k] += bit_value[k][j]
      PointOffset[1][k] += !same_bit[k][j] ^ bit_value[k][j]
      NodeSizeLog2Rem[k]--
      if (!same_bit[k][j]){
        for (k2 = k + 1;k2 < 3; k2++)
          samePrecComp[k2] = 0
        break
      }
    }
  }
}
``` point_offset[i][k][j] is the j-th bit of the k-th component of the current node's i-th point's respective s, t, and v co-ordinates relative to the origin of the current node.

The NodeSize Log 2Rem[k] remaining bits of each point offset are set as follows:

for (k=0; k<3; k++)
  for (j=NodeSize Log 2Rem[k]−1; j>0; j−−)
    PointOffset[i][k]=(PointOffset[i][k]<<1)+point_offset[i][k][j]

laser_residual_abs_gt0_flag[ptIdx], laser_residual_sign[ptIdx], laser_residual_abs_gt1_flag[ptIdx], laser_residual_abs_gt2_flag[ptIdx], and laser_residual_abs_minus3[ptIdx] together specify the residual laser index value associated with the ptIdx-th point of the current node that uses the inferred direct coding mode when geometry_angular_enabled_flag is equal to 1. Any of laser_residual_abs_gt0_flag[ptIdx], laser_residual_sign[ptIdx], laser_residual_abs_gt1_flag[ptIdx], laser_residual_abs_gt2_flag[ptIdx], and laser_residual_minus3[ptIdx] that are not present are inferred to be 0.

The following describes the parsing process of IDCM mode as defined in section 10.8 of G-PCC DIS, ISO/IEC JTC1/SC29/WG11 w55637, Teleconference, November 2020 as follows:

10.8 Inferred Direct Coding Mode Parsing Process 10.8.1 General Process

The parsing and inverse binarization of the syntax elements same_bit[k][j] value_bit[k][j], and point_offset[i][k][j] for a point index i, a component index k, and a bit index j is described in subclauses 9.8.2 to 9.8.5.

The output of the process is the offsets of the one, in case direct_point_cnt_eq2_flag value is 0, or two, in case direct_point_cnt_eq2_flag value is 1, points belonging to the current node. These offsets are PointOffset[0][k] for the first point and PointOffset[1][k] for the second point, when present.

Each offset PointOffset[i][k] is made of EffectiveNodeSize Log 2[k] bits that are decoded from the most significant bit to the least significant bit for each component k and each point i. For this purpose, the IDCM process makes use of the following variable the number of bits NodeSize Log 2Rem[k] that remain to be decoded for the offset of the component k, independently on the point index the partial decoding partialOffset[i][k] of k-th component of the i-th point At any step in the process, the value of the partialOffset[i][k] represents the EffectiveNodeSize Log 2[k]−NodeSize Log 2Rem[k] most significant bits of PointOffset[i][k]. During the process, partialOffset bits are determined one by one while NodeSize Log 2Rem[k] decreases, by one for each determined bit, to reach the final state where NodeSize Log 2Rem[k] is equal to 0, and partialOffset [i][k] is equal to PointOffset[i][k].

The IDCM process proceeds through subclauses 9.8.2 to 9.8.5 under the following order and conditions subclause 9.8.2 for initialization of the process variables and the inference of the most significant bit of the point offset by planar mode then, if joint coding of two points is activated (joint_2point_idcm_enabled_flag is equal to 1) and there are two points (direct_point_cnt_eq2_flag is equal to 1) in the current node, subclause 9.8.3 then, if the angular mode is activated (geometry_angular_enabled_flag is equal to 1) subclause 9.8.4, otherwise (geometry_angular_enabled_flag is equal to 0) subclause 10.8.2 Initialization and Planar Inference The number of remaining bits and partial offset are initialized by, for all component k and point i,

```
for (k = 0; k < 3; k++){
  NodeSizeLog2Rem[k] = EffectiveNodeSizeLog2[k]
  for (i = 0; i < direct_point_cnt_eq2_flag; i++)
    partialOffset[i][k] = 0
}
```

The most significant bit of the point offsets is inferred by the planar mode, if available (is_planar_flag[k] is equal to 1), as follows for (k=0; k<3; k++)

```
if (NodeSizeLog2Rem[k]>0 && is_planar_flag[k]) {
  for (i = 0; i < direct_point_cnt_eq2_flag; i++)
    partialOffset [i] [k] = plane_position[k]
  NodeSizeLog2Rem[k]--
}
```

In case angular coding mode is activated, the variable byPassSorT, indicating which of the S or T component is allowed to be bypass coded is determined using the horizontal position of the current node in the co-ordinates used in the processing of the angular coding mode

```
if (geometry_angular_enabled_flag) {
  posNode2LidarS = (sN << EffectiveNodeSizeLog2[0]) − GeomAngularOrigin[0]
  posNode2LidarT = (tN << EffectiveNodeSizeLog2[1]) − GeomAngularOrigin[1]
  byPassSorT = Abs(posNode2LidarS) <= Abs(posNode2LidarT)
}
```

10.8.3 Joint Decoding of the Offsets of Two Points

The process in this section applies only when joint_2point_idcm_enabled_flag is equal to 1 and direct_point_cnt_eq2_flag is equal to 1.

Firstly, the values of EligTwoPoints[k], that indicate if the k-th component of the two points is eligible for joint coding, are initialized by for (k=0; k<3; k++)
 EligTwoPoints[k]=!geometry_angular_enabled_flag Then, in case angular coding mode is activated, the eligibility is further determined using the variable byPassSorT

```
if (geometry_angular_enabled_flag) {
    EligTwoPoints[0] = !byPassSorT
    EligTwoPoints[1] = byPassSorT
}
```

The array samePrecComp[k], indicating that the components 0 to k−1 of the two points contained by the node are equal, is initialized to for (k=0; k<3; k++)
 samePrecComp[k]=1

The joint decoding process is then applied to the eligible components in increasing order

```
for (k = 0; k < 3; k++){
    if (NodeSizeLog2Rem[k]>=1 && EligTwoPoints[k]){
        idcmIdxJoint[k][NodeSizeLog2Rem[k]-1] = 0
        same_bit = 1
        for (j = NodeSizeLog2Rem[k]-1; j>=0; j--) {
            partialOffset[0][k] <<= 1
            partialOffset[1][k] <<= 1
            NodeSizeLog2Rem[k]--
``` sameBit=same_bit[k][j]//same_bit[k][j] decoded using context idcmIdxJoint[k][j] idcmIdxJoint[k][j−1]=Min (4, idcmIdxJoint[k][j]+1)
bit=0;

```
if (!(samePrecComp[k] && !sameBit))
    bit = value_bit[k][j] // value_bit[k][j] decoded using bypass
partialOffset[0][k] |= bit;
partialOffset[1][k] |= sameBit ? bit: !bit;
if (!sameBit) {
    for (k2 = k+1;k2 < 3;k2++)
        samePrecComp[k2] = 0
    break
    }
  }
 }
}
```

10.8.4 Angular and Azimuthal Decoding of the Point Offsets

10.8.4.1 General

The process in this section applies only when geometry_angular_enabled_flag is equal to 1. This process applies sub-processes described in the following sub-sections. Subsection 9.8.4.2 is applied once, and then subsections 9.8.4.3 to 9.8.4.6 are applied to each point i belong to the current node.

10.8.4.2 Estimation of the Laser Index Associated with the Current Node

Based on the best knowledge (after planar inference and joint decoding) of the location of the first point belonging to the current node, an estimation laserIndexEstimate of the index of the laser that has probed the points.

Firstly, the best known 3D bestKnownPos location of the first point is obtained by
bestKnownPos[0]=sN<<EffectiveNodeSize Log 2[0]
bestKnownPos[1]=tN<<EffectiveNodeSize Log 2[1]
bestKnownPos[2]=vN<<EffectiveNodeSize Log 2[2]
bestKnownPos[0]+=partialOffset[0][0]<<EffectiveNodeSize Log 2[0]-NodeSize Log 2Rem[0]
bestKnownPos[1]+=partialOffset[0][1]<<EffectiveNodeSize Log 2[1]-NodeSize Log 2Rem[1]
bestKnownPos[2]+=partialOffset[0][2]<<EffectiveNodeSize Log 2[2]-NodeSize Log 2Rem[2]

Secondly, the position bestKnownPos2Lidar[0] of the best known location in the co-ordinates used in the processing of the angular coding mode is deduced by

```
for (k = 0; k < 3; k++) {
    bestKnownPos2Lidar[k] = posNode2Lidar[k] - GeomAngularOrigin[k]
    if (NodeSizeLog2Rem[k])
        bestKnownPos2Lidar[k] += 1 << (nodeSizeLog2Rem[k] - 1)
}
```

Thirdly, the angular value bestKnownAngle associated to this position is determined by
sPoint=bestKnownPos2Lidar[0]<<8
tPoint=bestKnownPos2Lidar[1]<<8
r2=sPoint×sPoint+tPoint×tPoint
rInvPoint=IntRecipSqrt(r2)
bestKnownAngle=bestKnownPos2Lidar  [2]
*rInvPoint>>14

The laser index estimate laserIndexEstimate is obtained as the index of the laser with closest angle to bestKnownAngle as follows for (n=1; n<=number_lasers_minus1; n++)
 if (LaserAngle[n]>bestKnownAngle)
 break
if (bestKnownAngle−LaserAngle[n−1]<=LaserAngle[n]−bestKnownAngle)
 n−−
laserIndexEstimate=number lasers minus1?n: 0

10.8.4.3 Bypass Decoding of a First Component S or T of Point_Offset

The component bypassSorT (whose value is 0 for S, and 1 for T) of the i-th point belonging to the current node is bypass decoded.

```
for (j = NodeSizeLog2Rem[byassSorT] - 1; j > 0; j--){
    partialOffset[i][bypassSorT] <<= 1
    partialOffset[i][bypassSorT] |= point_offset[i][bypassSorT][j]
    NodeSizeLog2Rem[bypassSorT]--
}
```

At the end of this sub-process, NodeSize Log 2Rem [bypassSorT] is equal to 0. There are no more bits to be decoded for the bypassSorT-th component of the point offset, and partialOffset[i][bypassSorT] is equal to the complete point offset PointOffset[i][bypassSorT].

10.8.4.4 Determination of the Laser Index Associated with a Point

A laser index residual laserIndexResidual[i], associated with the i-th point belonging to the current node, is deduced from the decoded values
laserIndexResidual[i]=(1−2×laser_residual_sign_flag)×(laser_residual_abs_gt0_flag+laser_residual_abs_gt1_flag+ laser_residual_abs_gt2_flag+
laser_residual_abs_minus3_flag)

The laser index laserIndex[i], associated with the i-th point belonging to the current node, is then obtained by the sum laserIndex[i]=laserIndexEstimate+laserIndexResidual[i]

It is a requirement of bitstream conformance that laserIndex [i] shall be in the range 0 . . . number_lasers_minus1.

10.8.4.5 Azimuthal Decoding of a Second Component S or T of a Point Offset

The component 1-bypassSorT (whose value is 0 for S, and 1 for T) of the i-th points belonging to the current node is decoded using the azimuthal decoding mode.

The remaining of the point partial offset partialOffset[i] [1-bypassSorT] is iteratively decoded in a loop j on the remaining bits to decoded for the partial offset of the component 1-bypassSorT. In the loop, azimuthal contexts idcmIdxAzimuthal[i][j] are determined and are used to decode the syntax elements point_offset[i][1-bypassSorT] [j]. The position of the point, either posPoint2LidarS[i] or posPoint2Lidart[i] depending on the component involved in azimuthal decoding, is also updated iteratively.

mask=NodeSize Log 2Rem[1-bypassSorT]>0
  ?1<<NodeSize Log 2Rem[1-bypassSorT]-1)
  :0

```
for (j = NodeSizeLog2Rem[1-bypassSorT]-1; mask; j--, mask >>= 1){
  phiR = bypassSorT
      ? IntAtan2(posPoint2LidarT[i], posPoint2LidarS[i] + mask)
      : IntAtan2(posPoint2LidarT[i] + mask, posPoint2LidarS[i])
  phiL = phiNode
  angleL = phiL - predPhi
  angleR = phiR - predPhi
  contextAnglePhi = (angleL >= 0 && angleR >= 0) || (angleL < 0 && angleR < 0) ? 2 : 0
  angleL = Abs(angleL)
  angleR = Abs(angleR)
  if (angleL > angleR) {
    contextAnglePhi++
    int temp = angleL
    angleL = angleR
    angleR = temp
  }
  if (angleR > (angleL << 1))
    contextAnglePhi += 4
  idcmIdxAzimuthal[i][j] = contextAnglePhi
  // decode the bin point_offset[i][1-bypassSorT][j] using idcmIdxAzimuthal[i][j]
  partialOffset[i][1-bypassSorT] <<= 1
  partialOffset[i][1-bypassSorT] |= point_offset[i][1-bypassSorT][j]
  if (point_offset[i][1-bypassSorT][j]) {
    if (bypassSorT)
      posPoint2LidarS[i] += mask
    else
      posPoint2LidarT[i] += mask
    phiNode = phiR
    predphi = phiBuffer[laserIndex[i]]
    if (predPhi == 0x80000000)
      predPhi = phiNode
    nShift = ((predPhi - phiNode) * InvDeltaPhi[laserIndex[i]] + 536870912) >> 30
    predPhi -= DeltaPhi [laserIndex [i]] * nShift
  }
}
```

Using the already decoded bits in partial offsets, the best known horizontal position of the point i, in the co-ordinates used in the processing of the angular coding mode, is computed by
posPoint2LidarS[i]=(sN<<EffectiveNodeSize Log 2[0])-GeomAngularOrigin[0]
posPoint2LidarT[i]=(tN<<EffectiveNodeSize Log 2[1])-GeomAngularOrigin[1]
posPoint2LidarS[i]+=partialOffset[i][0]<<NodeSize Log 2Rem[0]
posPoint2LidarT[i]+=partialOffset[i][1]<<NodeSize Log 2Rem[1]

Then, an initial value of an azimuthal predictor predPhi is determined from the buffer phiBuffer.
phiNode=IntAtan2(posPoint2LidarT[i], posPoint2LidarS [i])
predph=phiBuffer[laserIndex[i]]
if (predPhi==0x80000000)
  predPhi=phiNode
nShift=((predPhi-phiNode)*InvDeltaPhi[laserIndex[i]]+536870912)>>30
predPhi-=DeltaPhi[laserIndex[i]] *nShift The buffer phiBuffer[ ] is then updated
phiBuffer[laserIndex[i]]=phiNode 10.8.4.6 Angular Decoding of the Component V of a Point Offset The last component V of the i-th points belonging to the current node is decoded using the angular decoding mode.

The horizontal positions posPoint2LidarS[i] and posPoint2LidarT[i] are known from the azimuthal decoding, and an inverse horizontal radial distance rInv is decoded by
sLidar=(posPoint2LidarS[i]<<8)-128
tLidar=(posPoint2LidarT[i]<<8)-128
r2=sLidar×sLidar+tLidar x tLidar
rInv=IntRecipSqrt(r2)

Using the already decoded bits in partial offsets, the best known vertical position of the point i, in the co-ordinates used in the processing of the angular coding mode, is computed by
posPoint2LidarV[i]=(vN<<EffectiveNodeSize Log 2[2])-GeomAngularOrigin[2]
posPoint2LidarV[i]+=partialOffset[i][2]<<NodeSize Log 2Rem[2]

The corrected laser angle ThetaLaser of the laser associated with the point is
Hr=LaserCorrection[laserIndex[i]] x rInv
ThetaLaser=LaserAngle    [laserIndex[i]]+(Hr>=0?-(Hr>>17): ((-Hr)>>17))

The remaining of the point partial offset partialOffset[i][2] is iteratively decoded in a loop j on the remaining bits to decoded for the partial offset of the component V. In the loop, angular contexts idcmIdxAngular[i][j] are determined and are used to decode the syntax elements point_offset[i][2][j]. The position posPoint2LidarV[i] of the point is also updated iteratively.
mask=NodeSize Log 2Rem[2]>0?1<<NodeSize Log 2Rem [2]-1): 0
halfInterval=(rInv<<NodeSize Log 2Rem [2])>>18

```
if (mask)
    for (j = NodeSizeLog2Rem[2]-1; j>=0; j--, mask >>= 1, halfInterval >>= 1){
        vLidar = ((posPoint2LidarV[i] + mask) << 1) - 1
        theta = vLidar x rinv
        theta32 = theta >= 0 ? theta >> 15 : -((-theta) >> 15)
        thetaLaserDeltaVirtualInterval = ThetaLaser - theta32
        deltaVirtualIntervalTop = thetaLaserDeltaVirtualInterval - halfInterval
        deltaVirtualIntervalBot = thetaLaserDeltaVirtualInterval + halfInterval
        idcmIdxAngular[i][j] = thetaLaserDeltaVirtualInterval < 0
        if (deltaVirtualIntervalTop >= 0)
            idcmIdxAngular[i][j] += 2
        else if (deltaVirtualIntervalBot < 0)
            idcmIdxAngular[i][j] += 2
        // decode the bin point_offset[i][2][j] using idcmIdxAngular [i][j]
        partialOffset[i][2] <<= 1
        partialOffset[i][2] |= point_offset[i][2][j]
        if (point_offset[i][2][j])
            posPoint2LidarV[i] += mask
    }
```

10.8.5 Bypass Decoding of all Components of Point Offsets

The process in this section applies only when geometry_angular_enabled_flag is equal to 0.

In this process, the remaining bits of the point offsets are determined by bypass decoding of the point_offset[i][k][j]. It is performed for each point index i and each component k as follows

```
for (i = 0; i < direct_point_cnt_eq2_flag; i++)
    for (k = 0; k < 3; k++)
        for (j = NodeSizeLog2Rem[k] - 1; j > 0; j--) {
            partialOffset[i][k] <<= 1
            partialOffset[i][k] |= point_offset[i][k][j]
            NodeSizeLog2Rem[k]--
        }
```

At the end of this process, NodeSize Log 2Rem[k] is equal to 0 for all k. There is no more bits to be decoded for the point offset, and partialOffset[i][k] is equal to the complete point offset PointOffset[i][k].

When in-tree quantization, angular mode and IDCM are jointly enabled, a scaled version of one or more of effective node sizes, point positions, and offsets may be used in the IDCM decoding process to ensure that the positions/offsets/node sizes and the angular origin are used at the same scale; e.g., this may be useful in the proper derivation of the laser index and in the context derivation. Not using the scaled values may result in improper derivation of the laser indices or the contexts.

The following describes octree encoding and decoding. An overview of octree encoding for a node is presented in FIG. 4 while the overview of the corresponding decoding process is presented in FIG. 5. In the encoder (e.g., G-PCC encoder 200), the occupancy of the node is obtained based on the number of points in each child node of the current node (400). Then, the planar eligibility is derived for each axis based on node size, planar buffer, and the planar rate (402). If an axis is planar eligible (YES of 404), the planar mode and plane position is obtained using the occupancy (406). Then, the IDCM eligibility is derived, or if axis is not planar eligible (NO of 404), the IDCM eligibility is derived (408). If node is IDCM eligibility (YES of 408), the IDCM node may be signaled (410). If the node is not IDCM eligible or the node is not IDCM (NO of 408), the occupancy is encoded using context-based coding (416). The node is then split into the child nodes which will be added into the node buffer and the process will move to the next node in the node buffer (418). A determination may be made if IDCM is to be applied (412). If IDCM is not applied (NO of 412), then the occupancy is encoded using context-based coding (416). For an IDCM node (YES of 412), the number points and the number of duplicated points will be encoded, and the position of points in the node will be encoded utilizing the planar information (414). The IDCM node is not split further, and the encoding process will move to the next node in the node buffer (418). The above process is carried out recursively until the node buffer is empty.

Figure 4:
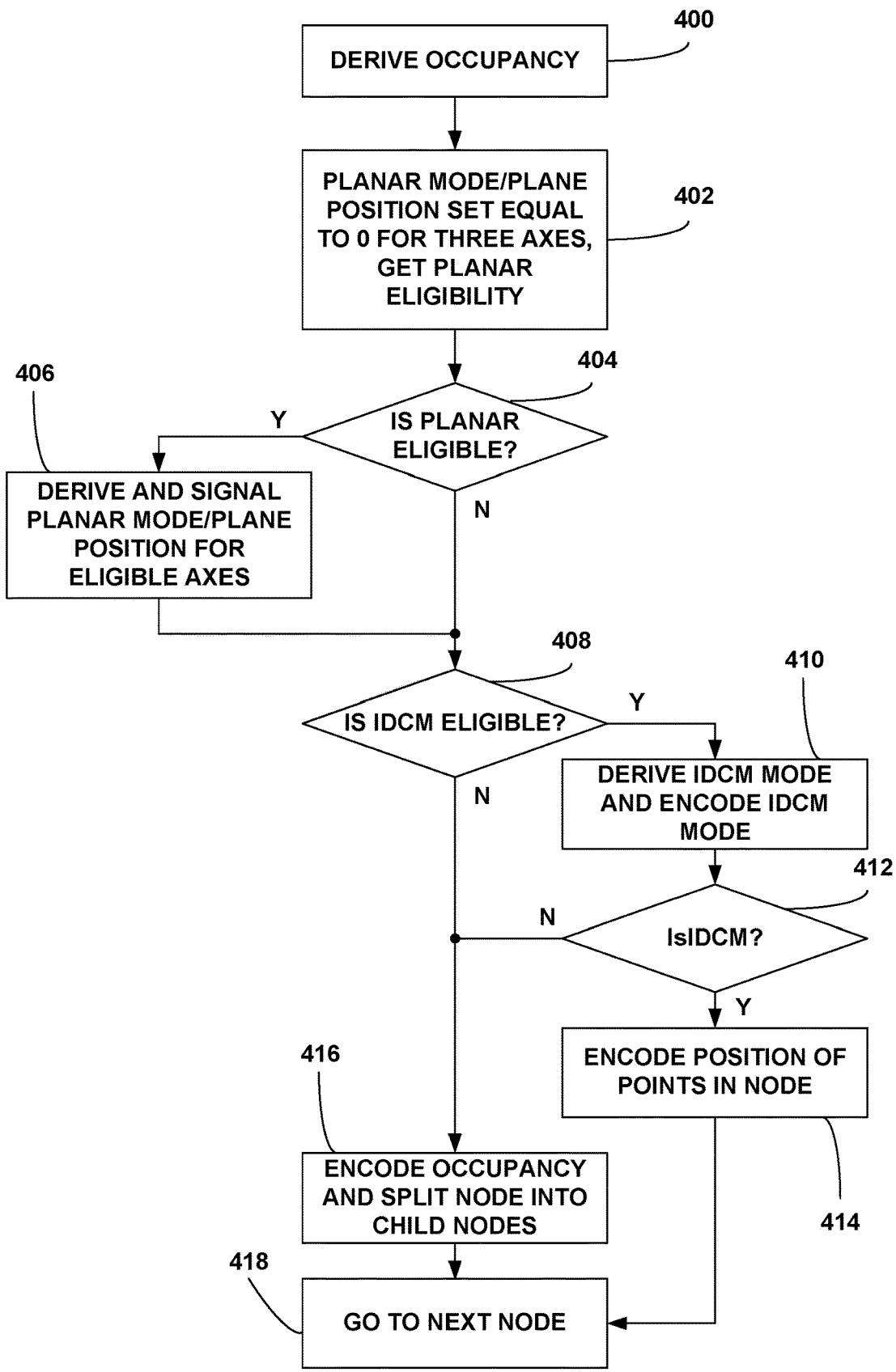
FIG. 4 is a flowchart illustrating an example of an octree encoding process.
Figure 5:
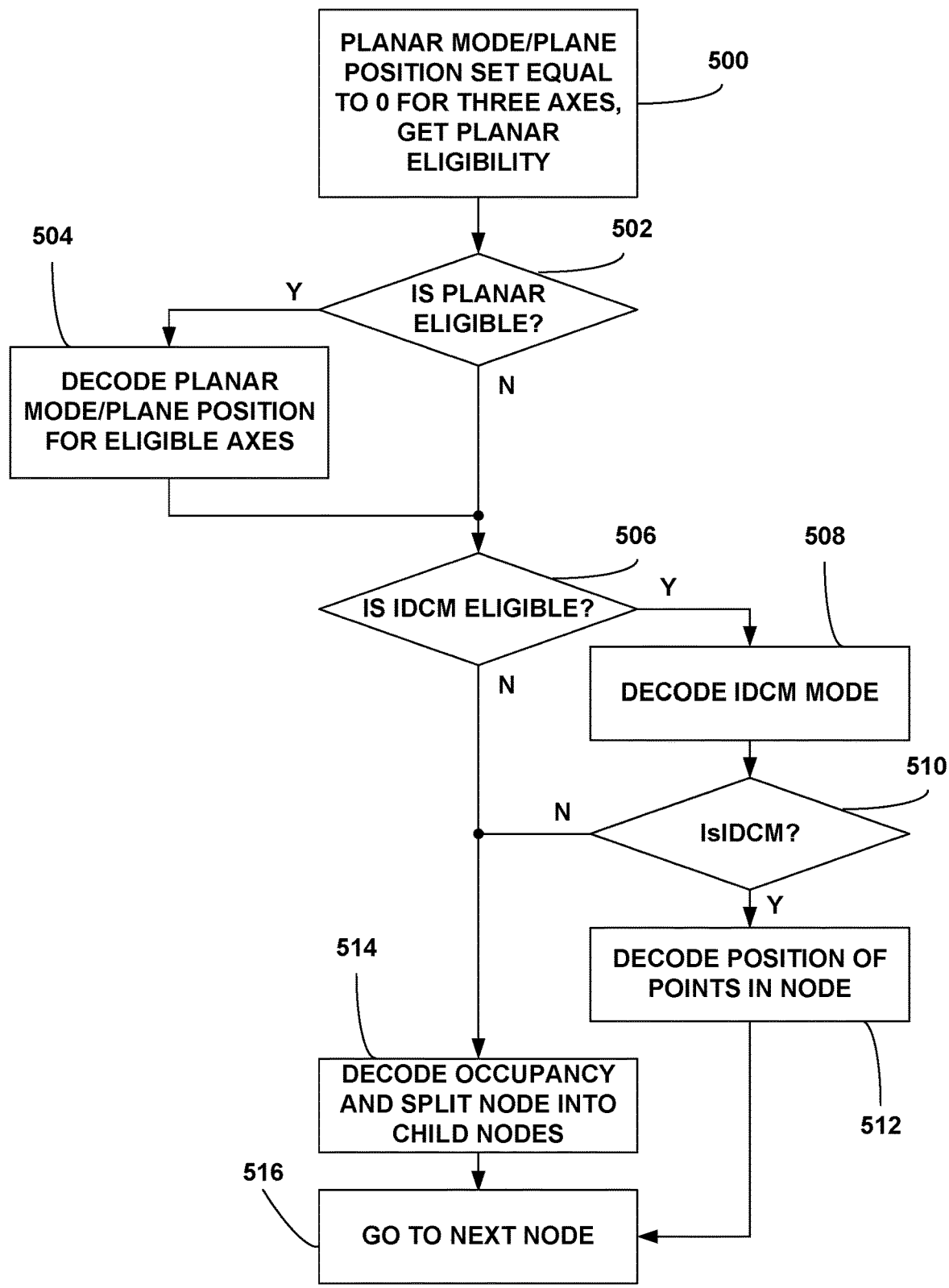
FIG. 5 is a flowchart illustrating an example of an octree decoding process.

As illustrated in FIG. 5, the decoder (e.g., G-PCC decoder 300) may perform the reciprocal of the example techniques illustrated in FIG. 4. For example, the planar eligibility is derived for each axis based on node size, planar buffer, and the planar rate (500). If an axis is planar eligible (YES of 502), the planar mode and plane position is decoded using the occupancy (504). Then, the IDCM eligibility is derived, or if axis is not planar eligible (NO of 404), the IDCM eligibility is derived (506). If node is IDCM eligibility (YES of 506), the IDCM node may be decoded (e.g., parsed) (508). If the node is not IDCM eligible or the node is not IDCM (NO of 408), the occupancy is decoded (e.g., parsed) using context-based coding (514). The node is then split into the child nodes which will be added into the node buffer and the process will move to the next node in the node buffer (516). A determination may be made if IDCM is to be applied (510). If IDCM is not applied (NO of 510), then the occupancy is decoded using context-based coding (514). For an IDCM node (YES of 510), the number points and the number of duplicated points will be decoded, and the position of points in the node will be decoded utilizing the planar information (512). The IDCM node is not split further, and the decoding process will move to the next node in the node buffer (516). The above process is carried out recursively until the node buffer is empty.

The following describes some issues that may be present in G-PCC coding techniques. This disclosure describes example techniques that may address such issues; however, the techniques should not be considered limited to addressing such issues. For instance, the example techniques may reduce the overhead for signaling of planar information.

For example, there may be planar mode coding redundancy for a node which has only one point. As described with octree encoding and decoding, such as in FIGS. 4 and 5, the planar information of a node in three axes is encoded before the signaling of IDCM information including the number and the position of points in the node. It should be noted that, for a node with only one point, the planar mode is true for all three axes. Therefore, signaling of the planar mode for such nodes together with the number point of one may be redundant.

As another example, signaling of planar may not be efficient for nodes which have only few points. For a node with many points, the planar information would help to reduce signaling cost of points position in the node. For instance, if the node is planar in an axis, it will save one bit to signal the position of each point in the planar direction. However, that reduction of signaling close may not be true for a node which has only few points since the node needs to signal two bits for planar mode and plane position for a node. In some cases, the cost for signaling the bit which can be saved by planar is cheaper than signaling the planar mode and plane position because for IDCM, the signaling of that bit may be significantly improved by using joint position coding and angular information. Therefore, for the node having only few points or when the angular information is available, signaling the planar may not be efficient.

In one or more examples, the example techniques described herein may be to change the signaling of planar mode dependent on the IDCM information such as the IDCM mode or the number of points in the node. In some examples, the restriction of planar mode to IDCM mode in the following example techniques may be applied when the angular mode is enabled. In some examples, the restriction may be controlled by a flag in sps (sequence parameter set), or gbh (geometry brick header) level. The geometry brick header (gbh) may also be referred to as a geometry parameter set (GPS).

In one example, the planar mode may not be signaled for nodes which have only one point. For example, the planar mode may be implicitly signaled when the IDCM node has only one point. Implicitly signaled may refer to some examples where the syntax element or information is not actually signaled, but is inferred. For instance, in implicit signaling, G-PCC encoder 200 may bypass signaling (e.g., avoid signaling) and G-PCC decoder 300 may not parse the syntax elements that are "implicitly" signaled.

The signaling of the planar information may be carried after signaling the IDCM mode flag and the number of points in the node. If the number of points in the node is one, only plane position may be signalled while the planar mode is implicitly signalled as 1.

Accordingly, in one example, G-PCC encoder 200 may be configured to signal, in a bitstream, an inferred direct coding mode (IDCM) flag and a number of points in a node of the point cloud data, and based on the number of points in the node being one and subsequent to signaling the IDCM flag, signal, in the bitstream, plane position and bypass signaling planar mode. G-PCC decoder 300 may be configured to parse, from a bitstream, an inferred direct coding mode (IDCM) flag and the number of points in the node of the point cloud data, based on the number of points in the node being one and subsequent to parsing the IDCM flag, parse, from the bitstream, plane position, based on the number of points in the node being one, determine parsed bits, from the bitstream, for the node are for a syntax element other than a syntax element indicating a planar mode (e.g., avoid parsing for planar mode), and reconstruct the point cloud based on the parsed IDCM flag and the plane position. For instance, as there may not be information indicating the planar mode in the bitstream, G-PCC decoder 300 may determine that syntax elements for the node are not the information indicating the planar mode.

In one example, the planar mode may be disabled to nodes which have only one point. For example, the planar mode may be disabled for IDCM nodes which have only one point. In such examples, the signaling of the planar information may be carried after signaling the IDCM mode flag and the number of points in the node. The signaling of the planar information (including planar mode and plane position) may be ignored if the number of points in the node is one.

In one example, the planar mode may be disabled to IDCM nodes which have a number of points less than a threshold. In such examples, the planar mode may be disabled for IDCM node which have a number of points less than a threshold. The signaling of the planar information may be carried after signaling the IDCM mode flag and the number of points in the node. The signaling of the planar information (including planar mode and plane position) may be ignored if the number of points in the node is less than a threshold.

Accordingly, in one example, G-PCC encoder 200 may be configured to signal, in a bitstream, an inferred direct coding mode (IDCM) flag and a number of points in a node of the point cloud data, and based on the number of points in the node being less than or equal to a threshold, bypass signaling plane position and planar mode. G-PCC decoder 300 may be configured to parse, from a bitstream, an inferred direct coding mode (IDCM) flag and the number of points in the node of the point cloud data, based on the number of points in the node being less than or equal to a threshold, determine that parsed bits, from the bitstream, for the node are for a syntax element other than a syntax element indicating a plane position or a planar mode (e.g., avoid parsing plane position and planar mode), and reconstruct the point cloud data based on the parsed IDCM flag.

As one example, the threshold is one. As another example, the threshold is greater than one.

In one example, the planar mode may be disabled for IDCM nodes. The signaling of the planar information may be carried after signaling the IDCM mode flag. The signaling of the planar information (including planar mode and plane position) may be ignored, and the planar information may not be used in position coding of IDCM node.

Figure 6:
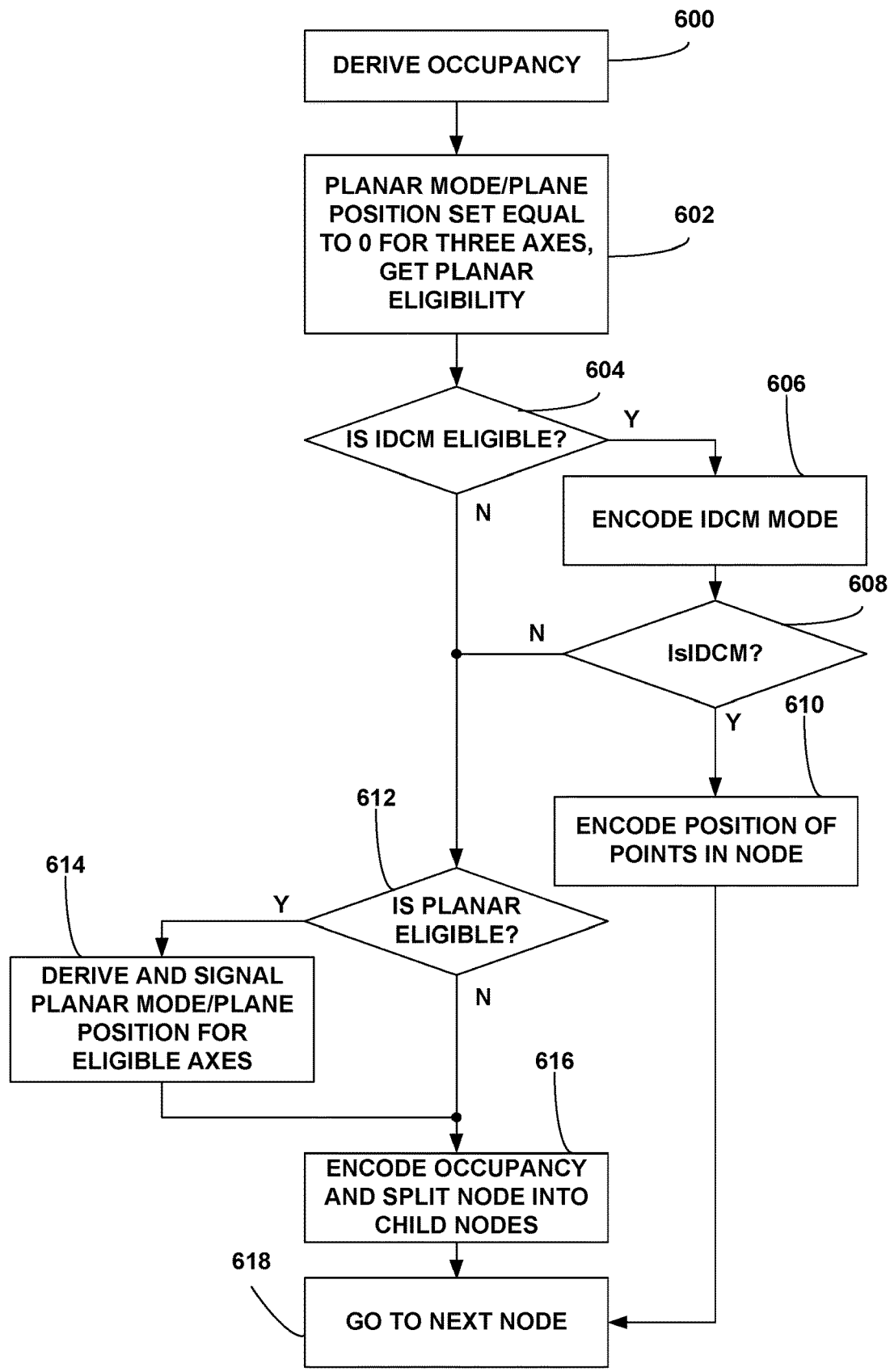
FIG. 6 is a flowchart illustrating an example where the planar mode and plane position are set equal to 0 for inferred direct coding mode (IDCM) mode without signaling.

FIG. 6 is a flowchart illustrating such examples. In the example of FIG. 6, the signaling of planar information occurs after the determination of whether a node is eligible for IDCM. The occupancy of the node is obtained based on the number of points in each child node of the current node (600). Then, the planar eligibility is derived for each axis based on node size, planar buffer, and the planar rate (602). Then, the IDCM eligibility is derived (604). If node is IDCM eligibility (YES of 604), the IDCM node may be signaled (606). A determination may be made if IDCM is to be applied (608). For an IDCM node (YES of 608), the number points and the number of duplicated points will be encoded (610). The IDCM node is not split further, and the encoding process will move to the next node in the node buffer (618).

If the node is not IDCM eligible (NO of 604) or IDCM is not applied (NO of 608), planar eligibility may be determined (612). If an axis is planar eligible (YES of 612), the planar mode and plane position is obtained using the occupancy (614). If the node is not IDCM eligible or the node is not IDCM (NO of 612), the occupancy is encoded using context-based coding (616). The node is then split into the child nodes which will be added into the node buffer and the process will move to the next node in the node buffer (618). The above process is carried out recursively until the node buffer is empty.

Accordingly, in a condition where inferred direct coding mode (IDCM) is disabled, G-PCC encoder 200 may encode the point cloud data without using planar mode and plane position for a node. In a condition where inferred direct coding mode (IDCM) is disabled, G-PCC decoder 300 may decode the point cloud data without using planar mode and plane position for a node.

The corresponding specification text in G-PCC DIS, ISO/IEC JTC1/SC29/WG11 w55637, Teleconference, November 2020 may be modified accordingly as follows. In the following, text between <DELETE> . . . </DELETE> may be deleted, and text between <ADD> . . . </ADD> may be added.

| | Descriptor |
|---|---|
| geometry_node( depth, nodeIdx, sN, tN, vN ) { | |
|   if( geom_node_qp_offset_present_flag ) { | |
|     geom_node_qp_offset_abs_gt0_flag | ae(v) |
|     if( geom_node_qp_offset_abs_gt0_flag ) { | |
|       geom_node_qp_offset_abs_minus1 | ae(v) |
|       geom_node_qp_offset_sign_flag | ae(v) |
|     } | |
|   } | |
|   <DELETE> if( geometry_planar_enabled_flag ) | |
|     for( k = 0; k < 3; k++ ) | |
|       if( PlanarEligible[ k ] ) { | |
|         is_planar_flag[ k ] | ae(v) |
|         if( is_planar_flag[ k ] ) | |
|           plane_position[ k ] | ae(v) |
|       } </DELETE> | |
|   if( DirectModeFlagPresent ) | |
|     direct_mode_flag | ae(v) |
|   if( direct_mode_flag ) | |
|     geometry_direct_mode_data( ) | |
|   else { | |
|     <ADD>  if( geometry_planar_enabled_flag ) | |
|       for( k = 0; k < 3; k++ ) | |
|         if( PlanarEligible[ k ] ) { | |
|           is_planar_flag[ k ] | ae(v) |
|           if( is_planar_flag[ k ] ) | |
|             plane_position[ k ] | ae(v) |
|     } </ADD> | |
|     single_child_flag | ae(v) |
|     if( single_child_flag ) | |
|       for( k = 0; k < 3; k++ ) | |
|         if( ! isPlanar[ k ] ) | |
|           occupancy_idx[ k ] | ae(v) |
|     if( OccupancyMapPresent ) | |
|       if( bitwise_occupancy_flag ) | |
|         occupancy_map | ae(v) |
|       else | |
|         occupancy_byte | de(v) |
|     if( LeafNode && duplicate_points_enabled_flag ) | |
|       for( child = 0; child < NumChildren; child++ ) { | |
|         dup_point_cnt_gt0_flag[ child ] | ae(v) |
|         if( dup_point_cnt_gt0_flag[ child ] ) | |
|           dup_point_cnt_minus1[ child ] | ae(v) |
|       } | |
|   } | |
| } | |

The planar mode may be disabled for IDCM nodes when/if angular mode enabled. For instance, G-PCC encoder 200 may bypass signaling of values for a planar mode for a current node (e.g., a current node that is encoded as direct mode) in a condition where angular mode is enabled and/or a condition where planar mode is disabled when angular mode is enabled. Bypass signaling means that G-PCC encoder 200 does not signal values for the planar mode, and in a G-PCC compliant bitstream, where values for the planar mode would be located, there are other values instead.

The signaling of the planar information may be carried after signaling the IDCM mode flag. In one example, if the angular mode is enabled, the signalling of the planar information (such as values for the planar mode including planar mode and plane position) may be ignored (e.g., bypassed), and the planar information may not be used in position coding of IDCM node.

The corresponding specification text in G-PCC DIS, ISO/IEC JTC1/SC29/WG11 w55637, Teleconference, November 2020 may be modified accordingly as follows. In the following, text between <DELETE> . . . </DELETE> may be deleted, and text between <ADD> . . . </ADD> may be added.

| | Descriptor |
|---|---|
| geometrys_node( depth, nodeIdx, sN, tN, vN ) { | |
|   if( geom_node_qp_offset_present_flag ) { | |
|     geom_node_qp_offset_abs_gt0_flag | ae(v) |
|     if( geom_node_qp_offset_abs_gt0_flag ) { | |
|       geom_node_qp_offset_abs_minus1 | ae(v) |
|       geom_node_qp_offset_sign_flag | ae(v) |
|     } | |
|   } | |
|   <DELETE>  if( geometry_planar_enabled_flag ) | |
|     for( k = 0; k < 3; k++ ) | |
|       if( PlanarEligible[ k ] ) { | |
|         is_planar_flag[ k ] | ae(v) |
|         if( is_planar_flag[ k ] ) | |
|           plane_position[ k ] | ae(v) |
|     } </DELETE> | |
|   if( DirectModeFlagPresent ) | |
|     direct_mode_flag | ae(v) |
|     <ADD>  if( geometry_planar_enabled_flag && | |
| (!geometry_angular_enabled_flag || !direct_mode_flag)) | |
|       for( k = 0; k < 3; k++ ) | |
|         if( PlanarEligible[ k ] ) { | |
|           is_planar_flag[ k ] | |
|           if( is_planar_flag[ k ] ) | |
|             plane_position[ k ] | |
|     } </ADD> | |
|   if( direct_mode_flag ) | |
|     geometry_direct_mode_data( ) | |
|   else { | |
|     single_child_flag | ae(v) |
|     if( single_child_flag ) | |
|       for( k = 0; k < 3; k++ ) | |
|         if( ! isPlanar[ k ] ) | |

-continued

| | Descriptor |
|---|---|
| occupancy_idx[ k ] | ae(v) |
| if( OccupancyMapPresent ) | |
| if( bitwise_occupancy_flag ) | |
| occupancy_map | ae(v) |
| Else | |
| occupancy_byte | de(v) |
| if( LeafNode && duplicate_points_enabled_flag ) | |
| for( child = 0; child < NumChildren; child++ ) { | |
| [Ed: there are two instances of dup_point_cnt_gt0_flag, they are the same flag, but signalled in different places...] | ae(v) |
| dup_point_cnt_gt0_flag[ child ] | |
| if( dup_point_cnt_gt0_flag[ child ] ) | |
| dup_point_cnt_minus1[ child ] | ae(v) |
| } | |
| } | |
| } | |

The following is added in the above pseudo-code:

```
<ADD>  if( geometry_planar_enabled_flag &&
(!geometry_angular_enabled_flag || !direct_mode_flag))
    for( k = 0; k < 3; k++ )
        if( PlanarEligible[ k ] ) {
            is_planar_flag[ k ]
            if( is_planar_flag[ k ] )
                plane_position[ k ]
        } </ADD>
```

In this pseudo-code, if geometry_angular_enabled_flag is true, then values for the planar mode, such as is_planar_flag[k] and plane_position[k], are not signaled. For example, G-PCC encoder 200 may signal a syntax element (e.g., geometry_angular_enabled_flag) indicating that angular mode is enabled for a first node (e.g., a current node). In this example, G-PCC encoder 200 may bypass signaling of values for a planar mode (e.g., is_planar_flag[k] and plane_position[k]) in a condition where the syntax element indicates that the angular mode is enabled for the first node (e.g., geometry_angular_enabled_flag is true). In this example, the signaling of geometry_angular_enabled_flag may be considered as a first instance of the syntax element.

However, for a second node, G-PCC encoder 200 may signal a second instance of geometry_angular_enabled_flag indicating that angular mode is disabled for the second node. In this example, G-PCC encoder 200 may signal values for the planar mode for the second node (e.g., is_planar_flag[k] and plane_position[k]) only in a condition where the second instance of the syntax element (e.g., second instance of geometry_angular_enabled_flag) indicates that the angular mode is enabled for the second node.

Also, in the above pseudo-code, there may be a requirement that direct_mode_flag be true for G-PCC encoder 200 to signal values for the planar mode. G-PCC encoder 200 may determine that IDCM is enabled for the current node, and that IDCM is applied to the current node (e.g., direct_mode_flag is true). Accordingly, in some examples, G-PCC encoder 200 may bypass signaling of values for the planar mode for the current node in the condition where angular mode is enabled for the current node, and in the condition where IDCM is applied for the current node. That is, in some examples, G-PCC encoder 200 may bypass signaling of values for the planar mode for the current node when both conditions are satisfied: (1) angular mode is enabled for the current node, and (2) IDCM (e.g., direct mode) is applied for the current node. If either of these two conditions are not satisfied, then G-PCC encoder 200 may signal the values for the planar mode. If both of these two conditions are satisfied, then G-PCC encoder 200 may bypass signaling of values for planar mode.

In some examples, if angular mode is enabled (e.g., geometry_angular_enabled_flag is true), such as for the node encoded in the IDCM, then that may be sufficient to bypass signaling of values for planar mode. However, in some examples, it may be possible for angular mode to be enabled, but planar mode to still be enabled, and signaling of values for planar mode may be useful. To accommodate such examples, the restriction of planar mode for IDCM node when angular mode is enabled may be controlled in gbh (geometry brick header) level by a flag named geom_disable_planar_idcm_angular. The geom_disable_planar_idcm_angular flag being in the gbh is provided as one example, and may be located in other parameter sets such as a geometry parameter set (GPS).

That is, when geom_disable_planar_idcm_angular is true, planar mode may be disabled when angular mode is enabled. In such examples, when geom_disable_planar_idcm_angular is true, G-PCC encoder 200 may bypass signaling values for planar mode if angular mode is enabled. However, when geom_disable_planar_idcm_angular is false, G-PCC encoder 200 may possibly signal values for planar mode even if angular mode is enabled.

The corresponding specification text in G-PCC DIS, ISO/IEC JTC1/SC29/WG11 w55637, Teleconference, November 2020 may be modified accordingly as follows. In the following, text between <DELETE> . . . </DELETE> may be deleted, and text between <ADD> . . . </ADD> may be added.

The syntax element geom_disable_planar_idcm_angular is added to the geometry parameter set semantics.

<ADD>geom_disable_planar_idcm_angular equals to 1 specifies that the planar mode is disabled for IDCM nodes when the angular mode is enabled.</ADD>

| | Descriptor |
|---|---|
| geometry_node( depth, nodeIdx, sN, tN, vN ) { | |
| if( geom_node_qp_offset_present_flag ) { | |
| geom_node_qp_offset_abs_gt0_flag | ae(v) |
| if( geom_node_qp_offset_abs_gt0_flag ) { | |
| geom_node_qp_offset_abs_minus1 | ae(v) |
| geom_node_qp_offset_sign_flag | ae(v) |
| } | |
| } | |
| if( geometry_planar_enabled_flag <ADD>&& ! geom_disable_planar_idcm_angular</ADD>) | |
| for( k = 0; k < 3; k++ ) | |
| if( PlanarEligible[ k ] ) { | |
| is_planar_flag[ k ] | ae(v) |
| if( is_planar_flag[ k ] ) | |
| plane_position[ k ] | ae(v) |
| } | |
| if( DirectModeFlagPresent ) | |
| direct_mode_flag | ae(v) |
| <ADD> if( geometry_planar_enabled_flag && geom_disable_planar_idcm_angular && (!geometry_angular_enabled_flag || !direct_mode_flag)) | |
| for( k = 0; k < 3; k++ ) | |
| if( PlanarEligible[ k ] ) { | |
| is_planar_flag[ k ] | |
| if( is_planar_flag[ k ] ) | |
| plane_position[ k ] | |
| } </ADD> | |
| if( direct_mode_flag ) | |
| geometry_direct_mode_data( ) | |

| | Descriptor |
|---|---|
| else { | |
|    single_child_flag | ae(v) |
|    if( single_child_flag ) | |
|      for( k = 0; k < 3; k++ ) | |
|        if( ! isPlanar[ k ] ) | |
|          occupancy_idx[ k ] | ae(v) |
|    if( OccupancyMapPresent ) | |
|      if( bitwise_occupancy_flag ) | |
|        occupancy_map | ae(v) |
|      else | |
|        occupancy_byte | de(v) |
|    if( LeafNode && duplicate_points_enabled_flag ) | |
|      for( child = 0; child < NumChildren; child++ ) { | |
| [Ed: there are two instances of dup_point_cnt_gt0_flag, they are the same flag, but signalled in different places...] | ae(v) |
|        dup_point_cnt_gt0_flag[ child ] | |
|        if( dup_point_cnt_gt0_flag[ child ] ) | |
|          dup_point_cnt_minus1[ child ] | ae(v) |
|      } | |
|   } | |
| } | |

Accordingly, in the above example, G-PCC encoder 200 may signal a syntax element indicating whether planar mode is disabled or enabled for a current node when angular mode is enabled. For instance, G-PCC encoder 200 may signal geom_disable_planar_idcm_angular indicating that planar mode is disabled for a current node when angular mode is enabled. In this case, G-PCC encoder 200 may bypass signaling of values for a planar mode for the current node in a condition where geom_disable_planar_idcm_angular indicates that the planar mode is disabled for the current node when the angular mode is enabled.

Assume that the current node is a first node, and, in the above example, the signaling of geom_disable_planar_idcm_angular is a first instance of signaling of geom_disable_planar_idcm_angular. G-PCC encoder 200 may signal a second instance of geom_disable_planar_idcm_angular indicating that planar mode is not disabled for the second node when angular mode is enabled. In this example, G-PCC encoder 200 may signal values for the planar mode for the second node only in a condition where the second instance of geom_disable_planar_idcm_angular indicates that the planar mode is not disabled when the angular mode is enabled for the second node.

Also, similar to the above example techniques, G-PCC encoder 200 may bypass signaling values for the planar mode if the current node (e.g., first node) is IDCM (e.g., direct mode). That is, if direct_mode_flag is true, G-PCC encoder 200 may bypass signaling values for the planar mode if geom_disable_planar_idcm_angular is true.

For ease, the syntax element geom_disable_planar_idcm_angular is referred to as a first syntax element, and the syntax element geometry_angular_enabled_flag is referred to as a second syntax element. For instance, G-PCC encoder 200 may signal at least one of a first syntax element (e.g., geom_disable_planar_idcm_angular) indicating whether planar mode is disabled for a current node when angular mode is enabled, or a second syntax element (e.g., geometry_angular_enabled_flag) indicating whether angular mode is enabled for the current node. Whether values for planar mode (e.g., is_planar_flag[k] and plane_position[k]) are signaled or not (e.g., bypassed) may be based on a condition indicated by the first syntax element and the second syntax element.

As one example, G-PCC encoder 200 may signal at least one of a first syntax element (e.g., geom_disable_planar_idcm_angular) indicating that planar mode is disabled for a current node when angular mode is enabled (e.g., geom_disable_planar_idcm_angular is true), or a second syntax element (e.g., geometry_angular_enabled_flag) indicating that angular mode is enabled for the current node (e.g., geometry_angular_enabled_flag is true). G-PCC encoder 200 may bypass signaling of values for a planar mode for the current node in a condition where the first syntax element indicates that the planar mode is disabled for the current node when the angular mode is enabled, or in a condition where the second syntax element indicates that the angular mode is enabled for the current node.

A combination of the above may also be possible. For example, G-PCC encoder 200 may signal both the first syntax element indicating that planar mode is disabled for a current node when angular mode is enabled, and the second syntax element indicating that angular mode is enabled for the current mode. In this example, G-PCC encoder 200 may bypass signaling of values for the planar mode for the current node in a condition where the first syntax element indicates that the planar mode is disabled for the current node when the angular mode is enabled, and in a condition where the second syntax element indicates that the angular mode is enabled for the current node.

There may be additional conditions for when G-PCC encoder 200 bypasses signaling of values for the planar mode. For example, G-PCC encoder 200 may determine that IDCM (e.g., direct mode) is applied for the current node. G-PCC encoder 200 may bypass signaling of values for the planar mode for the current node in the condition where the first syntax element indicates that the planar mode is disabled for the current node when the angular mode is enabled, in the condition where the second syntax element indicates that the angular mode is enabled for the current node, and in a condition where IDCM is applied for the current node.

The above describes examples of how the first syntax element and the second syntax element may determine when signaling of values for planar mode are bypassed for the current node. In some examples, the first syntax element and the second syntax element may determine when values for the planar mode can be signaled.

For instance, assume that the current node is a first node, and the signaling of the first syntax element and/or the second syntax element is a first instance of signaling of the first syntax element and/or the second syntax element. In some examples, G-PCC encoder 200 may signal at least one of a second instance of the first syntax element indicating that planar mode is not disabled for the second node when the angular mode is enabled, or a second instance of the second syntax element indicating that angular mode is disabled for the second node. In such examples, G-PCC encoder 200 may signal values for the planar mode for the second node only in a condition where the second instance of the first syntax element indicates that the planar mode is disabled for the second node when the angular mode is enabled, or only in a condition where the second instance of the second syntax element indicates that the angular mode is enabled for the second node. In general, for IDCM nodes, the planar mode is not signaled when angular is enabled whereas for the non-IDCM nodes, planar is signaled when angular is enabled.

In some examples, a geometry parameter set (GPS) for the second node and a GPS for the first node are different, and the first instance of the first and second syntax elements and the second instance of the first and second syntax elements may have different values when the GPS for the second node and the GPS for the first node are different. However, the example techniques are not limited, and in some examples, it may be possible that for the same GPS, the first instance of the first and second syntax elements and the second instance of the first and the second syntax elements have the different values.

In another example, the corresponding specification text in G-PCC DIS, ISO/IEC JTC1/SC29/WG11 w55637, Teleconference, November 2020 may be modified accordingly as follows. In the following, text between <DELETE> . . . </DELETE> may be deleted, and text between <ADD> . . . </ADD> may be added.

|  | Descriptor |
|---|---|
| geometry_node( depth, nodeIdx, sN, tN, vN ) { | |
|   if( geom_node_qp_offset_present_flag ) { | |
|     geom_node_qp_offset_abs_gt0_flag | ae(v) |
|     if( geom_node_qp_offset_abs_gt0_flag ) { | |
|       geom_node_qp_offset_abs_minus1 | ae(v) |
|       geom_node_qp_offset_sign_flag | ae(v) |
|     } | |
|   } | |
|   <ADD> if( DirectModeFlagPresent && geom_disable_planar_idcm_angular) | |
|     direct_mode_flag </ADD> | ae(v) |
|   if( geometry_planar_enabled_flag <ADD> && (!geom_disable_planar_idcm_angular ||!geometry_angular_enabled_flag || !direct_mode_flag)</ADD>) | |
|     for( k = 0; k < 3; k++ ) | |
|       if( PlanarEligible[ k ] ) { | |
|         is_planar_flag[ k ] | ae(v) |
|         if( is_planar_flag[ k ] ) | |
|           plane_position[ k ] | ae(v) |
|       } | |
|   if( DirectModeFlagPresent <ADD> && ! geom_disable_planar_idcm_angular</ADD>) | |
|     direct_mode_flag | ae(v) |
|   if( direct_mode_flag ) | |
|     geometry_direct_mode_data( ) | |
|   else { | |
|     single_child_flag | ae(v) |
|     if( single_child_flag ) | |
|       for( k = 0; k < 3; k++ ) | |
|         if( ! isPlanar[ k ] ) | |
|           occupancy_idx[ k ] | ae(v) |
|     if( OccupancyMapPresent ) | |
|       if( bitwise_occupancy_flag ) | |
|         occupancy_map | ae(v) |
|       Else | |
|         occupancy_byte | de(v) |
|     if( LeafNode && duplicate_points_enabled_flag ) | |
|       for( child = 0; child < NumChildren; child++ ) { | |
| [Ed: there are two instances of dup_point_cnt_gt0_flag, they are the same flag, but signalled in different places...] | ae(v) |
|         dup_point_cnt_gt0_flag[ child ] | |
|         if( dup_point_cnt_gt0_flag[ child ] ) | |
|           dup_point_cnt_minus1[ child ] | ae(v) |
|       } | |
|   } | |
| } | |

In some examples, the condition (!geom_disable_planar_idcm_angular||! geometry_angular_enabled_flag||!direct_mode_flag) may be included in planar eligibility presented below with respect to eligibility of a node for planar coding mode (also referred to as section 8.2.3.1). In some examples, if the condition (!geom_disable_planar_idcm_angular||! geometry_angular_enabled_flag||!direct_mode_flag) is not satisfied, PlanarEligible[k] is false. For instance, if it is false that (geom_disable_planar_idcm_angular is false, or geometery_angular_enabled_flag is false, or direct_mode_flag is false), then PlanarEligible[k] is false.

The G-PCC DIS, ISO/IEC JTC1/SC29/WG11 w55637, Teleconference, November 2020 specification may be modified accordingly as follows. In the following, text between <DELETE> . . . </DELETE> may be deleted, and text between <ADD> . . . </ADD> may be added.

8.2.3.1 Eligibility of a Node for Planar Coding Mode

Explicit coding of occupancy planes is conditioned on the probability of XXX.

The array PlanarRate, with elements PlanarRate[k], for k=0 . . . 2, is an estimate of the probability that the occupancy of a node forms a single plane perpendicular to the k-th axis.

The variable LocalDensity is an estimate of the mean number of occupied children in a node.

The variable NumNodesUntilPlanarUpdate counts the number of nodes to be parsed before updating PlanarRate and LocalDensity.

<ADD>If the condition (!geom_disable_planar_idcm_angular||!geometry_angular_enabled_flag||!direct_mode_flag) is false, PlanarEligible[k] is set equal to false, for k=0 . . . 2 and the process is stopped. </ADD>

At the start of parsing a geometry_octree syntax structure, PlanarRate and LocalDensity are

|  | Descriptor |
|---|---|
| geometry_node( depth, nodeIdx, sN, tN, vN ) { | |
|   if( geom_node_qp_offset_present_flag ) { | |
|     geom_node_qp_offset_abs_gt0_flag | ae(v) |
|     if( geom_node_qp_offset_abs_gt0_flag ) { | |
|       geom_node_qp_offset_abs_minus1 | ae(v) |
|       geom_node_qp_offset_sign_flag | ae(v) |
|     } | |
|   } | |
|   <ADD> if( DirectModeFlagPresent && geom_disable_planar_idcm_angular) | |
|     direct_mode_flag </ADD> | ae(v) |
|   if( geometry_planar_enabled_flag) | |
|     for( k = 0; k < 3; k++ ) | |
|       if( PlanarEligible[ k ] ) { | |
|         is_planar_flag[ k ] | ae(v) |
|         if( is_planar_flag[ k ] ) | |
|           plane_position[ k ] | ae(v) |
|       } | |
|   if( DirectModeFlagPresent <ADD> && ! geom_disable_planar_idcm_angular</ADD>) | |
|     direct_mode_flag | ae(v) |
|   if( direct_mode_flag ) | |
|     geometry_direct_mode_data( ) | |
|   else { | |
|     single_child_flag | ae(v) |
|     if( single_child_flag ) | |
|       for( k = 0; k < 3; k++ ) | |
|         if( ! isPlanar[ k ] ) | |
|           occupancy_idx[ k ] | ae(v) |
|     if( OccupancyMapPresent ) | |
|       if( bitwise_occupancy_flag ) | |
|         occupancy_map | ae(v) |
|       Else | |
|         occupancy_byte | de(v) |
|     if( LeafNode && duplicate_points_enabled_flag ) | |
|       for( child = 0; child < NumChildren; child++ ) { | |
| [In some cases, there are two instances of dup_point_cnt_gt0_flag, they are the same flag, but signalled in different places...] | ae(v) |
|         dup_point_cnt_gt0_flag[ child ] | |
|         if( dup_point_cnt_gt0_flag[ child ] ) | |
|           dup_point_cnt_minus1[ child ] | ae(v) |
|       } | |
|   } | |
| } | |

In the above example pseudo-code, the definition of PlanarEligible[k] is updated, and the value of PlanarEligible[k] is based on the value of the first syntax element (e.g., geom_disable_planar_idcm_angular), the second syntax element (e.g., geometry_angular_enabled_flag), and whether IDCM is applied (e.g., value of direct_mode_flag). From the perspective of G-PCC decoder 300, G-PCC decoder 300 may implement the for-loop of the above pseudo-code, and for each iteration of signaling values for planar mode, G-PCC decoder 300 may determine the value of PlanarEligible[k], and since the value of PlanarEligible[k] is based on the first syntax element and the second syntax element, G-PCC decoder 300 may parse syntax elements based on the first syntax element and the second syntax element.

For example, G-PCC decoder 300 determine, at least one of, in each iteration of a loop that the first syntax element indicates that planar mode is disabled for the current node when angular mode is enabled, or that the second syntax element indicates that angular mode is enabled for the current node (e.g., based on the value of PlanarEligible[k]). G-PCC decoder 300 may bypass parsing of values for the planar mode in each iteration of the loop based on the determination. For instance, whether G-PCC decoder 300 parses is_planar_flag or plane_position may be based on the value of PlanarEligible[k], and G-PCC decoder 300 may determine the value of PlanarEligible[k] in each iteration of the loop (e.g., over the values of "k").

The above example may be useful for backwards compatibility. For instance, no changes to the hardware of G-PCC encoder 200 or G-PCC decoder 300, compatible with earlier versions of G-PCC standard, may be needed to allow G-PCC encoder 200 and G-PCC decoder 300 to perform the example techniques of bypassing signaling values for planar mode in accordance with one or more examples described in this disclosure.

The following describes simplification of context angular derivation and rate updating for planar mode in G-PCC. In one example, the derivation process for context angular may be ignored when the node is a leaf node. In one example, the rate updating process may be ignored when the node is a leaf node.

In some examples, planar eligibility for IDCM coded nodes may be dependent on the availability of angular. For example, the position coding for IDCM coded nodes may be only improved when the angular information is available. The angular eligibility of a node is derived as in Section 8.2.4.1 of G-PCC DIS, ISO/IEC JTC1/SC29/WG11 w55637, Teleconference, November 2020 (Derivation process of the angular eligibility for a node) may be applicable. In some examples, the planar may be disabled for IDCM coded node if the angular is eligible for this node. Otherwise, this planar may be enabled for this node.

In some examples, planar mode eligibility may be dependent on the IDCM mode and contextAngular when the angular mode is enabled The contextAngular may be derived as in 8.2.4.4.

In some examples, when the angular mode is enabled, the planar may be applied to non-IDCM coded nodes or IDCM coded nodes with contextAngular of −1.

For example, the planar eligibility in the above example related to planar being disabled for IDCM nodes when angular mode is enabled may be modified as follows:

8.2.3.1 Eligibility of a Node for Planar Coding Mode

The array PlanarRate, with elements PlanarRate[k], for k=0 . . . 2, is an estimate of the probability that the occupancy of a node forms a single plane perpendicular to the k-th axis.

The variable LocalDensity is an estimate of the mean number of occupied children in a node.

The variable NumNodesUntilPlanarUpdate counts the number of nodes to be parsed before updating PlanarRate and LocalDensity.

<ADD>If the condition (!geom_disable_planar_idcm_angular||!geometry_angular_enabled_flag||(!direct_mode_flag||contextAngular==−1)) is false, PlanarEligible[k] is set equal to false, for k=0 . . . 2 and the process is stopped. </ADD>

At the start of parsing a geometry_octree syntax structure, PlanarRate and LocalDensity are

|  | Descriptor |
| --- | --- |
| geometry_node( depth, nodeIdx, sN, tN, vN ) { |  |
|   if( geom_node_qp_offset_present_flag ) { |  |
|     geom_node_qp_offset_abs_gt0_flag | ae(v) |
|     if( geom_node_qp_offset_abs_gt0_flag ) { |  |
|       geom_node_qp_offset_abs_minus1 | ae(v) |
|       geom_node_qp_offset_sign_flag | ae(v) |
|     } |  |
|   } |  |
|   <ADD> if( DirectModeFlagPresent && geom_disable_planar_idcm_angular) |  |
|     direct_mode_flag </ADD> | ae(v) |
|   if( geometry_planar_enabled_flag) |  |
|     for( k = 0; k < 3; k++ ) |  |
|       if( PlanarEligible[ k ] ) { |  |
|         is_planar_flag[ k ] | ae(v) |
|         if( is_planar_flag[ k ] ) |  |
|           plane_position[ k ] | ae(v) |
|       } |  |
|   if( DirectModeFlagPresent <ADD> && ! geom_disable_planar_idcm_angular </ADD>) |  |
|     direct_mode_flag | ae(v) |
|   if( direct_mode_flag ) |  |
|     geometry_direct_mode_data( ) |  |
|   else { |  |
|     single_child_flag | ae(v) |
|     if( single_child_flag ) |  |
|       for( k = 0; k < 3; k++ ) |  |
|         if( ! isPlanar[ k ] ) |  |
|           occupancy_idx[ k ] | ae(v) |
|     if( OccupancyMapPresent ) |  |
|       if( bitwise_occupancy_flag ) |  |
|         occupancy_map | ae(v) |
|     Else |  |
|       occupancy_byte | de(v) |
|     if( LeafNode && duplicate_points_enabled_flag ) |  |
|       for( child = 0; child < NumChildren; child++ ) { |  |
| [Ed: there may be two instances of dup_point_cnt_gt0_flag, they are the same flag, but signalled in different places...] | ae(v) |
|         dup_point_cnt_gt0_flag[ child ] |  |
|         if( dup_point_cnt_gt0_flag[ child ] ) |  |
|           dup_point_cnt_minus1[ child ] | ae(v) |
|       } |  |
|   } |  |
| } |  |

Figure 7:
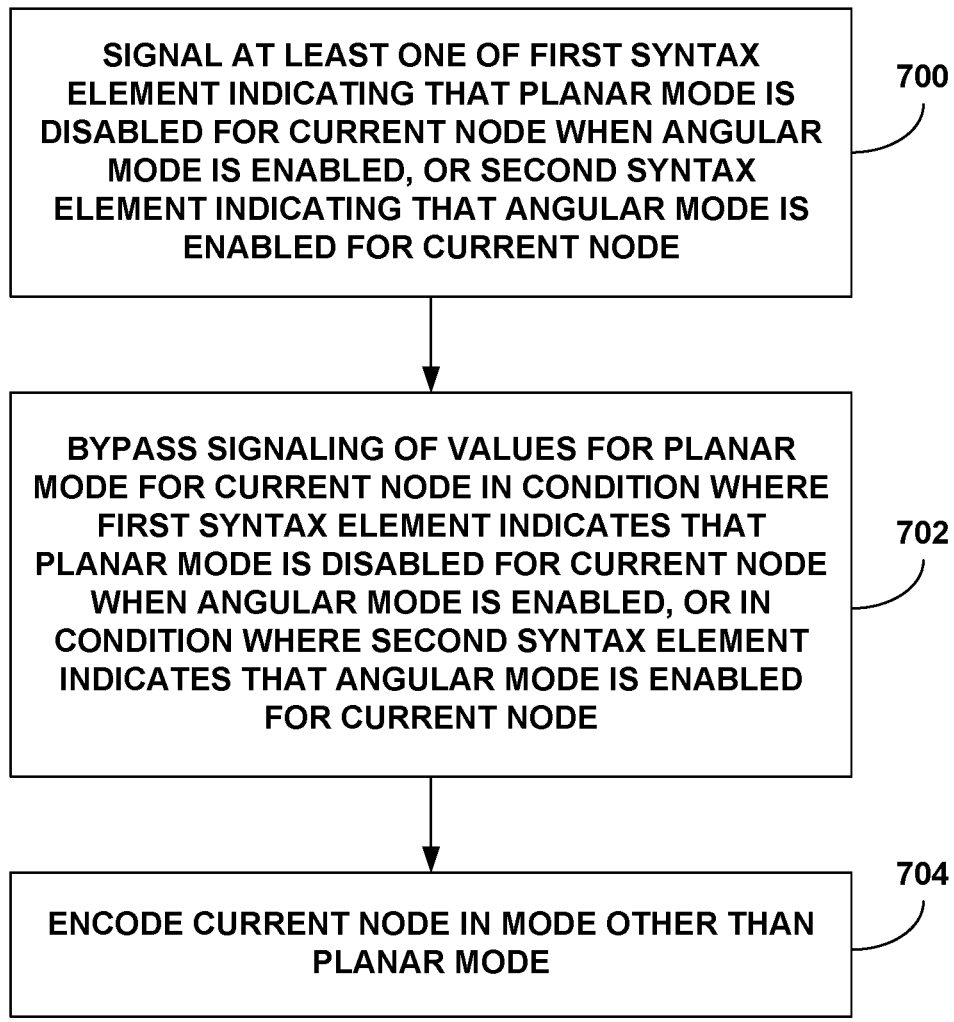
FIG. 7 is a flowchart illustrating an example technique for encoding point cloud data.

FIG. 7 is a flowchart illustrating an example technique for encoding point cloud data. For ease, the examples are described with respect to the G-PCC encoder 200, such as based on combination of planar mode/angular mode unit 213 and arithmetic encoding unit 214.

G-PCC encoder 200 may be configured to signal at least one of a first syntax element (e.g., geom_disable_planar_idcm_angular) indicating that planar mode is disabled for a current node when angular mode is enabled (e.g., geom_disable_planar_idcm_angular is true), or a second syntax element (e.g., geometry_angular_enabled_flag) indicating that angular mode is enabled for the current node (e.g., geometry_angular_enabled_flag is true) (700). In some examples, the first syntax element is signaled in the geometry parameter set (GPS). In some examples, both the first syntax element and the second syntax element may be signaled.

As one example, planar mode/angular mode unit 213 may be configured to cause arithmetic encoding unit 214 to signal at least one of a first syntax element (e.g., geom_disable_planar_idcm_angular) indicating that planar mode is disabled for a current node when angular mode is enabled (e.g., geom_disable_planar_idcm_angular is true), or a second syntax element (e.g., geometry_angular_enabled_flag) indicating that angular mode is enabled for the current node (e.g., geometry_angular_enabled_flag is true). That is, arithmetic encoding unit 214 may be configured to signal at least one of a first syntax element (e.g., geom_disable_planar_idcm_angular) indicating that planar mode is disabled for a current node when angular mode is enabled (e.g., geom_disable_planar_idcm_angular is true), or a second syntax element (e.g., geometry_angular_enabled_flag) indicating that angular mode is enabled for the current node (e.g., geometry_angular_enabled_flag is true) (700).

Although signaling of one of the first syntax element or the second syntax element is described, it may be possible to signal only one or signal both of the first syntax element and the second syntax element. For example, G-PCC encoder 200 may signal the first syntax element, signal the second syntax element, or signal both the first syntax element and the second syntax element.

G-PCC encoder 200 may bypass signaling of values (e.g., is_planar_flag and plane_position) for a planar mode for the current node in a condition where the first syntax element indicates that the planar mode is disabled for the current node when the angular mode is enabled, or in a condition where the second syntax element indicate that the angular mode is enabled for the current node (702). As one example, planar mode/angular mode unit 213 may cause arithmetic encoding unit 214 to not signal values (e.g., is_planar_flag and plane_position) for a planar mode for the current node in a condition where the first syntax element indicates that the planar mode is disabled for the current node when the angular mode is enabled, or in a condition where the second syntax element indicate that the angular mode is enabled for the current node. That is, arithmetic encoding unit 214 may bypass signaling of values (e.g., is_planar_flag and plane_position) for a planar mode for the current node in a condition where the first syntax element indicates that the planar mode is disabled for the current node when the angular mode is enabled, or in a condition where the second syntax element indicate that the angular mode is enabled for the current node.

For example, if geom_disable_planar_idcm_angular (e.g., the first syntax element) is true, then G-PCC encoder 200 may bypass signaling of values for the planar mode. If geometry_angular_enabled_flag (e.g., second syntax element) is true, then G-PCC encoder 200 may bypass signaling of values for the planar mode. As another example, if both geom_disable_planar_idcm_angular is true and geometry_angular_enabled_flag is true, then G-PCC encoder 200 may bypass signaling of values for the planar mode.

Bypassing signaling of values for the planar mode may mean that G-PCC encoder 200 includes in the bitstream different syntax elements than the syntax elements that would be included if G-PCC encoder 200 signaled values for the planar mode. For example, rather than is_planar_flag and plane_position being signaled at a particular location in the bitstream, some other syntax elements are included. In this way, G-PCC encoder 200 may be considered as bypassing signaling of values for the planar mode.

There may be additional conditions as well that G-PCC encoder 200 may account for when bypassing signaling of values for the planar mode. As one examples, G-PCC encoder 200 may determine that inferred direct coding mode (IDCM) is applied for the current node (e.g., direct_mode_flag is true). In this example, to bypass signaling of values, G-PCC encoder 200 may bypass signaling of values for the planar mode for the current node in the condition where the first syntax element indicates that the planar mode is disabled for the current node when the angular mode is enabled, in the condition where the second syntax element indicates that the angular mode is enabled for the current node, and in a condition where IDCM is applied for the current node. For instance, in this example, if IDCM is not applied to a node, then it may be possible to signal planar values even if the first syntax element indicates that planar mode is disabled for a current node when angular mode is enabled, or the second syntax element indicates that angular mode is enabled for the current node.

G-PCC encoder 200 may encode the current node in a mode other than planar mode (704). For example, G-PCC encoder 200 may not signal values that are used for planar mode, and may instead select encoding of the current node using some other technique, such as signaling the occupancy bits directly.

In the above example, the current node may be considered as a first node. In such examples, signaling at least one of the first syntax element or the second syntax element may mean signaling a first instance of the first syntax element or a first instance of the second syntax element. G-PCC encoder 200 may be configured to signal at least one of a second instance of the first syntax element indicating that planar mode is not disabled for the second node when the angular mode is enabled, or a second instance of the second syntax element indicating that angular mode is disabled for the second node.

In such examples, G-PCC encoder 200 signal values for the planar mode for the second node only in a condition where the second instance of the first syntax element indicates that the planar mode is disabled for the second node when the angular mode is enabled, or only in a condition where the second instance of the second syntax element indicates that the angular mode is enabled for the second node. G-PCC encoder 200 may encode the second node using planar mode.

In some examples, a geometry parameter set (GPS) for the second node and a GPS for the first node are different, and the first instance of the first and second syntax elements and the second instance of the first and second syntax elements may have different values when the GPS for the second node and the GPS for the first node are different. However, the example techniques are not limited, and in some examples, it may be possible that for the same GPS, the first instance of the first and second syntax elements and the second instance of the first and the second syntax elements have the different values.

Figure 8:
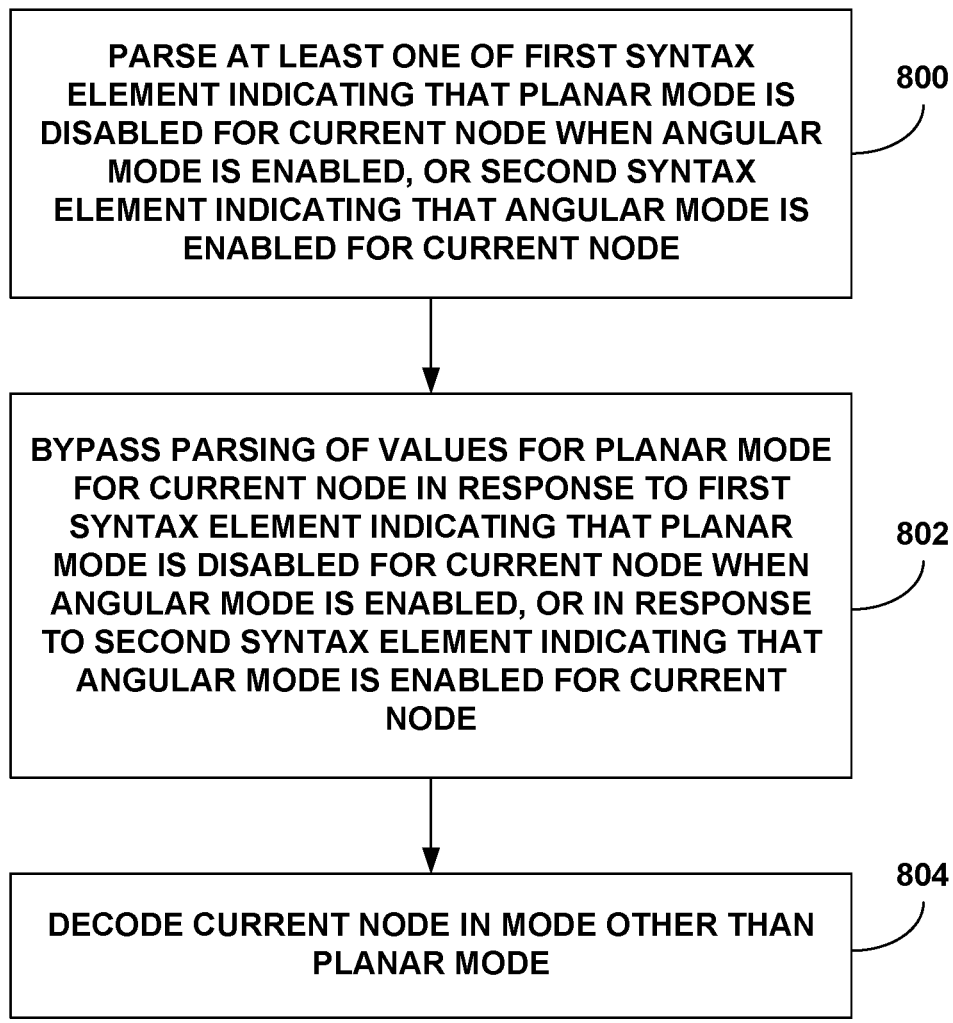
FIG. 8 is a flowchart illustrating an example technique for decoding point cloud data.

FIG. 8 is a flowchart illustrating an example technique for decoding point cloud data. For ease, the examples are described with respect to the G-PCC decoder 300, such as based on combination of planar mode/angular mode unit 313 and geometry arithmetic decoding unit 302.

G-PCC decoder 300 may be configured to parse at least one of a first syntax element (e.g., geom_disable_planar_idcm_angular) indicating that planar mode is disabled for a current node when angular mode is enabled (e.g., geom_disable_planar_idcm_angular is true), or a second syntax element (e.g., geometry_angular_enabled_flag) indicating that angular mode is enabled for the current node (e.g., geometry_angular_enabled_flag is true) (800). In some examples, the first syntax element is parsed in the geometry parameter set (GPS). In some examples, both the first syntax element and the second syntax element may be parsed.

As one example, geometry arithmetic decoding unit 302 may be configured to parse the values for at least one of a first syntax element (e.g., geom_disable_planar_idcm_angular) indicating that planar mode is disabled for a current node when angular mode is enabled (e.g., geom_disable_planar_idcm_angular is true), or a second syntax element (e.g., geometry_angular_enabled_flag) indicating that angular mode is enabled for the current node (e.g., geometry_angular_enabled_flag is true). Planar mode/angular mode unit 313 may be configured to parse the values that geometry arithmetic unit decoding 302 decoded.

Although parsing of one of the first syntax element or the second syntax element is described, it may be possible to parse only one or parse both of the first syntax element and the second syntax element. For example, G-PCC decoder 300 may parse the first syntax element, parse the second syntax element, or parse both the first syntax element and the second syntax element.

G-PCC decoder 300 may bypass parsing of values (e.g., is_planar_flag and plane_position) for a planar mode for the current node in response to the first syntax element indicating that the planar mode is disabled for the current node when the angular mode is enabled, or in response to the second syntax element indicating that the angular mode is enabled for the current node (802). As one example, geometry arithmetic decoding unit 302 may bypass parsing of values for the planar mode for the current node in response to the first syntax element indicating that the planar mode is disabled for the current node when the angular mode is enabled, or in response to the second syntax element indicating that the angular mode is enabled for the current node, and planar mode/angular mode unit 313 may determine values located in the bitstream where values such as is_planar_flag and plane_position should be located are for other syntax elements.

For example, if geom_disable_planar_idcm_angular (e.g., the first syntax element) is true, then G-PCC decoder 300 may bypass parsing of values for the planar mode. If geometry_angular_enabled_flag (e.g., second syntax element) is true, then G-PCC decoder 300 may bypass parsing of values for the planar mode. As another example, if both geom_disable_planar_idcm_angular is true and geometry_angular_enabled_flag is true, then G-PCC decoder 300 may bypass parsing of values for the planar mode.

Bypassing parsing of values for the planar mode may mean that G-PCC decoder 300 decodes in the bitstream different syntax elements than the syntax elements that would be decoded if G-PCC encoder 200 signaled values for the planar mode. For example, rather than is_planar_flag and plane_position being parsed at a particular location in the bitstream, some other syntax elements are parsed. In this way, G-PCC decoder 300 may be considered as bypassing parsing of values for the planar mode.

As another example, to bypass parsing of values for the planar mode, G-PCC decoder 300 may be configured to determine, at least one of, in each iteration of a loop that the first syntax element indicates that planar mode is disabled for the current node when angular mode is enabled, or that the second syntax element indicates that angular mode is enabled for the current node. For example, G-PCC decoder 300 may define a value for PlanarEligible[k] based on one or more of the first syntax element, second syntax element, or whether IDCM is applied. Within a loop over the values of [k], in each iteration, G-PCC decoder 300 may determine the value of PlanarEligible[k]. Based on the value of PlanarEligible[k], G-PCC decoder 300 may bypass parsing of values for the planar mode in each iteration of the loop based on the determination.

There may be additional conditions as well that G-PCC decoder 300 may account for when bypassing parsing of values for the planar mode. As one examples, G-PCC decoder 300 may determine that inferred direct coding mode (IDCM) is applied for the current node (e.g., direct_mode_flag is true). In this example, to bypass parsing of values, G-PCC decoder 300 may bypass parsing of values for the planar mode for the current node in response to the first syntax element indicating that the planar mode is disabled for the current node when the angular mode is enabled, in response to the second syntax element indicating that the angular mode is enabled for the current node, and in response to IDCM being applied for the current node. For instance, in this example, if IDCM is not applied to a node, then it may be possible to parse planar values even if the first syntax element indicates that planar mode is disabled for a current node when angular mode is enabled, or the second syntax element indicates that angular mode is enabled for the current node.

G-PCC decoder 300 may decode the current node in a mode other than planar mode (804). For example, G-PCC decoder 300 may not parse values that are used for planar mode, and may instead parse syntax elements for decoding of the current node using some other technique, such as signaling the occupancy bits directly.

In the above example, the current node may be considered as a first node. In such examples, parsing at least one of the first syntax element or the second syntax element may mean parsing a first instance of the first syntax element or a first instance of the second syntax element. G-PCC decoder 300 may be configured to parse at least one of a second instance of the first syntax element indicating that planar mode is not disabled for the second node when the angular mode is enabled, or a second instance of the second syntax element indicating that angular mode is disabled for the second node.

In such examples, G-PCC decoder 300 may parse values for the planar mode for the second node only in response to the second instance of the first syntax element indicating that the planar mode is disabled for the second node when the angular mode is enabled, or only in response to the second instance of the second syntax element indicating that the angular mode is enabled for the second node. G-PCC decoder 300 may decode the second node using planar mode.

In some examples, a geometry parameter set (GPS) for the second node and a GPS for the first node are different, and the first instance of the first and second syntax elements and the second instance of the first and second syntax elements may have different values when the GPS for the second node and the GPS for the first node are different. However, the example techniques are not limited, and in some examples, it may be possible that for the same GPS, the first instance of the first and second syntax elements and the second instance of the first and the second syntax elements have the different values.

Figure 9:
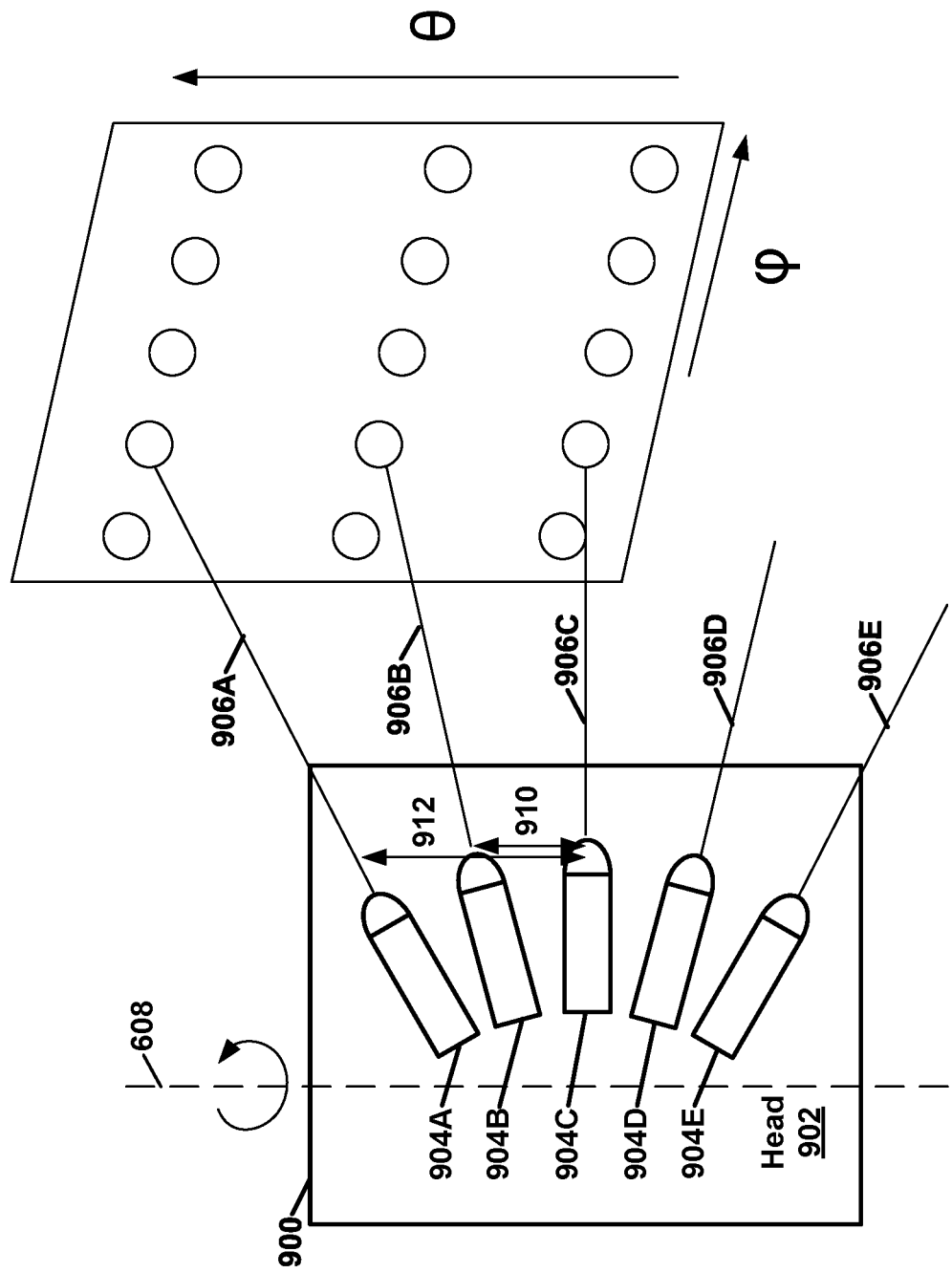
FIG. 9 is a conceptual diagram illustrating a laser package, such as a LIDAR sensor or other system that includes one or more lasers, scanning points in 3-dimensional space.

FIG. 9 is a conceptual diagram illustrating a laser package 900, such as a LIDAR sensor or other system that includes one or more lasers, scanning points in 3-dimensional space. Data source 104 (FIG. 1) may include laser package 900.

As shown in FIG. 9, point clouds can be captured using laser package 900, i.e., the sensor scans the points in 3D space. It is to be understood, however, that some point clouds are not generated by an actual LIDAR sensor but may be encoded as if they were. In the example of FIG. 9, laser package 900 includes a LIDAR head 902 that includes multiple lasers 904A-904E (collectively, "lasers 904") arrayed in a vertical plane at different angles relative to an origin point. Laser package 900 may rotate around a vertical axis 908. Laser package 900 may use returned laser light to determine the distances and positions of points of the point cloud. Laser beams 906A-906E (collectively, "laser beams 906") emitted by lasers 904 of laser package 900 may be characterized by a set of parameters. Distances denoted by arrows 910, 912 denotes an example laser correction values for laser 904B, 904A, respectively.

Figure 10:
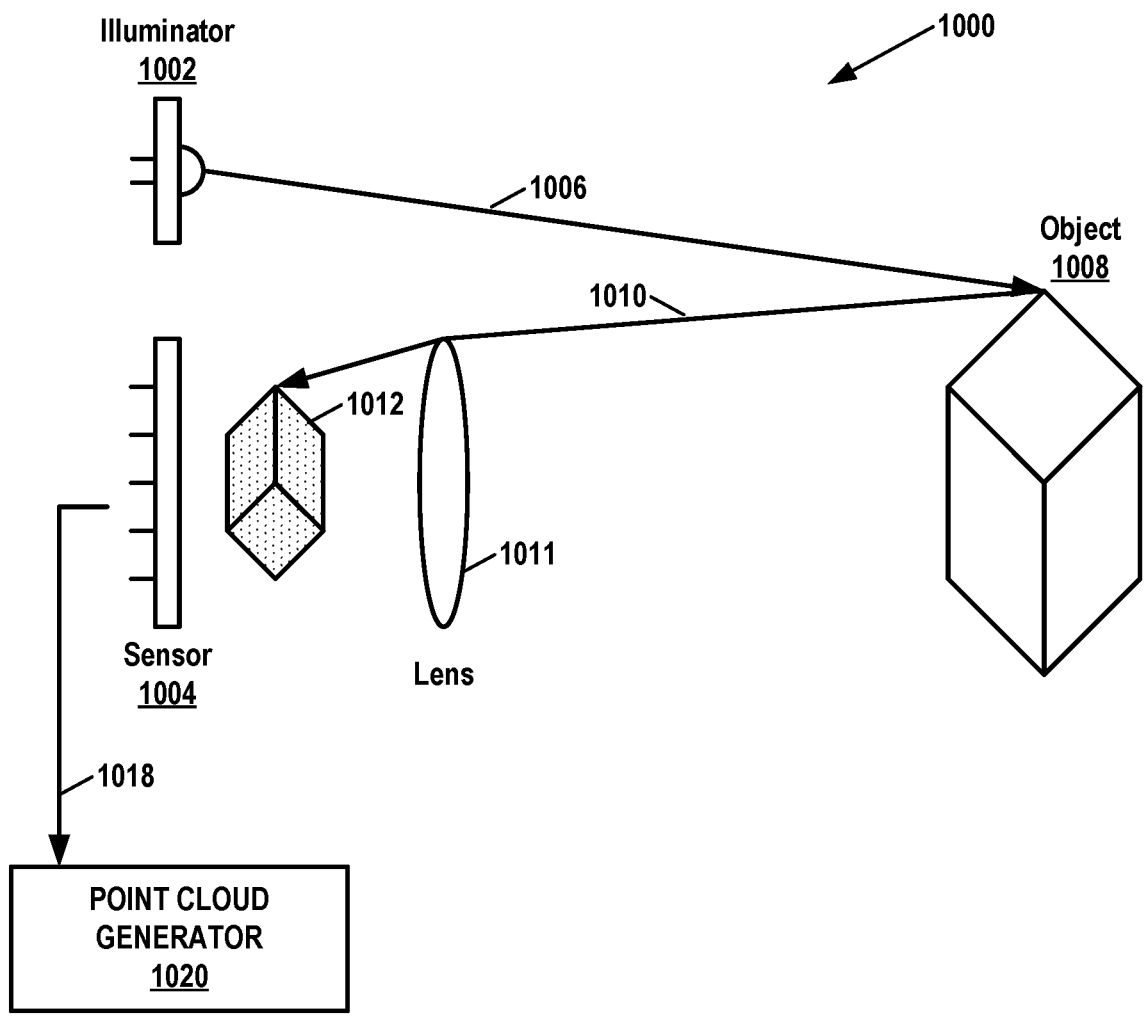
FIG. 10 is a conceptual diagram illustrating an example range-finding system that may be used with one or more techniques of this disclosure.

FIG. 10 is a conceptual diagram illustrating an example range-finding system that may be used with one or more techniques of this disclosure. In the example of FIG. 10, range-finding system 1000 includes an illuminator 1002 and a sensor 1004. Illuminator 1002 may emit light 1006. In some examples, illuminator 1002 may emit light 1006 as one or more laser beams. Light 1006 may be in one or more wavelengths, such as an infrared wavelength or a visible light wavelength. In other examples, light 1006 is not coherent, laser light. When light 1006 encounters an object, such as object 1008, light 1006 creates returning light 1010. Returning light 1010 may include backscattered and/or reflected light. Returning light 1010 may pass through a lens 1011 that directs returning light 1010 to create an image 1012 of object 1008 on sensor 1004. Sensor 1004 generates signals 1014 based on image 1012. Image 1012 may comprise a set of points (e.g., as represented by dots in image 1012 of FIG. 10).

In some examples, illuminator 1002 and sensor 1004 may be mounted on a spinning structure so that illuminator 1002 and sensor 1004 capture a 360-degree view of an environment. In other examples, range-finding system 1000 may include one or more optical components (e.g., mirrors, collimators, diffraction gratings, etc.) that enable illuminator 1002 and sensor 1004 to detect objects within a specific range (e.g., up to 360-degrees). Although the example of FIG. 10 only shows a single illuminator 1002 and sensor 1004, range-finding system 1000 may include multiple sets of illuminators and sensors.

In some examples, illuminator 1002 generates a structured light pattern. In such examples, range-finding system 1000 may include multiple sensors 1004 upon which respective images of the structured light pattern are formed. Range-finding system 1000 may use disparities between the images of the structured light pattern to determine a distance to an object 1008 from which the structured light pattern backscatters. Structured light-based range-finding systems may have a high level of accuracy (e.g., accuracy in the sub-millimeter range), when object 1008 is relatively close to sensor 1004 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 1000 is a time of flight (ToF)-based system. In some examples where range-finding system 1000 is a ToF-based system, illuminator 1002 generates pulses of light. In other words, illuminator 1002 may modulate the amplitude of emitted light 1006. In such examples, sensor 1004 detects returning light 1010 from the pulses of light 1006 generated by illuminator 1002. Range-finding system 1000 may then determine a distance to object 1008 from which light 1006 backscatters based on a delay between when light 1006 was emitted and detected and the known speed of light in air. In some examples, rather than (or in addition to) modulating the amplitude of the emitted light 1006, illuminator 1002 may modulate the phase of the emitted light 1002. In such examples, sensor 1004 may detect the phase of returning light 1010 from object 1008 and determine distances to points on object 1008 using the speed of light and based on time differences between when illuminator 1002 generated light 1006 at a specific phase and when sensor 1004 detected returning light 1010 at the specific phase.

In other examples, a point cloud may be generated without using illuminator 1002. For instance, in some examples, sensor 1004 of range-finding system 1000 may include two or more optical cameras. In such examples, range-finding system 1000 may use the optical cameras to capture stereo images of the environment, including object 1008. Range-finding system 1000 (e.g., point cloud generator 1020) may then calculate the disparities between locations in the stereo images. Range-finding system 1000 may then use the disparities to determine distances to the locations shown in the stereo images. From these distances, point cloud generator 1020 may generate a point cloud.

Sensors 1004 may also detect other attributes of object 1008, such as color and reflectance information. In the example of FIG. 10, a point cloud generator 920 may generate a point cloud based on signals 1018 generated by sensor 1004. Range-finding system 1000 and/or point cloud generator 1020 may form part of data source 104 (FIG. 1).

Figure 11:
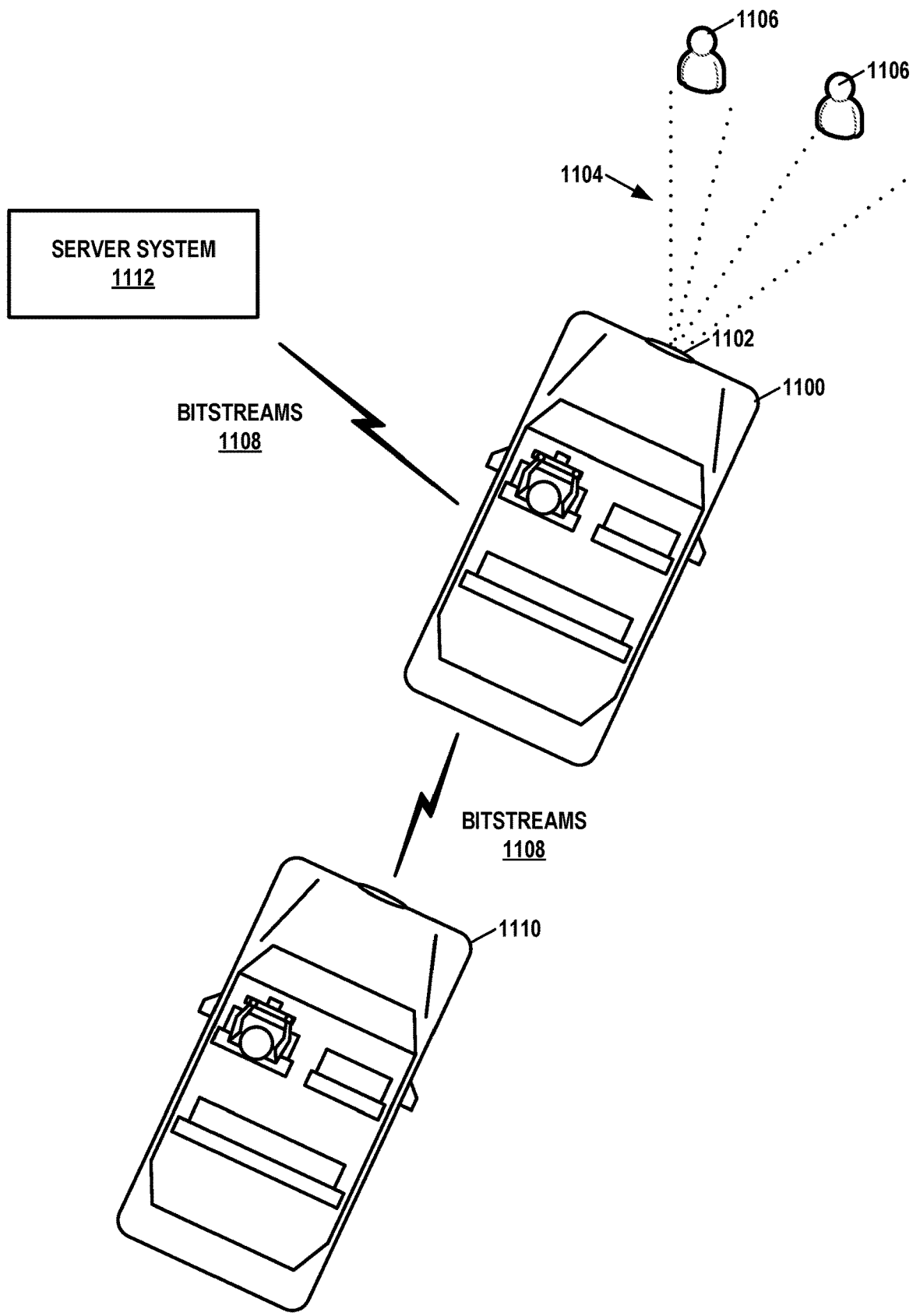
FIG. 11 is a conceptual diagram illustrating an example vehicle-based scenario in which one or more techniques of this disclosure may be used.

FIG. 11 is a conceptual diagram illustrating an example vehicle-based scenario in which one or more techniques of this disclosure may be used. In the example of FIG. 11, a vehicle 1100 includes a laser package 1102, such as a LIDAR system. Laser package 1102 may be implemented in the same manner as laser package 900 (FIG. 9). Although not shown in the example of FIG. 11, vehicle 1100 may also include a data source, such as data source 104 (FIG. 1), and a G-PCC encoder, such as G-PCC encoder 200 (FIG. 1). In the example of FIG. 11, laser package 1102 emits laser beams 1104 that reflect off pedestrians 1106 or other objects in a roadway. The data source of vehicle 1100 may generate a point cloud based on signals generated by laser package 1102. The G-PCC encoder of vehicle 1100 may encode the point cloud to generate bitstreams 1108, such as the geometry bitstream of FIG. 2 and the attribute bitstream of FIG. 2. Bitstreams 1108 may include many fewer bits than the uncoded point cloud obtained by the G-PCC encoder. An output interface of vehicle 1100 (e.g., output interface 108 (FIG. 1) may transmit bitstreams 1108 to one or more other devices. Thus, vehicle 1100 may be able to transmit bitstreams 1108 to other devices more quickly than the encoded point cloud data. Additionally, bitstreams 1108 may require less data storage capacity.

In the example of FIG. 11, vehicle 1100 may transmit bitstreams 1108 to another vehicle 1110. Vehicle 1110 may include a G-PCC decoder, such as G-PCC decoder 300 (FIG. 1). The G-PCC decoder of vehicle 1110 may decode bitstreams 1108 to reconstruct the point cloud. Vehicle 1110 may use the reconstructed point cloud for various purposes. For instance, vehicle 1110 may determine based on the reconstructed point cloud that pedestrians 1106 are in the roadway ahead of vehicle 1100 and therefore start slowing down, e.g., even before a driver of vehicle 1110 realizes that pedestrians 1106 are in the roadway. Thus, in some examples, vehicle 1110 may perform an autonomous navigation operation, generate a notification or warning, or perform another action based on the reconstructed point cloud.

Additionally or alternatively, vehicle 1100 may transmit bitstreams 1108 to a Server system 1112. Server system 1112 may use bitstreams 1108 for various purposes. For example, server system 1112 may store bitstreams 1108 for subsequent reconstruction of the point clouds. In this example, server system 1112 may use the point clouds along with other data (e.g., vehicle telemetry data generated by vehicle 1100) to train an autonomous driving system. In other example, server system 1112 may store bitstreams 1108 for subsequent reconstruction for forensic crash investigations (e.g., if vehicle 1100 collides with pedestrians 1106).

Figure 12:
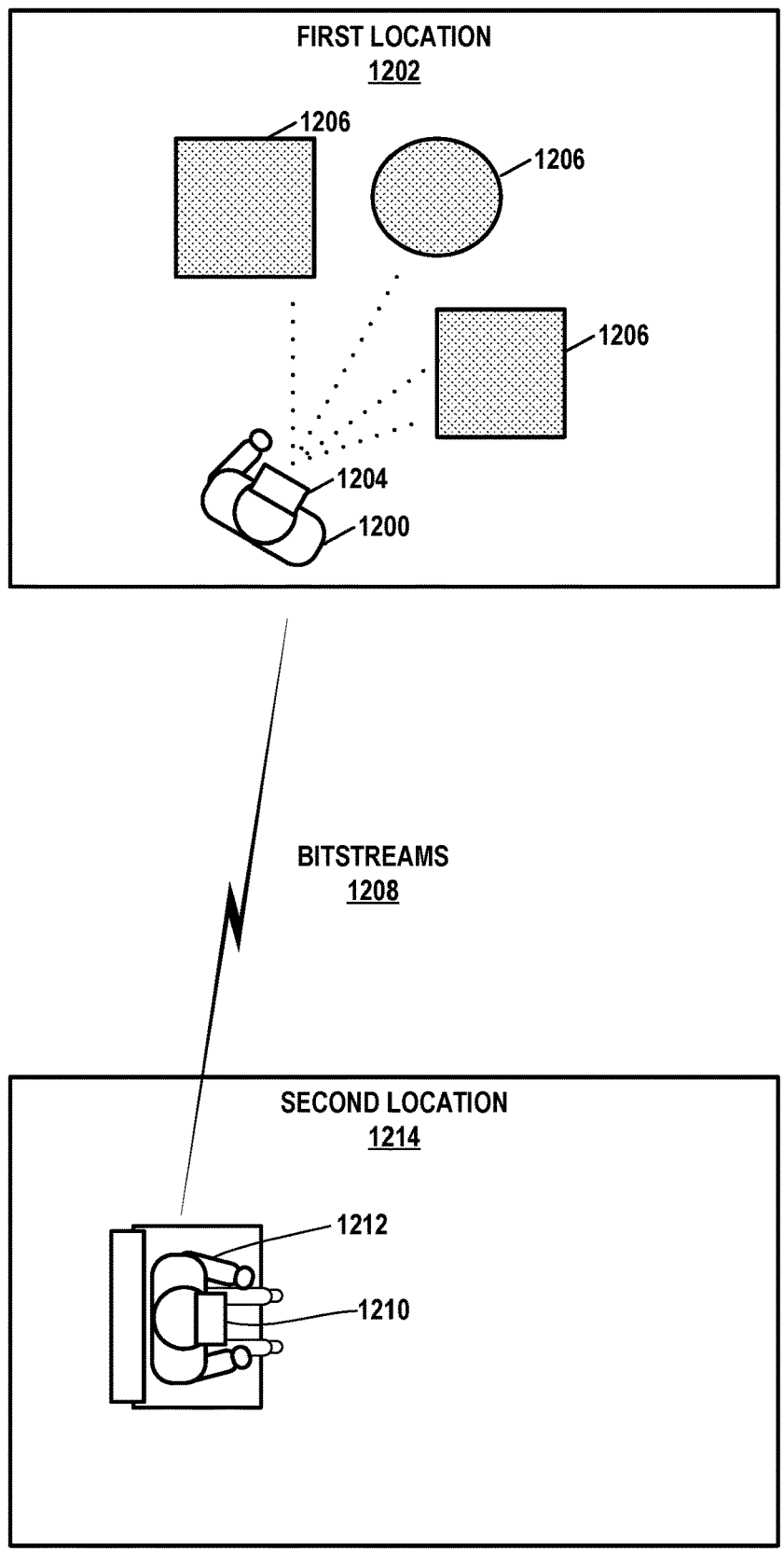
FIG. 12 is a conceptual diagram illustrating an example extended reality system in which one or more techniques of this disclosure may be used.

FIG. 12 is a conceptual diagram illustrating an example extended reality system in which one or more techniques of this disclosure may be used. Extended reality (XR) is a term used to cover a range of technologies that includes augmented reality (AR), mixed reality (MR), and virtual reality (VR). In the example of FIG. 12, a first user 1200 is located in a first location 1202. User 1200 wears an XR headset 1204. As an alternative to XR headset 1204, user 1200 may use a mobile device (e.g., mobile phone, tablet computer, etc.). XR headset 1204 includes a depth detection sensor, such as a LIDAR system, that detects positions of points on objects 1206 at location 1202. A data source of XR headset 1204 may use the signals generated by the depth detection sensor to generate a point cloud representation of objects 1206 at location 1202. XR headset 1204 may include a G-PCC encoder (e.g., G-PCC encoder 200 of FIG. 1) that is configured to encode the point cloud to generate bitstreams 1208.

XR headset 1204 may transmit bitstreams 1208 (e.g., via a network such as the Internet) to an XR headset 1210 worn by a user 1212 at a second location 1214. XR headset 1210 may decode bitstreams 1208 to reconstruct the point cloud. XR headset 1210 may use the point cloud to generate an XR visualization (e.g., an AR, MR, VR visualization) representing objects 1206 at location 1202. Thus, in some examples, such as when XR headset 1210 generates a VR visualization, user 1212 at location 1214 may have a 3D immersive experience of location 1202. In some examples, XR headset 1210 may determine a position of a virtual object based on the reconstructed point cloud. For instance, XR headset 1210 may determine, based on the reconstructed point cloud, that an environment (e.g., location 1202) includes a flat surface and then determine that a virtual object (e.g., a cartoon character) is to be positioned on the flat surface. XR headset 1210 may generate an XR visualization in which the virtual object is at the determined position. For instance, XR headset 1210 may show the cartoon character sitting on the flat surface.

Figure 13:
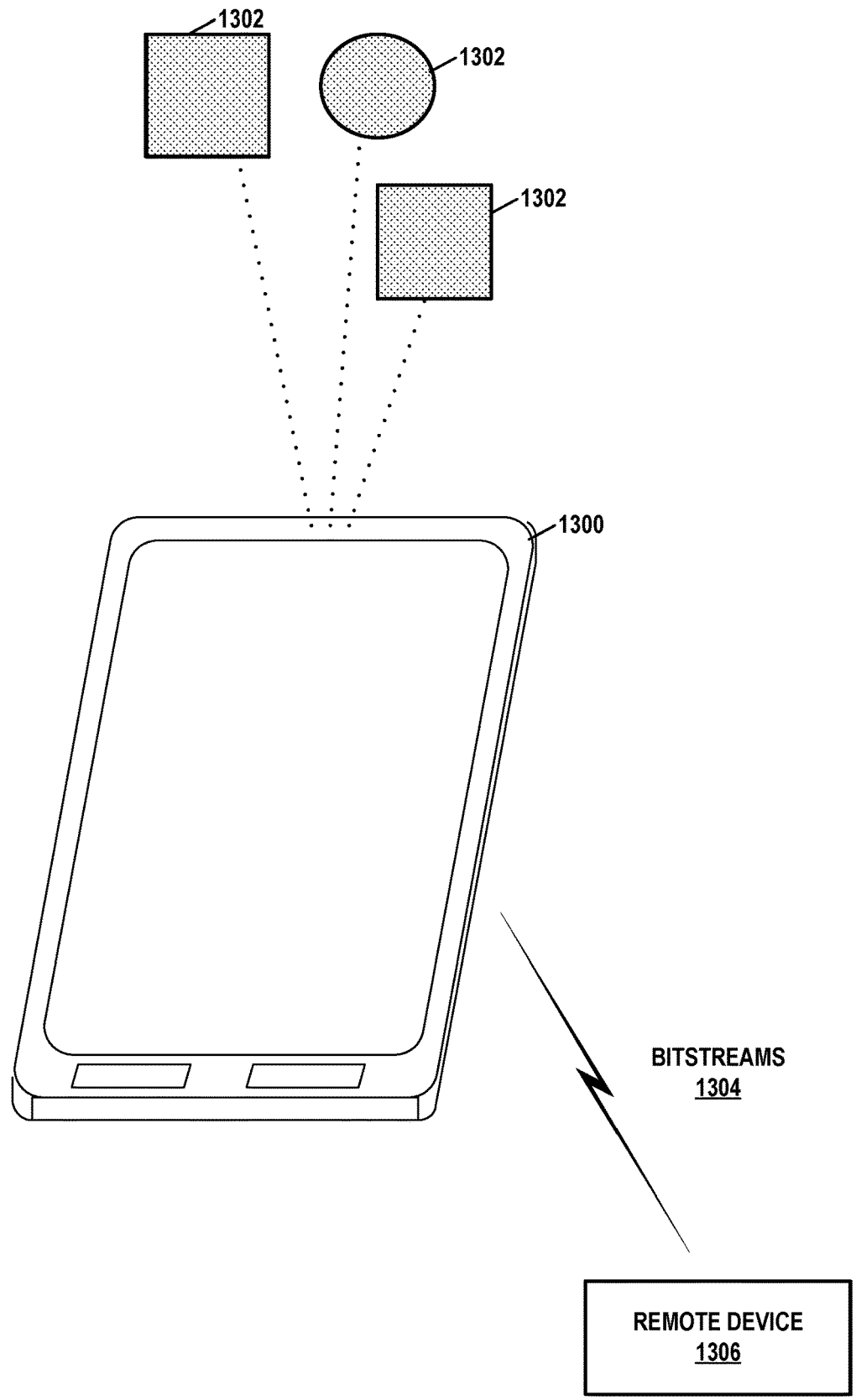
FIG. 13 is a conceptual diagram illustrating an example mobile device system in which one or more techniques of this disclosure may be used.

FIG. 13 is a conceptual diagram illustrating an example mobile device system in which one or more techniques of this disclosure may be used. In the example of FIG. 13, a mobile device 1300, such as a mobile phone or tablet computer, includes a depth detection sensor, such as a LIDAR system, that detects positions of points on objects 1302 in an environment of mobile device 1300. A data source of mobile device 1300 may use the signals generated by the depth detection sensor to generate a point cloud representation of objects 1302. Mobile device 1300 may include a G-PCC encoder (e.g., G-PCC encoder 200 of FIG. 1) that is configured to encode the point cloud to generate bitstreams 1304. In the example of FIG. 13, mobile device 1300 may transmit bitstreams to a remote device 1306, such as a server system or other mobile device. Remote device 1306 may decode bitstreams 1304 to reconstruct the point cloud. Remote device 1306 may use the point cloud for various purposes. For example, remote device 1306 may use the point cloud to generate a map of environment of mobile device 1300. For instance, remote device 1306 may generate a map of an interior of a building based on the reconstructed point cloud. In another example, remote device 1306 may generate imagery (e.g., computer graphics) based on the point cloud. For instance, remote device 1306 may use points of the point cloud as vertices of polygons and use color attributes of the points as the basis for shading the polygons. In some examples, remote device 1306 may perform facial recognition using the point cloud.

Examples in the various aspects of this disclosure may be used individually or in any combination.

Clause 1. A method of processing point cloud data, the method comprising signaling, in a bitstream, an inferred direct coding mode (IDCM) flag and a number of points in a node of the point cloud data; and based on the number of points in the node being one and subsequent to signaling the IDCM flag, signaling, in the bitstream, plane position and bypassing signaling planar mode.

Clause 2. A method of processing point cloud data, the method comprising parsing, from a bitstream, an inferred direct coding mode (IDCM) flag and a number of points in a node of the point cloud data; based on the number of points in the node being one and subsequent to parsing the IDCM flag, parsing, from the bitstream, plane position; based on the number of points in the node being one, determining that parsed bits, from the bitstream, for the node are for a syntax element other than a syntax element indicating a planar mode; and reconstructing the point cloud based on the parsed IDCM flag and the plane position.

Clause 3. A method of processing point cloud data, the method comprising: signaling, in a bitstream, an inferred direct coding mode (IDCM) flag and a number of points in a node of the point cloud data; and based on the number of points in the node being less than or equal to a threshold, bypassing signaling plane position and planar mode.

Clause 4. A method of processing point cloud data, the method comprising parsing, from a bitstream, an inferred direct coding mode (IDCM) flag and the number of points in the node of the point cloud data; based on the number of points in the node being less than or equal to a threshold, determining that parsed bits, from the bitstream, for the node are for a syntax element other than a syntax element indicating a plane position or a planar mode; and reconstructing the point cloud data based on the parsed IDCM flag.

Clause 5. The method of any of clauses 3 and 4, wherein the threshold is one.

Clause 6. The method of any of clauses 3 and 4, wherein the threshold is greater than one.

Clause 7. A method of processing point cloud data, the method comprising: in a condition where inferred direct coding mode (IDCM) is disabled, encoding the point cloud data without using planar mode and plane position for a node of the point cloud.

Clause 8. A method of processing point cloud data, the method comprising: in a condition where inferred direct coding mode (IDCM) is disabled, decoding the point cloud data without using planar mode and plane position for a node of the point cloud.

Clause 9. A device for processing point cloud data, the device comprising: a memory configured to store point cloud data; and processing circuitry configured to perform the method of any one of clauses 1-8.

Clause 10. The device of clause 9, wherein the device comprises a decoder.

Clause 11. The device of clause 9, wherein the device comprises an encoder.

Clause 12. The device of any of clauses 9-11, further comprising a device to generate the point cloud.

Clause 13. The device of any of clauses 9-12, further comprising a display to present imagery based on the point cloud.

Clause 14. A computer-readable storage medium having stored thereon instructions that, when executed, cause one or more processors to perform the method of any of clauses 1-8.

Clause 15. A device for processing point cloud data, the device comprising means for performing the method of any of clauses 1-8.

Clause 1A. A method of encoding point cloud data, the method comprising: signaling at least one of: a first syntax element indicating that planar mode is disabled for a current node when angular mode is enabled; or a second syntax element indicating that angular mode is enabled for the current node; bypassing signaling of values for a planar mode for the current node in a condition where the first syntax element indicates that the planar mode is disabled for the current node when the angular mode is enabled, or in a condition where the second syntax element indicates that the angular mode is enabled for the current node; and encoding the current node in a mode other than the planar mode.

Clause 2A. The method of clause 1A, wherein the current node comprises a first node, wherein signaling at least one of the first syntax element or the second syntax element comprises signaling a first instance of the first syntax element or a first instance of the second syntax element, the method further comprising: signaling at least one of: a second instance of the first syntax element indicating that planar mode is not disabled for the second node when the angular mode is enabled; or a second instance of the second syntax element indicating that angular mode is disabled for the second node; signaling values for the planar mode for the second node only in a condition where the second instance of the first syntax element indicates that the planar mode is disabled for the second node when the angular mode is enabled, or only in a condition where the second instance of the second syntax element indicates that the angular mode is enabled for the second node; and encoding the second node using planar mode.

Clause 3A. The method of any of clauses 1A and 2A, further comprising: determining that inferred direct coding mode (IDCM) is applied for the current node, wherein bypassing signaling of values comprises bypassing signaling of values for the planar mode for the current node in the condition where the first syntax element indicates that the planar mode is disabled for the current node when the angular mode is enabled, in the condition where the second syntax element indicates that the angular mode is enabled for the current node, and in a condition where IDCM is applied for the current node.

Clause 4A. The method of any of clauses 1A-3A, wherein signaling at least one of the first syntax element or the second syntax element comprises signaling the first syntax element, and wherein bypassing signaling of values comprises bypassing signaling of values in the condition where the first syntax element indicates that the planar mode is disabled for the current node when the angular mode is enabled.

Clause 5A. The method of any of clauses 1A-4A, wherein signaling at least one of the first syntax element or the second syntax element comprises signaling the second syntax element, and wherein bypassing signaling of values comprises bypassing signaling of values in the condition where the second syntax element indicates that the angular mode is enabled for the current node.

Clause 6A. The method of any of clauses 1A-5A, wherein signaling at least one of the first syntax element or the second syntax element comprises signaling both the first syntax element and the second syntax element, and wherein bypassing signaling of values comprises bypassing signaling of values in the condition where the first syntax element indicates that the planar mode is disabled for the current node when the angular mode is enabled, and the condition where the second syntax element indicates that the angular mode is enabled for the current node.

Clause 7A. The method of any of clauses 1A-6A, wherein signaling the first syntax element comprises signaling the first syntax element in a geometry parameter set (GPS).

Clause 8A. A method of decoding point cloud data, the method comprising: parsing from a bitstream at least one of: a first syntax element indicating that planar mode is disabled for a current node when angular mode is enabled; or a second syntax element indicating that angular mode is enabled for the current node; bypassing parsing of values for a planar mode for the current node in response to the first syntax element indicating that the planar mode is disabled for the current node when the angular mode is enabled, or in response to the second syntax element indicating that the angular mode is enabled for the current node; and decoding the current node in a mode other than the planar mode.

Clause 9A. The method of clause 8A, wherein the current node comprises a first node, wherein parsing at least one of the first syntax element or the second syntax element comprises parsing a first instance of the first syntax element or a first instance of the second syntax element, the method further comprising: parsing at least one of: a second instance of the first syntax element indicating that planar mode is not disabled for the second node when the angular mode is enabled; or a second instance of the second syntax element indicating that angular mode is disabled for the second node; and parsing values for the planar mode for the second node only in response to the second instance of the first syntax element indicating that the planar mode is disabled for the second node when the angular mode is enabled, or only in response to the condition where the second instance of the second syntax element indicating that the angular mode is enabled for the second node; and decoding the second node using planar mode.

Clause 10A. The method of any of clauses 8A and 9A, further comprising: determining that inferred direct coding mode (IDCM) is applied for the current node, wherein bypassing parsing of values comprises bypassing parsing of values for the planar mode for the current node in response to the first syntax element indicating that the planar mode is disabled for the current node when the angular mode is enabled, in response to the second syntax element indicating that the angular mode is enabled for the current node, and in response to IDCM being applied for the current node.

Clause 11A. The method of any of clauses 8A-10A, wherein parsing at least one of the first syntax element or the second syntax element comprises parsing the first syntax element, and wherein bypassing parsing of values comprises bypassing parsing of values in response to the first syntax element indicating that the planar mode is disabled for the current node when the angular mode is enabled.

Clause 12A. The method of any of clauses 8A-11A, wherein parsing at least one of the first syntax element or the second syntax element comprises parsing the second syntax element, and wherein bypassing parsing of values comprises bypassing parsing of values in response to the second syntax element indicating that the angular mode is enabled for the current node.

Clause 13A. The method of any of clauses 8A-12A, wherein parsing at least one of the first syntax element or the second syntax element comprises parsing both the first syntax element and the second syntax element, and wherein bypassing parsing of values comprises bypassing parsing of values in response to the first syntax element indicating that the planar mode is disabled for the current node when the angular mode is enabled, and in response to the second syntax element indicating that the angular mode is enabled for the current node.

Clause 14A. The method of any of clauses 8A-13A, wherein parsing the first syntax element comprises parsing the first syntax element in a geometry parameter set (GPS).

Clause 15A. The method of any of clauses 8A-14A, wherein bypassing parsing of values for the planar mode comprises: determining, at least one of, in each iteration of a loop that the first syntax element indicates that planar mode is disabled for the current node when angular mode is enabled, or that the second syntax element indicates that angular mode is enabled for the current node; and bypassing parsing of values for the planar mode in each iteration of the loop based on the determination.

Clause 16A. A device for encoding point cloud data, the device comprising: memory configured to store the point cloud data; and processing circuitry coupled to the memory and configured to: signal at least one of: a first syntax element indicating that planar mode is disabled for a current node when angular mode is enabled; or a second syntax element indicating that angular mode is enabled for the current node; bypass signaling of values for a planar mode for the current node in a condition where the first syntax element indicates that the planar mode is disabled for the current node when the angular mode is enabled, or in a condition where the second syntax element indicates that the angular mode is enabled for the current node; and encode the current node in a mode other than the planar mode.

Clause 17A. The device of clause 16A, wherein the current node comprises a first node, wherein to signal at least one of the first syntax element or the second syntax element, the processing circuitry is configured to signal a first instance of the first syntax element or a first instance of the second syntax element, and wherein the processing circuitry is configured to: signal at least one of: a second instance of the first syntax element indicating that planar mode is not disabled for the second node when the angular mode is enabled; or a second instance of the second syntax element indicating that angular mode is disabled for the second node; signal values for the planar mode for the second node only in a condition where the second instance of the first syntax element indicates that the planar mode is disabled for the second node when the angular mode is enabled, or only in a condition where the second instance of the second syntax element indicates that the angular mode is enabled for the second node; and encode the second node using planar mode.

Clause 18A. The device of any of clauses 16A and 17A, wherein the processing circuitry is configured to: determine that inferred direct coding mode (IDCM) is applied for the current node, wherein to bypass signaling of values, the processing circuitry is configured to bypass signaling of values for the planar mode for the current node in the condition where the first syntax element indicates that the planar mode is disabled for the current node when the angular mode is enabled, in the condition where the second syntax element indicates that the angular mode is enabled for the current node, and in a condition where IDCM is applied for the current node.

Clause 19A. The device of any of clauses 16A-18A, wherein to signal at least one of the first syntax element or the second syntax element, the processing circuitry is configured to signal the first syntax element, and wherein to bypass signaling of values, the processing circuitry is configured to bypass signaling of values in the condition where the first syntax element indicates that the planar mode is disabled for the current node when the angular mode is enabled.

Clause 20A. The device of any of clauses 16A-19A, wherein to signal at least one of the first syntax element or the second syntax element, the processing circuitry is configured to signal the second syntax element, and wherein to bypass signaling of values, the processing circuitry is configured to bypass signaling of values in the condition where the second syntax element indicates that the angular mode is enabled for the current node.

Clause 21A. The device of any of clauses 16A-20A, wherein to signal at least one of the first syntax element or the second syntax element, the processing circuitry is configured to signal both the first syntax element and the second syntax element, and wherein to bypass signaling of values, the processing circuitry is configured to bypass signaling of values in the condition where the first syntax element indicates that the planar mode is disabled for the current node when the angular mode is enabled, and the condition where the second syntax element indicates that the angular mode is enabled for the current node.

Clause 22A. The device of any of clauses 16A-21A, wherein to signal the first syntax element, the processing circuitry is configured to signal the first syntax element in a geometry parameter set (GPS).

Clause 23A. A device for decoding point cloud data, the device comprising: memory configured to store the point cloud data; and processing circuitry coupled to the memory and configured to: parse from a bitstream at least one of: a first syntax element indicating that planar mode is disabled for a current node when angular mode is enabled; or a second syntax element indicating that angular mode is enabled for the current node; bypass parsing of values for a planar mode for the current node in response to the first syntax element indicating that the planar mode is disabled for the current node when the angular mode is enabled, or in response to the second syntax element indicating that the angular mode is enabled for the current node; and decode the current node in a mode other than the planar mode.

Clause 24A. The device of clause 23A, wherein the current node comprises a first node, wherein to parse at least one of the first syntax element or the second syntax element, the processing circuitry is configured to parse a first instance of the first syntax element or a first instance of the second syntax element, and wherein the processing circuitry is configured to: parse at least one of: a second instance of the first syntax element indicating that planar mode is not disabled for the second node when the angular mode is enabled; or a second instance of the second syntax element indicating that angular mode is disabled for the second node; and parse values for the planar mode for the second node only in response to the second instance of the first syntax element indicating that the planar mode is disabled for the second node when the angular mode is enabled, or only in response to the condition where the second instance of the second syntax element indicating that the angular mode is enabled for the second node; and decode the second node using planar mode.

Clause 25A. The device of any of clauses 23A and 24A, wherein the processing circuitry is configured to: determine that inferred direct coding mode (IDCM) is applied for the current node, wherein to bypass parsing of values, the processing circuitry is configured to bypass parsing of values for the planar mode for the current node in response to the first syntax element indicating that the planar mode is disabled for the current node when the angular mode is enabled, in response to the second syntax element indicating that the angular mode is enabled for the current node, and in response to IDCM being applied for the current node.

Clause 26A. The device of any of clauses 23A-25A, wherein to parse at least one of the first syntax element or the second syntax element, the processing circuitry is configured to parse the first syntax element, and wherein to bypass parsing of values, the processing circuitry is configured to bypass parsing of values in response to the first syntax element indicating that the planar mode is disabled for the current node when the angular mode is enabled.

Clause 27A. The device of any of clauses 23A-26A, wherein to parse at least one of the first syntax element or the second syntax element, the processing circuitry is configured to parse the second syntax element, and wherein to bypass parsing of values, the processing circuitry is configured to bypass parsing of values in response to the second syntax element indicating that the angular mode is enabled for the current node.

Clause 28A. The device of clauses 23A-27A, wherein to parse at least one of the first syntax element or the second syntax element, the processing circuitry is configured to parse both the first syntax element and the second syntax element, and wherein to bypass parsing of values, the processing circuitry is configured to bypass parsing of values in response to the first syntax element indicating that the planar mode is disabled for the current node when the angular mode is enabled, and in response to the second syntax element indicating that the angular mode is enabled for the current node.

Clause 29A. The device of any of clauses 23A-28A, wherein to parse the first syntax element, the processing circuitry is configured to parse the first syntax element in a geometry parameter set (GPS).

Clause 30A. The device of any of clauses 23A-29A, wherein to bypass parsing of values for the planar mode, the processing circuitry is configured to: determine, at least one of, in each iteration of a loop that the first syntax element indicates that planar mode is disabled for the current node when angular mode is enabled, or that the second syntax element indicates that angular mode is enabled for the current node; and bypass parsing of values for the planar mode in each iteration of the loop based on the determination.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding point cloud data, the method comprising:
signaling at least one of:
a first syntax element indicating that planar mode is disabled for a current node when angular mode is enabled; or
a second syntax element indicating that the angular mode is enabled for the current node;
bypassing signaling of values for a planar mode for the current node in a condition where the first syntax element indicates that the planar mode is disabled for the current node when the angular mode is enabled, or in a condition where the second syntax element indicates that the angular mode is enabled for the current node; and
encoding the current node in a mode other than the planar mode.

2. The method of claim 1, wherein the current node comprises a first node, wherein signaling at least one of the first syntax element or the second syntax element comprises signaling a first instance of the first syntax element or a first instance of the second syntax element, the method further comprising:
signaling at least one of:
a second instance of the first syntax element indicating that planar mode is not disabled for the second node when the angular mode is enabled; or
a second instance of the second syntax element indicating that the angular mode is disabled for the second node;
signaling values for the planar mode for the second node only in a condition where the second instance of the first syntax element indicates that the planar mode is disabled for the second node when the angular mode is enabled, or only in a condition where the second instance of the second syntax element indicates that the angular mode is enabled for the second node; and
encoding the second node using planar mode.

3. The method of claim 1, further comprising:
determining that inferred direct coding mode (IDCM) is applied for the current node,
wherein bypassing signaling of values comprises bypassing signaling of values for the planar mode for the current node in the condition where the first syntax element indicates that the planar mode is disabled for the current node when the angular mode is enabled, in the condition where the second syntax element indicates that the angular mode is enabled for the current node, and in a condition where IDCM is applied for the current node.

4. The method of claim 1, wherein signaling at least one of the first syntax element or the second syntax element comprises signaling the first syntax element, and wherein bypassing signaling of values comprises bypassing signaling of values in the condition where the first syntax element indicates that the planar mode is disabled for the current node when the angular mode is enabled.

5. The method of claim 1, wherein signaling at least one of the first syntax element or the second syntax element comprises signaling the second syntax element, and wherein bypassing signaling of values comprises bypassing signaling of values in the condition where the second syntax element indicates that the angular mode is enabled for the current node.

6. The method of claim 1, wherein signaling at least one of the first syntax element or the second syntax element comprises signaling both the first syntax element and the second syntax element, and wherein bypassing signaling of values comprises bypassing signaling of values in the condition where the first syntax element indicates that the planar mode is disabled for the current node when the angular mode is enabled, and the condition where the second syntax element indicates that the angular mode is enabled for the current node.

7. The method of claim 1, wherein signaling the first syntax element comprises signaling the first syntax element in a geometry parameter set (GPS).

8. A method of decoding point cloud data, the method comprising:
parsing from a bitstream at least one of:
a first syntax element indicating that planar mode is disabled for a current node when angular mode is enabled; or
a second syntax element indicating that the angular mode is enabled for the current node;
bypassing parsing of values for a planar mode for the current node in response to the first syntax element indicating that the planar mode is disabled for the current node when the angular mode is enabled, or in response to the second syntax element indicating that the angular mode is enabled for the current node; and
decoding the current node in a mode other than the planar mode.

9. The method of claim 8, wherein the current node comprises a first node, wherein parsing at least one of the first syntax element or the second syntax element comprises parsing a first instance of the first syntax element or a first instance of the second syntax element, the method further comprising:
parsing at least one of:
a second instance of the first syntax element indicating that planar mode is not disabled for the second node when the angular mode is enabled; or
a second instance of the second syntax element indicating that the angular mode is disabled for the second node;
parsing values for the planar mode for the second node only in response to the second instance of the first syntax element indicating that the planar mode is disabled for the second node when the angular mode is enabled, or only in response to the condition where the second instance of the second syntax element indicating that the angular mode is enabled for the second node; and
decoding the second node using planar mode.

10. The method of claim 8, further comprising:
determining that inferred direct coding mode (IDCM) is applied for the current node,
wherein bypassing parsing of values comprises bypassing parsing of values for the planar mode for the current node in response to the first syntax element indicating that the planar mode is disabled for the current node when the angular mode is enabled, in response to the second syntax element indicating that the angular mode is enabled for the current node, and in response to IDCM being applied for the current node.

11. The method of claim 8, wherein parsing at least one of the first syntax element or the second syntax element comprises parsing the first syntax element, and wherein bypassing parsing of values comprises bypassing parsing of values in response to the first syntax element indicating that the planar mode is disabled for the current node when the angular mode is enabled.

12. The method of claim 8, wherein parsing at least one of the first syntax element or the second syntax element comprises parsing the second syntax element, and wherein bypassing parsing of values comprises bypassing parsing of values in response to the second syntax element indicating that the angular mode is enabled for the current node.

13. The method of claim 8, wherein parsing at least one of the first syntax element or the second syntax element comprises parsing both the first syntax element and the second syntax element, and wherein bypassing parsing of values comprises bypassing parsing of values in response to the first syntax element indicating that the planar mode is disabled for the current node when the angular mode is enabled, and in response to the second syntax element indicating that the angular mode is enabled for the current node.

14. The method of claim 8, wherein parsing the first syntax element comprises parsing the first syntax element in a geometry parameter set (GPS).

15. The method of claim 8, wherein bypassing parsing of values for the planar mode comprises:
determining, at least one of, in each iteration of a loop that the first syntax element indicates that planar mode is disabled for the current node when the angular mode is enabled, or that the second syntax element indicates that the angular mode is enabled for the current node; and
bypassing parsing of values for the planar mode in each iteration of the loop based on the determination.

16. A device for encoding point cloud data, the device comprising:
memory configured to store the point cloud data; and
processing circuitry coupled to the memory and configured to:
signal at least one of:
a first syntax element indicating that planar mode is disabled for a current node when angular mode is enabled; or
a second syntax element indicating that the angular mode is enabled for the current node;
bypass signaling of values for a planar mode for the current node in a condition where the first syntax element indicates that the planar mode is disabled for the current node when the angular mode is enabled, or in a condition where the second syntax element indicates that the angular mode is enabled for the current node; and
encode the current node in a mode other than the planar mode.

17. The device of claim 16, wherein the current node comprises a first node, wherein to signal at least one of the first syntax element or the second syntax element, the processing circuitry is configured to signal a first instance of the first syntax element or a first instance of the second syntax element, and wherein the processing circuitry is configured to:
signal at least one of:
a second instance of the first syntax element indicating that planar mode is not disabled for the second node when the angular mode is enabled; or
a second instance of the second syntax element indicating that the angular mode is disabled for the second node;
signal values for the planar mode for the second node only in a condition where the second instance of the first syntax element indicates that the planar mode is disabled for the second node when the angular mode is enabled, or only in a condition where the second instance of the second syntax element indicates that the angular mode is enabled for the second node; and
encode the second node using planar mode.

18. The device of claim 16, wherein the processing circuitry is configured to:
determine that inferred direct coding mode (IDCM) is applied for the current node,
wherein to bypass signaling of values, the processing circuitry is configured to bypass signaling of values for the planar mode for the current node in the condition where the first syntax element indicates that the planar mode is disabled for the current node when the angular mode is enabled, in the condition where the second syntax element indicates that the angular mode is enabled for the current node, and in a condition where IDCM is applied for the current node.

19. The device of claim 16, wherein to signal at least one of the first syntax element or the second syntax element, the processing circuitry is configured to signal the first syntax element, and wherein to bypass signaling of values, the processing circuitry is configured to bypass signaling of values in the condition where the first syntax element indicates that the planar mode is disabled for the current node when the angular mode is enabled.

20. The device of claim 16, wherein to signal at least one of the first syntax element or the second syntax element, the processing circuitry is configured to signal the second syntax element, and wherein to bypass signaling of values, the processing circuitry is configured to bypass signaling of values in the condition where the second syntax element indicates that the angular mode is enabled for the current node.

21. The device of claim 16, wherein to signal at least one of the first syntax element or the second syntax element, the processing circuitry is configured to signal both the first syntax element and the second syntax element, and wherein to bypass signaling of values, the processing circuitry is configured to bypass signaling of values in the condition where the first syntax element indicates that the planar mode is disabled for the current node when the angular mode is enabled, and the condition where the second syntax element indicates that the angular mode is enabled for the current node.

22. The device of claim 16, wherein to signal the first syntax element, the processing circuitry is configured to signal the first syntax element in a geometry parameter set (GPS).

23. A device for decoding point cloud data, the device comprising:
memory configured to store the point cloud data; and
processing circuitry coupled to the memory and configured to:
parse from a bitstream at least one of:
a first syntax element indicating that planar mode is disabled for a current node when angular mode is enabled; or
a second syntax element indicating that the angular mode is enabled for the current node;
bypass parsing of values for a planar mode for the current node in response to the first syntax element indicating that the planar mode is disabled for the current node when the angular mode is enabled, or in response to the second syntax element indicating that the angular mode is enabled for the current node; and
decode the current node in a mode other than the planar mode.

24. The device of claim 23, wherein the current node comprises a first node, wherein to parse at least one of the first syntax element or the second syntax element, the processing circuitry is configured to parse a first instance of the first syntax element or a first instance of the second syntax element, and wherein the processing circuitry is configured to:
- parse at least one of:
  - a second instance of the first syntax element indicating that planar mode is not disabled for the second node when the angular mode is enabled; or
  - a second instance of the second syntax element indicating that the angular mode is disabled for the second node;
- parse values for the planar mode for the second node only in response to the second instance of the first syntax element indicating that the planar mode is disabled for the second node when the angular mode is enabled, or only in response to the condition where the second instance of the second syntax element indicating that the angular mode is enabled for the second node; and
- decode the second node using planar mode.

25. The device of claim 23, wherein the processing circuitry is configured to:
- determine that inferred direct coding mode (IDCM) is applied for the current node,
- wherein to bypass parsing of values, the processing circuitry is configured to bypass parsing of values for the planar mode for the current node in response to the first syntax element indicating that the planar mode is disabled for the current node when the angular mode is enabled, in response to the second syntax element indicating that the angular mode is enabled for the current node, and in response to IDCM being applied for the current node.

26. The device of claim 23, wherein to parse at least one of the first syntax element or the second syntax element, the processing circuitry is configured to parse the first syntax element, and wherein to bypass parsing of values, the processing circuitry is configured to bypass parsing of values in response to the first syntax element indicating that the planar mode is disabled for the current node when the angular mode is enabled.

27. The device of claim 23, wherein to parse at least one of the first syntax element or the second syntax element, the processing circuitry is configured to parse the second syntax element, and wherein to bypass parsing of values, the processing circuitry is configured to bypass parsing of values in response to the second syntax element indicating that the angular mode is enabled for the current node.

28. The device of claim 23, wherein to parse at least one of the first syntax element or the second syntax element, the processing circuitry is configured to parse both the first syntax element and the second syntax element, and wherein to bypass parsing of values, the processing circuitry is configured to bypass parsing of values in response to the first syntax element indicating that the planar mode is disabled for the current node when the angular mode is enabled, and in response to the second syntax element indicating that the angular mode is enabled for the current node.

29. The device of claim 23, wherein to parse the first syntax element, the processing circuitry is configured to parse the first syntax element in a geometry parameter set (GPS).

30. The device of claim 23, wherein to bypass parsing of values for the planar mode, the processing circuitry is configured to:
- determine, at least one of, in each iteration of a loop that the first syntax element indicates that planar mode is disabled for the current node when the angular mode is enabled, or that the second syntax element indicates that the angular mode is enabled for the current node; and
- bypass parsing of values for the planar mode in each iteration of the loop based on the determination.

* * * * *